(12) United States Patent
Ootsuka et al.

(10) Patent No.: US 6,393,216 B1
(45) Date of Patent: *May 21, 2002

(54) CAMERA SYSTEM INCLUDING A MONITOR DEVICE

(75) Inventors: Hiroshi Ootsuka; Shinichi Maehama, both of Sakai; Katsunori Maeda, Takatsuki; Shigeto Ohmori, Sakai, all of (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/891,314

(22) Filed: Jul. 10, 1997

Related U.S. Application Data

(63) Continuation of application No. 08/527,885, filed on Sep. 14, 1995, now abandoned, which is a continuation of application No. 08/128,557, filed on Sep. 28, 1993, now abandoned.

(30) Foreign Application Priority Data

Sep. 28, 1992 (JP) .............................. 4-258628
Sep. 28, 1992 (JP) .............................. 4-258630
Sep. 10, 1993 (JP) .............................. 5-226075

(51) Int. Cl.$^7$ .................. G03B 17/00; G03B 17/20; G03B 13/02
(52) U.S. Cl. .................. 396/56; 396/296; 396/374
(58) Field of Search .................. 396/7, 56, 57, 396/58, 59, 374, 265, 296; 348/207, 220, 231

(56) References Cited

U.S. PATENT DOCUMENTS

| 4,223,988 A | * | 9/1980 | Jyojiki et al. | 354/25 |
| 4,303,322 A | * | 12/1981 | Someya | 396/429 |
| 4,420,773 A | * | 12/1983 | Toyoda et al. | 348/220 |
| 4,553,170 A | * | 11/1985 | Aoki et al. | 358/225 |
| 4,641,215 A | * | 2/1987 | Katoh et al. | 360/35.1 |

(List continued on next page.)

FOREIGN PATENT DOCUMENTS

| EP | 435319 A1 | 7/1991 |
| GB | 1475150 | 6/1997 |
| JP | 63-185357 U | 11/1988 |
| JP | 63-284527 | 11/1988 |
| JP | 64-041581 A | 2/1989 |

(List continued on next page.)

OTHER PUBLICATIONS

English Language Patent Abstracts of Japan, vol. 18, No. 211 (P–1726).

(List continued on next page.)

*Primary Examiner*—Christopher E. Mahoney
(74) *Attorney, Agent, or Firm*—Sidley Austin Brown & Wood

(57) ABSTRACT

A camera system includes a camera main body having a photographic device for photographing an image of object to produce image signal and a monitor device separatable from the camera main body. The monitor device is provided with a control portion for controlling the exposure of photographic device in addition to a display portion. The operator can check a photographed image before or after the image is recorded on a film. Also, the monitor device selectively provides a singular display of monitor image for usual shooting and a continuous display of monitor images for serial shooting.

17 Claims, 83 Drawing Sheets

U.S. PATENT DOCUMENTS

| | | | | |
|---|---|---|---|---|
| 4,647,975 A | * | 3/1987 | Alston et al. | 358/213 |
| 4,691,253 A | * | 9/1987 | Silver | 360/33.1 |
| 4,714,963 A | * | 12/1987 | Vogel | 358/213.26 |
| 4,716,470 A | * | 12/1987 | Levine | 348/207 |
| 4,742,369 A | * | 5/1988 | Ishii et al. | 396/429 |
| 4,758,905 A | * | 7/1988 | Okada et al. | 360/35.1 |
| 4,835,563 A | * | 5/1989 | Larish | 396/429 |
| 4,837,817 A | * | 6/1989 | Maemori | 348/207 |
| 4,910,606 A | * | 3/1990 | Kinoshita et al. | 358/335 |
| 5,023,650 A | | 6/1991 | Hoshino et al. | 354/441 |
| 5,034,759 A | * | 7/1991 | Watson | 354/67 |
| 5,075,707 A | | 12/1991 | Shibayama et al. | 396/387 |
| 5,092,670 A | * | 3/1992 | Preston | 354/400 |
| 5,138,460 A | * | 8/1992 | Egawa | 358/224 |
| 5,206,730 A | * | 4/1993 | Sakai | 358/209 |
| 5,274,457 A | * | 12/1993 | Kobayashi et al. | 358/209 |
| 5,561,462 A | * | 10/1996 | Nagano | 348/372 |

FOREIGN PATENT DOCUMENTS

| | | |
|---|---|---|
| JP | 01061736 | 3/1989 |
| JP | 64061736 | 3/1989 |
| JP | 01-305784 A | 12/1989 |
| JP | 02-086376 A | 3/1990 |
| JP | 02-172368 A | 7/1990 |
| JP | 02-205832 A | 8/1990 |
| JP | 02-136238 U | 11/1990 |
| JP | 3-88581 | 4/1991 |
| JP | 3-259232 | 11/1991 |
| JP | 04-162881 A | 6/1992 |
| JP | 04-196887 A | 7/1992 |
| JP | 06011765 | 1/1994 |

U.S. PATENT DOCUMENTS

English Language Patent Abstracts of Japan, vol. 13, No. 269 (P–888).

European Search Report in connection with European Patent Application No. 97 10 8819.

\* cited by examiner

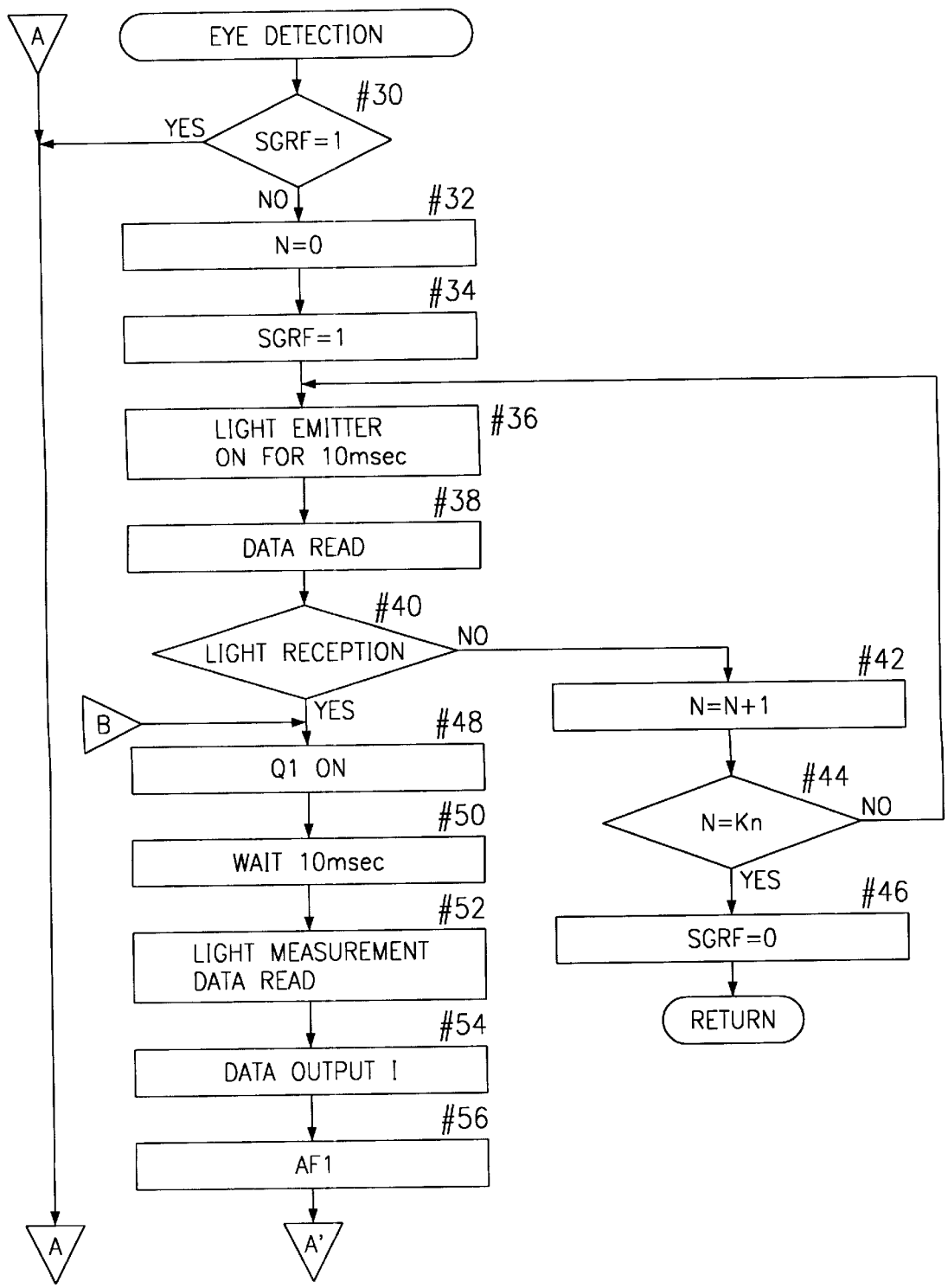

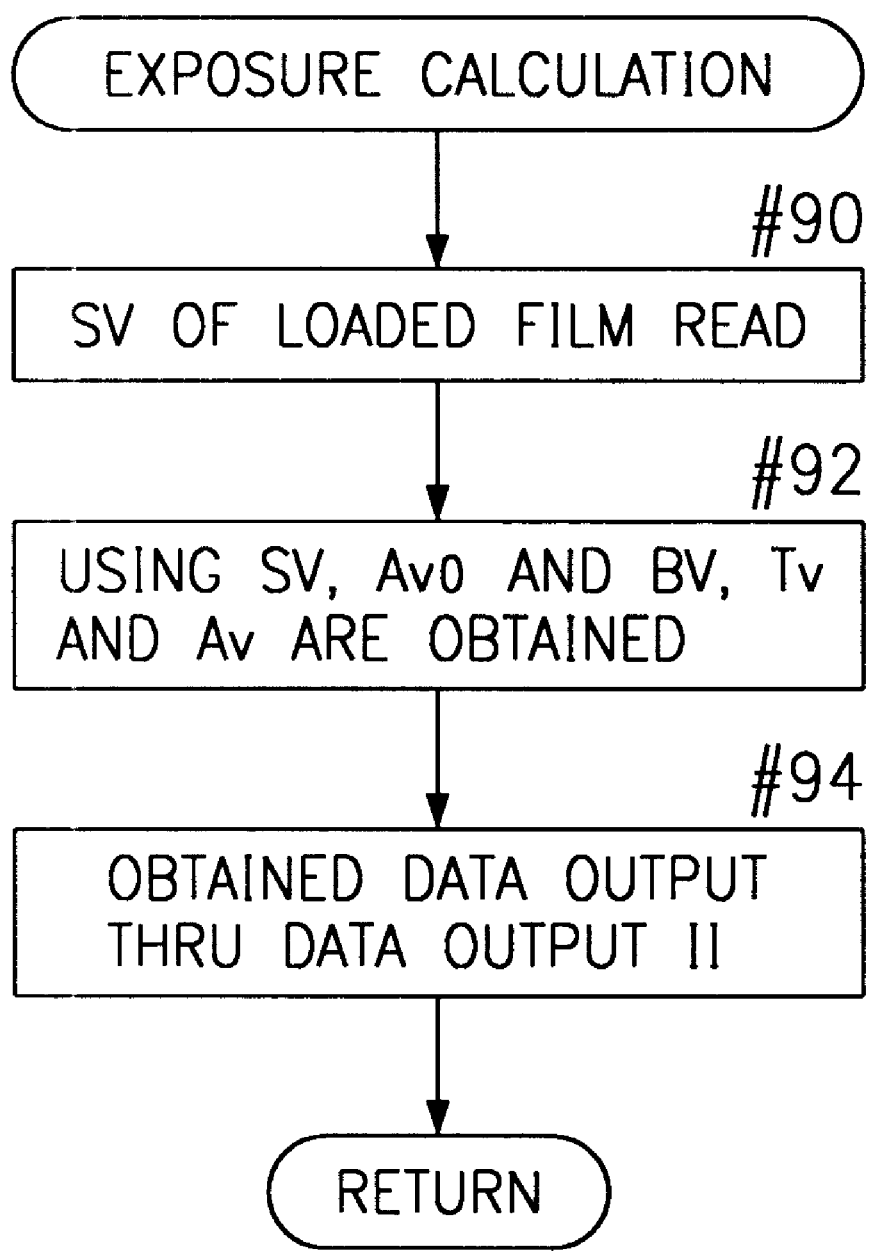

FIG. 41A
FIG. 41B
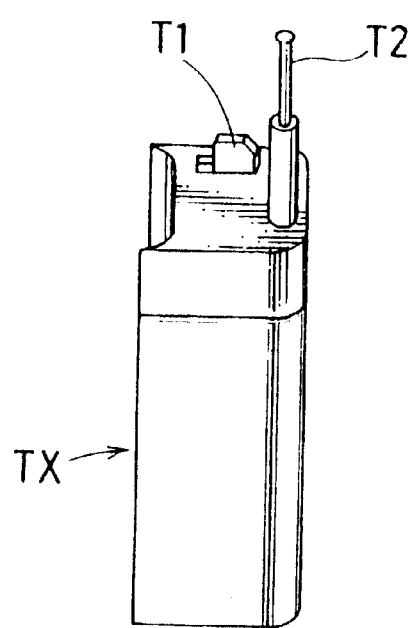
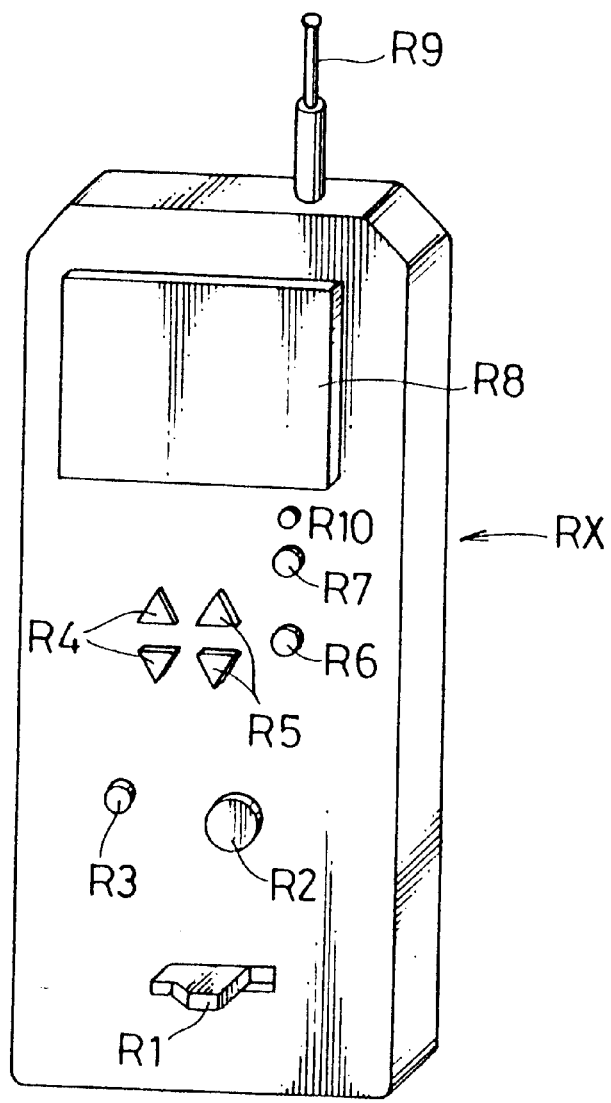

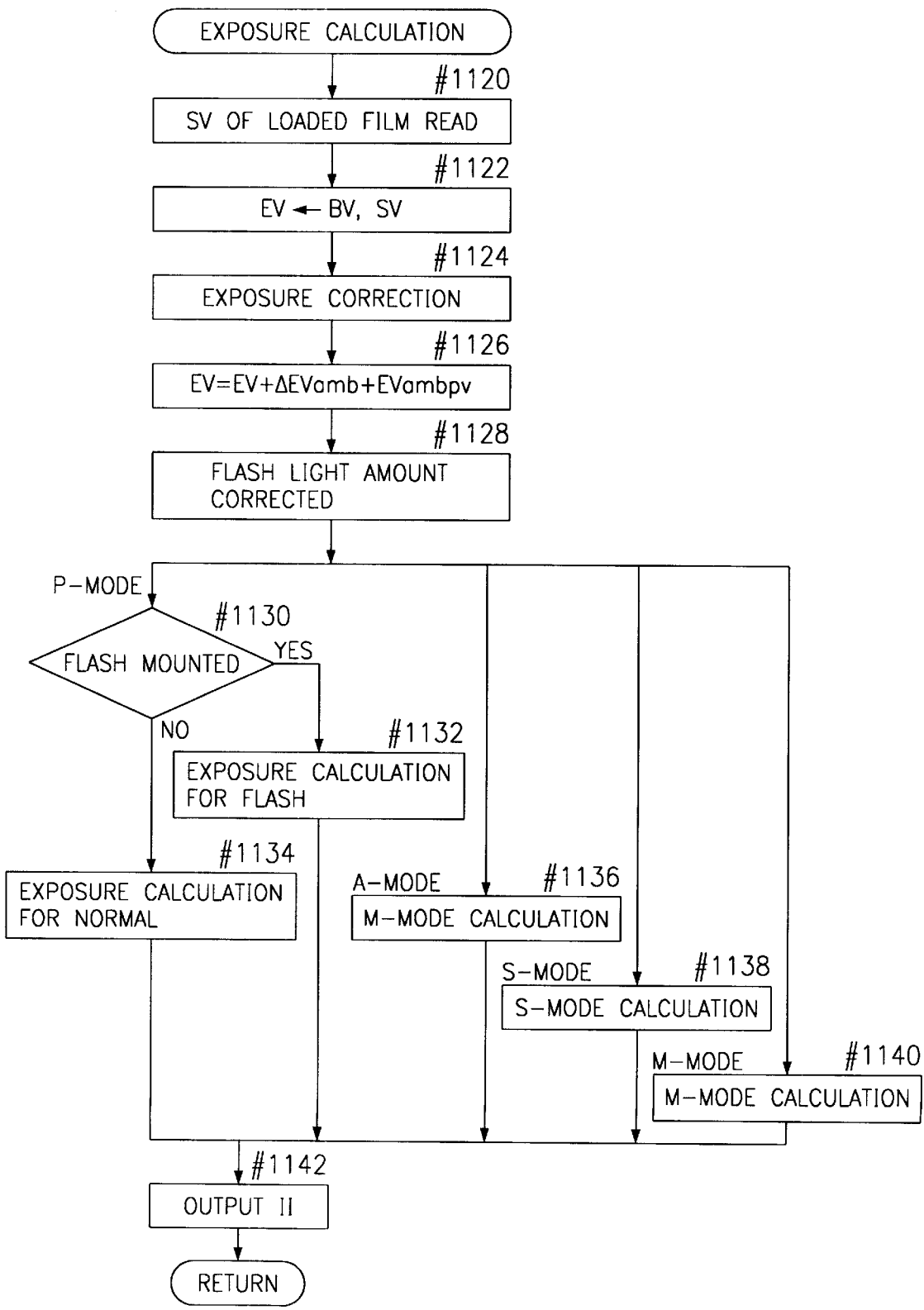

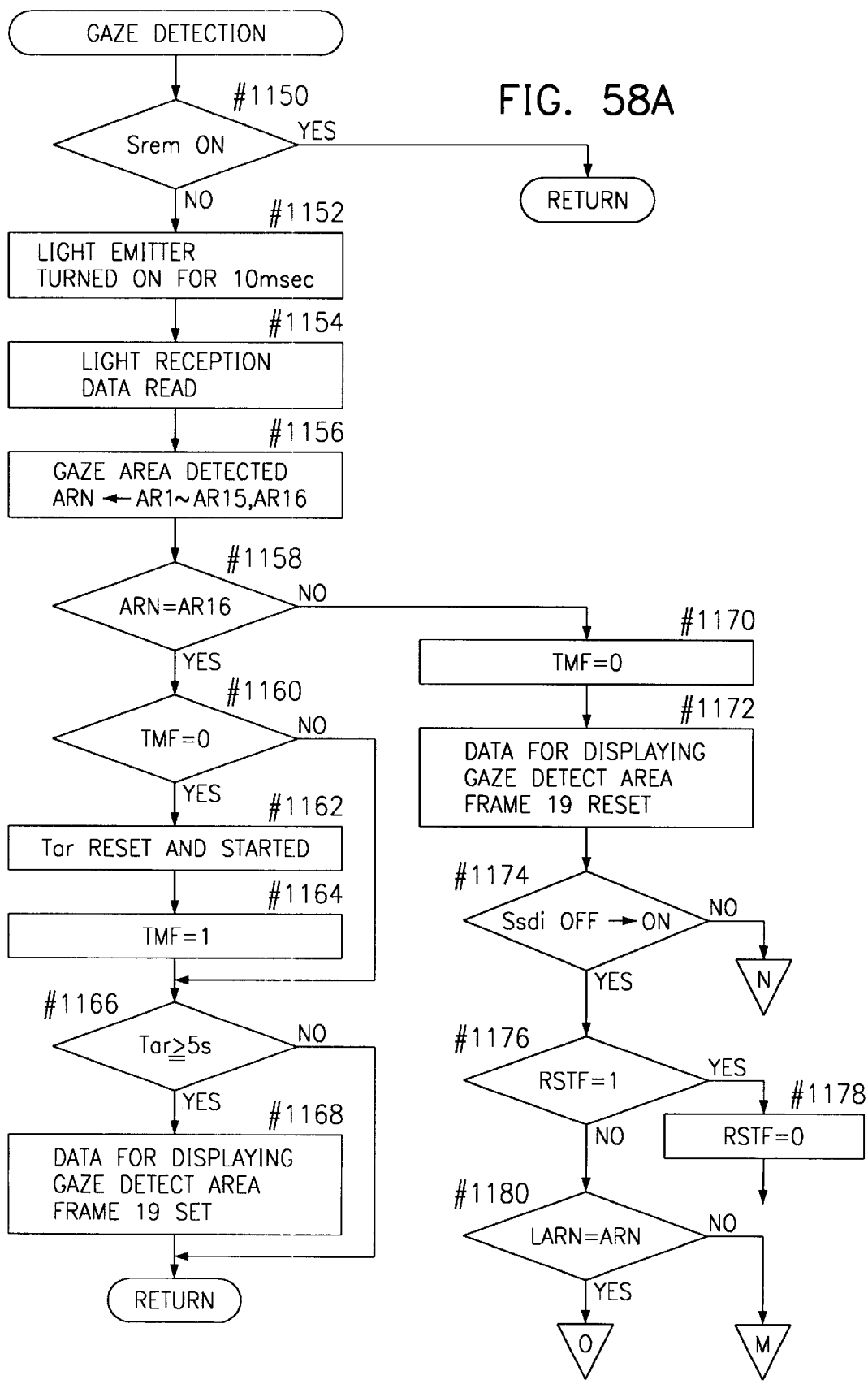

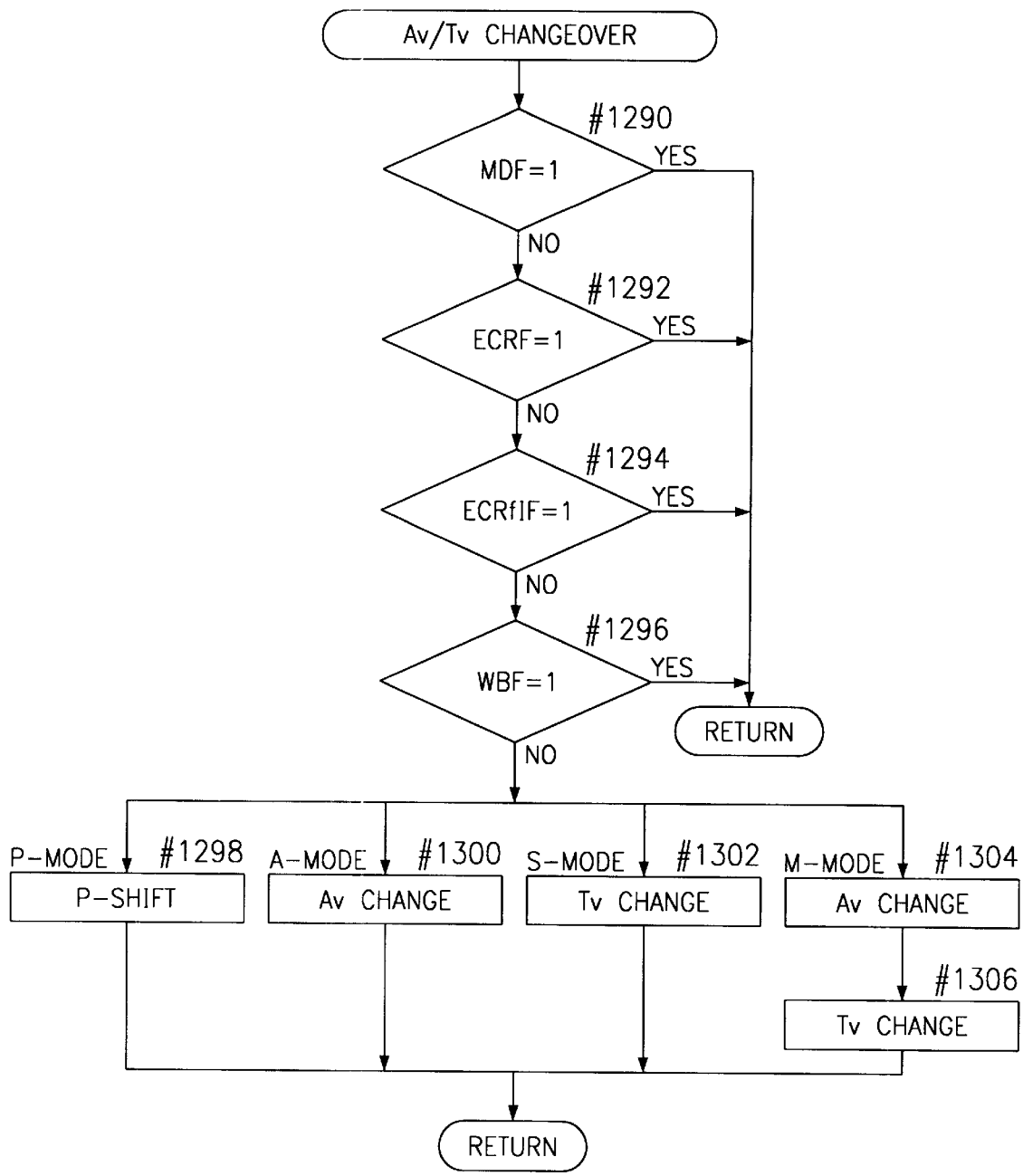

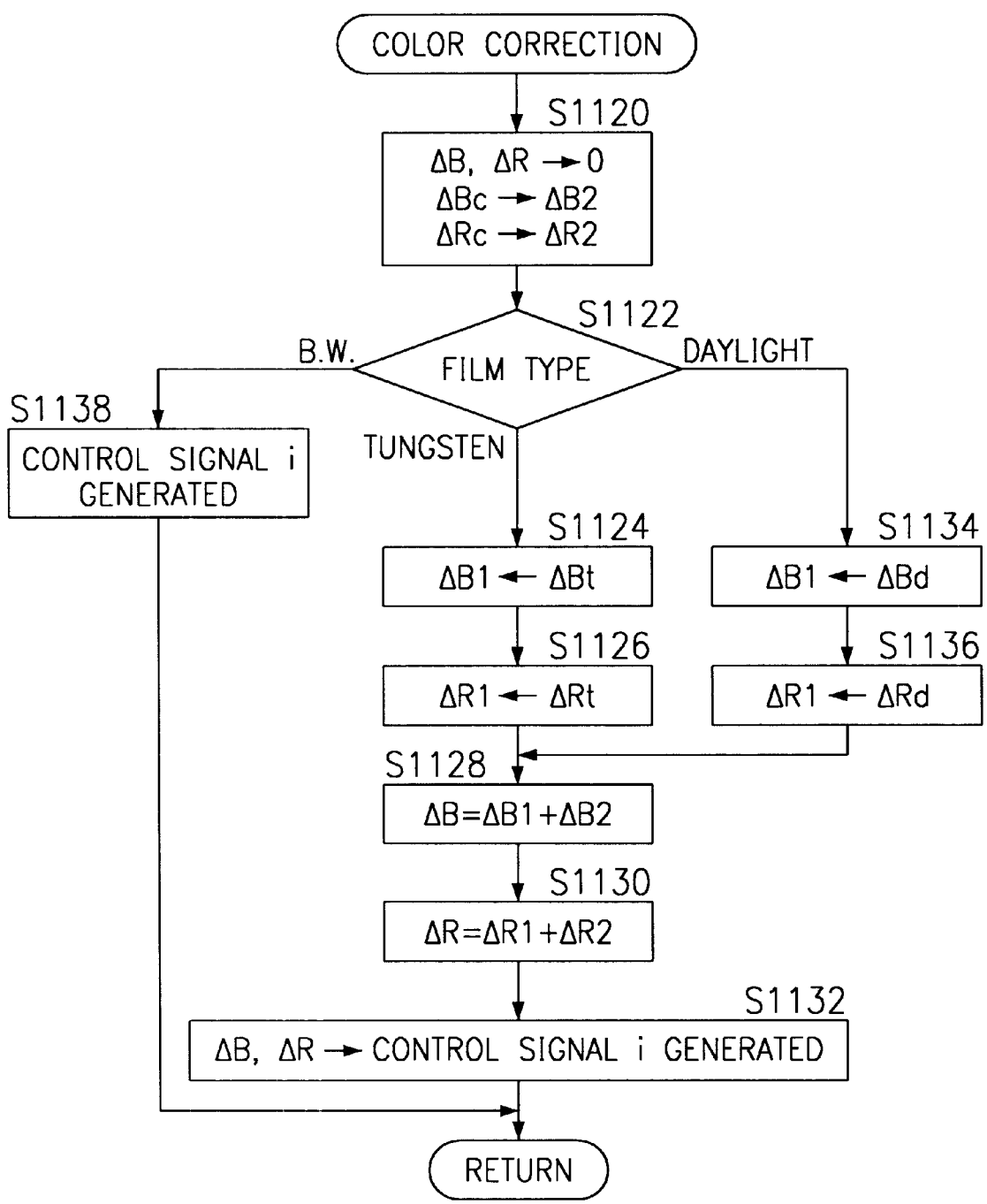

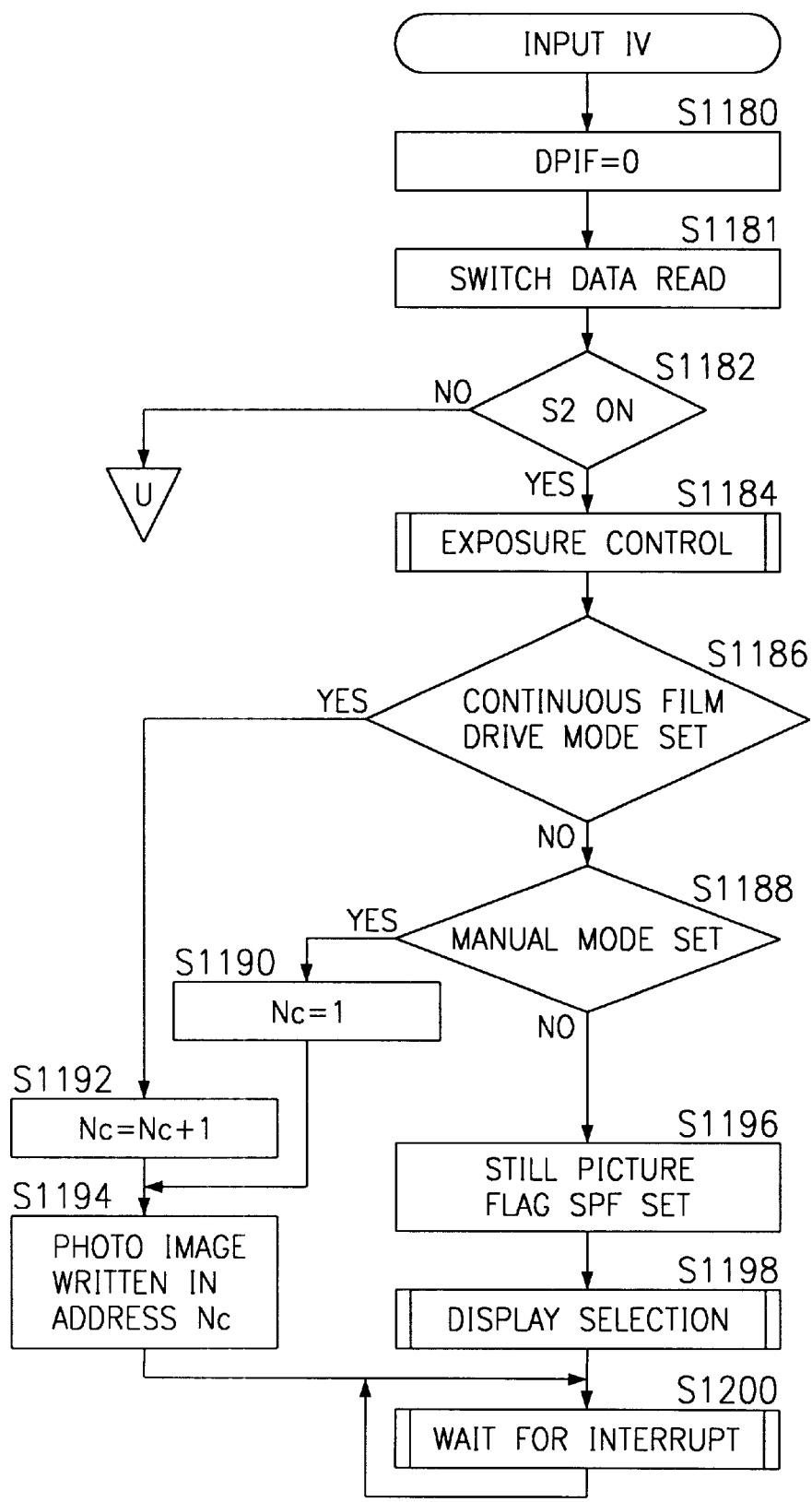

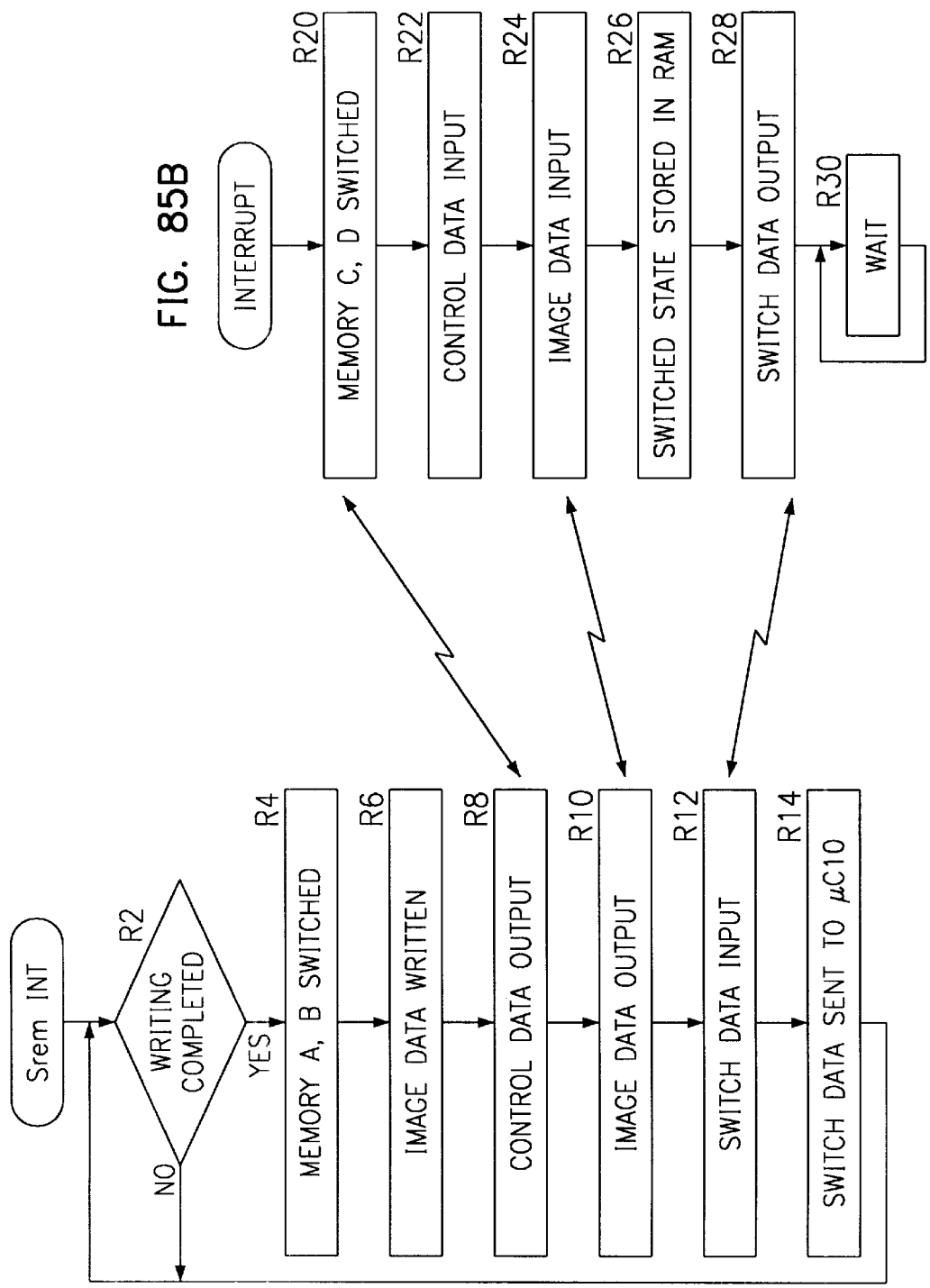

CAMERA SYSTEM INCLUDING A MONITOR DEVICE

CROSS REFERENCE TO RELATED APPLICATION

This is a continuation of U.S. patent application Ser. No. 08/572,885 filed Sep. 14, 1995, now abandoned, which is a continuation of U.S. patent application Ser. No. 08/128,557 filed Sep. 28, 1993, now abandoned.

BACKGROUND OF THE INVENTION

This invention relates to a camera system including a camera main body and a monitoring device and, particularly to a camera system which displays in the monitor an image to be photographed before a photographing operation.

Normal cameras photographing an image on a silver-salt film have been proposed to be provided with a monitor, for example, an electronic viewfinder, in which a photographed image is stored temporarily and the stored image is displayed as a still picture in an electronic viewfinder upon the operation of a photography preparation button immediately after the photographing operation. This allows a camera operator to confirm a photograph's timing, the composition of the photographed image, and the like, thereby improving the facility of the camera. Japanese Unexamined Patent Publication No. 63-284527 discloses one of these cameras.

As cameras of this type, specifically, there have been proposed the following two cameras. In one camera, consecutively photographed images in a continuous film drive mode (wherein series shooting is conducted) are stored and are displayed one by one or as a composition of a specified number of images in the form of still pictures in the electronic viewfinder after the photographing operation. In the other camera, images photographed in the continuous film drive mode are displayed as still pictures. These cameras are disclosed in Japanese Unexamined Patent Publication Nos. 3-259232 and 2-101441.

The camera disclosed in Japanese Unexamined Patent Publication No. 63-284527 displays the photographed image as a still picture according to the instruction given immediately after the photographing operation. However, this publication discloses no technique of changing a display mode of the photographed images between a motion picture mode and a still picture mode. Particularly, this publication does not concern the change of the display mode in a continuous film drive mode wherein a series shooting is automatically executed and in a single film drive mode wherein one frame of film is driven for each photographing operation.

Neither are the other two publications pertinent to the technique of changing the display mode in response to the film drive mode (continuous/single) or the instruction given before or after the photographing operation. It is not also disclosed in these publications that the photographed images are stored temporarily and are later displayed suitably as still images.

Further, there has been proposed a controller for a television camera which controls remotely the television camera to conduct a photographing operation and to display a photographed image in a monitor (Japanese Unexamined Patent Publication No. 3-88581). However, the remote controller is capable of displaying the photographed image in the monitor, but is not capable of displaying an object image to be photographed before the photographing operation.

SUMMARY OF THE INVENTION

It is an object of the present invention to provide a camera system which has overcome the above-mentioned drawbacks.

Accordingly, a camera system of the invention comprises: photographic means for photographing an image of an object; monitor means for displaying a photographed image to check the photographed image; instruction means for instructing recording of a photographed image; recording means responsive to the instruction means for recording a photographed image, the recording means having a singular recording mode of recording a photographed image each time recording is instructed by the instruction means and a continuous recording mode of recording photographed images during the time when recording is being instructed by the instruction means; and control means for controlling the monitor means so as to display a photographed image in a first displaying mode in the singular recording mode and so as to display a photographed image in a second displaying mode in the continuous recording mode, the second displaying mode being different from the first displaying mode.

With thus constructed camera system, the monitor means displays a photographed image in one way in the singular recording mode and a photographed image in another way in the continuous recording mode. This enables the photographer to select the display way suitable for each recording mode.

It may be appropriate to control the monitor means so as to display, in the singular recording mode, a photographed image which has been recorded, and so as to display, in the continuous recording mode, photographed images which are being photographed.

Also, a camera system of the invention comprises: photographic means for photographing an image of object; instruction means for instructing recording of a photographed image; recording means responsive to the instruction means for recording a photographed image, the recording means being capable of selectively executing a first recording mode and a second recording mode; selector means for selecting either the first reproducing mode or the second reproducing mode; monitor means for displaying a photographed image to check the photographed image; control means for controlling the monitor means so as to display, in the first recording mode, a photographed image automatically after the recording is completed, and so as to display, in the second recording mode, a photographed image in accordance with operator's manual instruction after the recording is completed.

In this camera system, the monitor means displays, in the first recording mode, a photographed image automatically after the recording is completed, and displays, in the second recording mode, a photographed image in accordance with operator's manual instruction after the recording is completed. This can provide the photographer with an increased number of display ways to improve the photography performance.

Further, a camera system of the invention comprises: a camera main body including photographic means for photographing an image of object; and a monitor device being separatable from the camera main body and including display means for displaying a photographed image to check the photographed image; and instruction means for instructing the photographic means of the camera main body to execute a photography for monitor.

In this camera system, the monitor device is separatable from the camera main body. The photographic means of the camera main body is remotely controlled by the monitor means.

It may be also preferable that the photographic means is provided with image pickup means for photographing an image of an object; and exposure control means for controlling exposure of the image pickup means to the object, the exposure control means being capable of executing a plurality of different exposure controls in accordance with instructions from the instruction means of the monitor device.

In this construction, an object image can be photographed by different exposure controls. Accordingly, the photographer can preview a plurality of monitor images under different exposure conditions to select an optimum exposure condition.

These and other objects, features and advantages of the present invention will become more apparent upon a reading of the following detailed description and accompanying drawings.

BRIEF DESCRIPTION OF THE DRAWINGS

FIGS. 12A and 12B are a flow chart showing a subroutine "Eye Detection";

FIG. 13 is a flow chart showing a subroutine "Exposure Calculation";

FIGS. 41A, and 41B are diagrams showing respectively the exterior of transceivers TX, RX for transmitting and receiving an image data;

FIG. 57 is a flow chart showing a subroutine "Exposure Calculation";

FIGS. 58A, and 58B are a flow chart showing a subroutine "Gaze Detection";

FIG. 63 is a flow chart showing a subroutine "AV/TV Changeover";

FIG. 76 is a flow chart showing a subroutine "Color Correction";

FIGS. 80A, 80B, and 80C are a flow chart showing a subroutine "Input IV";

FIGS. 85A, and 85B are flow charts showing controls executed by microcomputers 130, 140 of the transceivers TX, RX.

DETAILED DESCRIPTION OF THE PREFERRED EMBODIMENTS OF THE INVENTION

Figure 2:
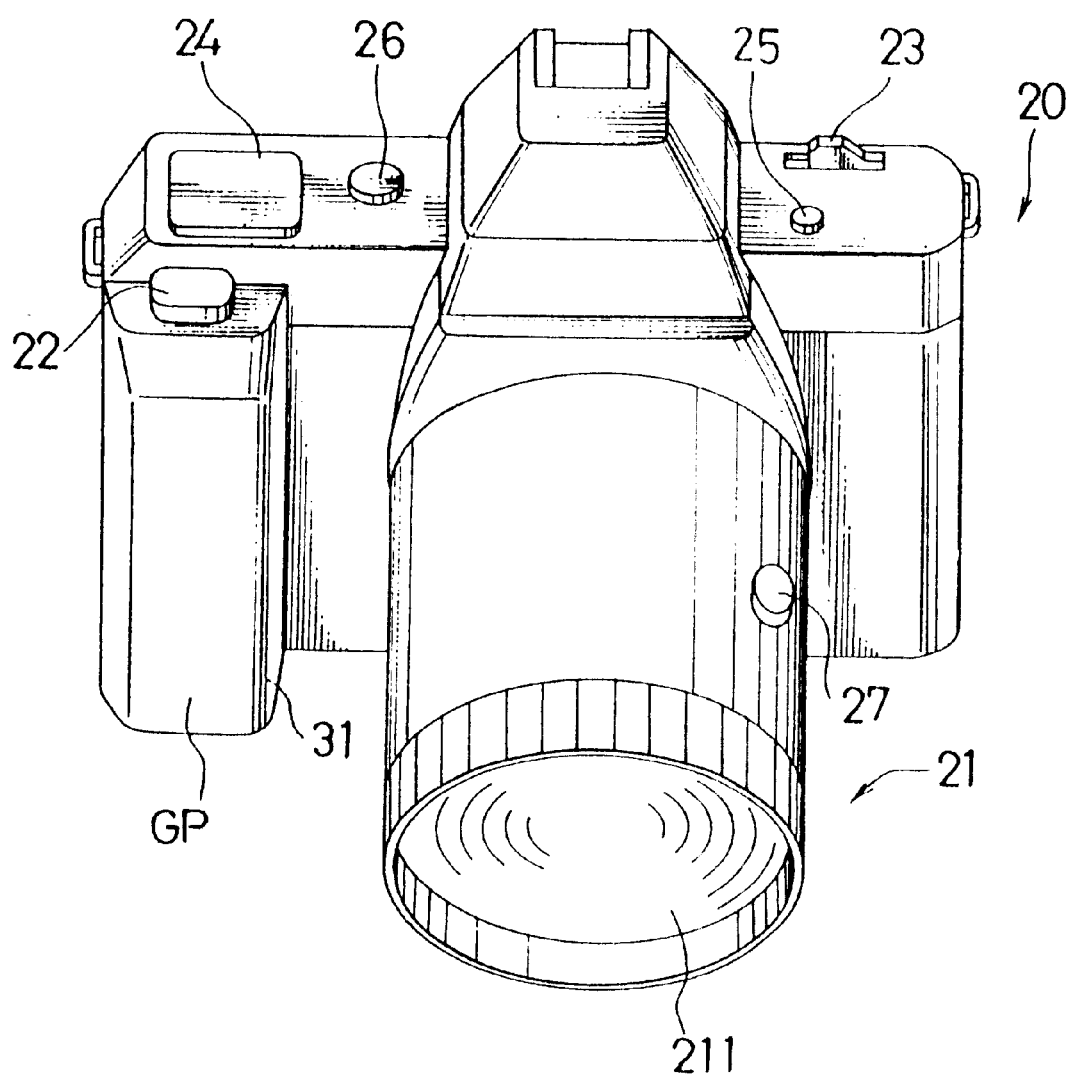
FIG. 2 is a front perspective view showing the external configuration of the first camera system.
Figure 3:
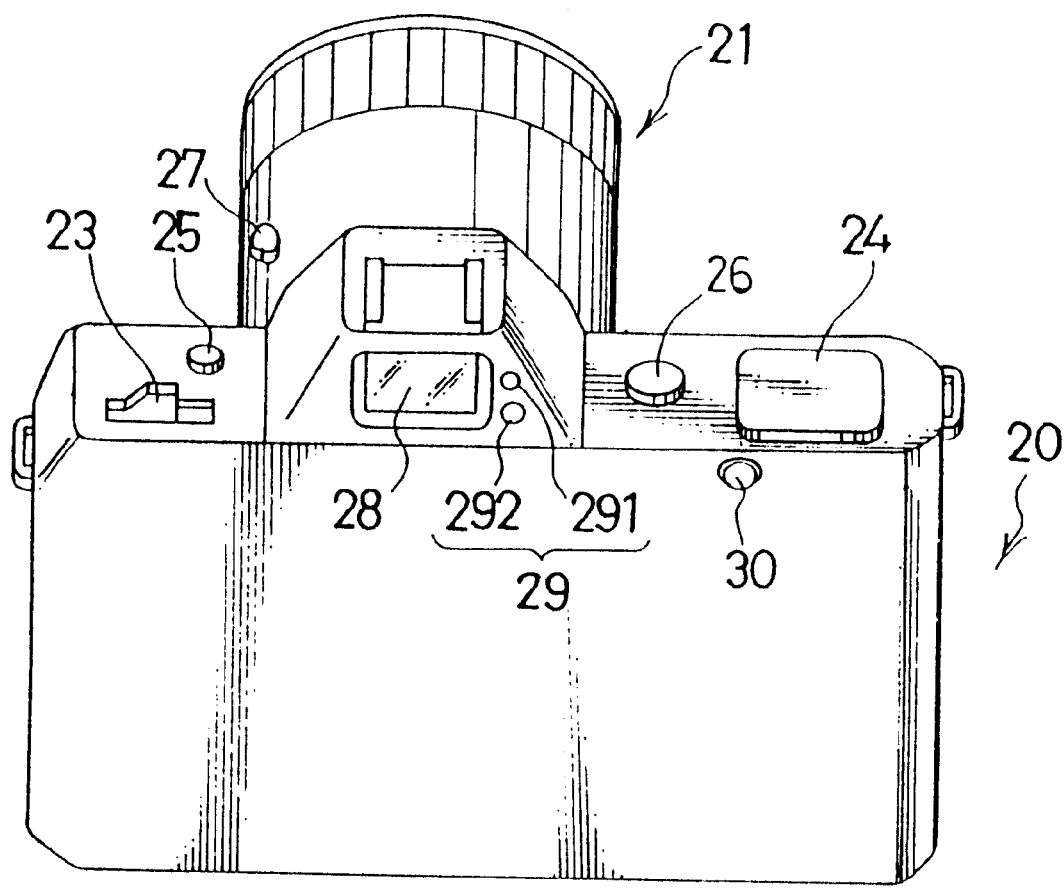
FIG. 3 is a rear perspective view showing the external configuration of the first camera system.
Figure 4:
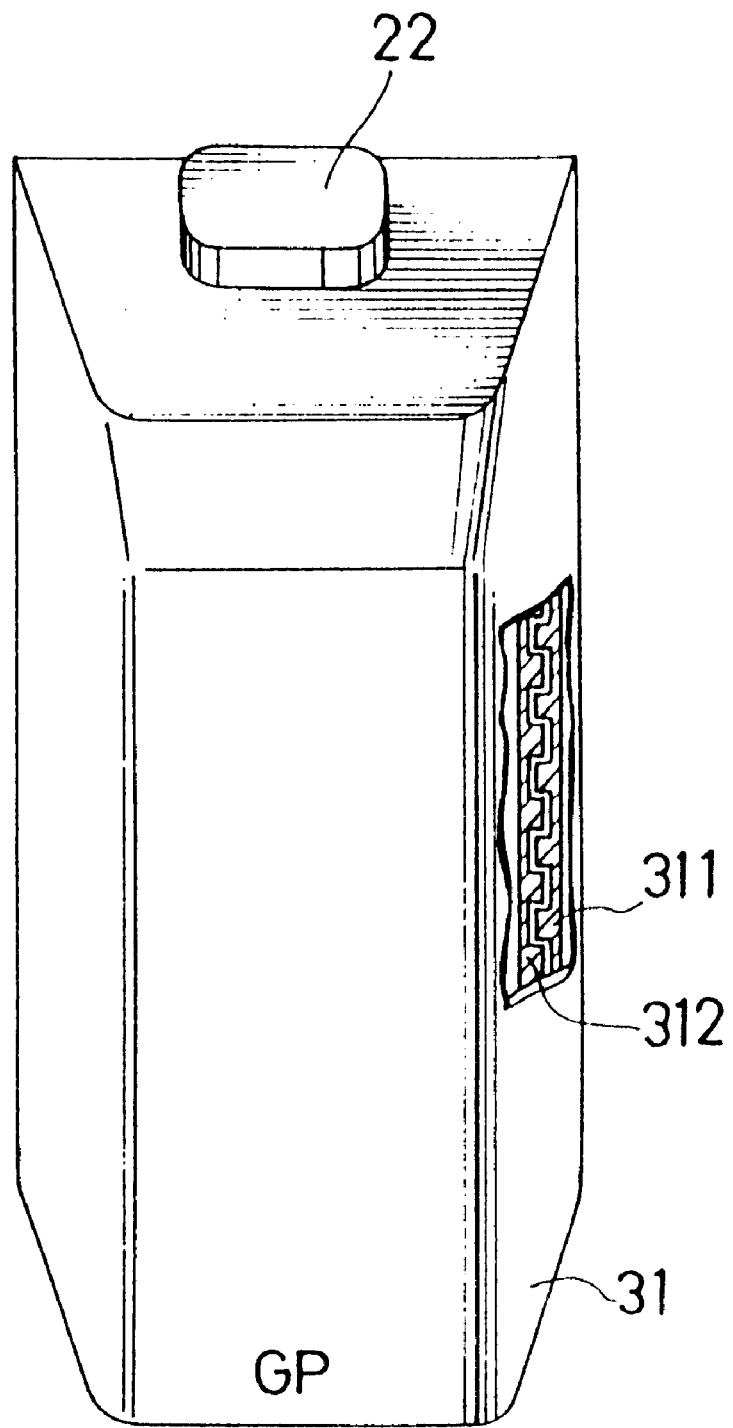
FIG. 4 is an enlarged diagram, partially in section, showing a grip GP of the first camera system.

FIGS. 2 to 4 show the external configuration of a camera according to the invention. FIG. 2 is a front perspective view of the camera; FIG. 3 is a rear perspective view thereof; and FIG. 4 shows a grip GP.

This camera includes a camera main body 20 and an integral or interchangeable taking lens unit 21. In a suitable position on one front side of the main body 20 is formed a grip GP which is held by a camera operator during a photographing operation.

Various operable members and other members are arranged on a top face of the camera main body 20. Indicated at 22 is a release button. When the release button 22 is pressed halfway to a first stage, a switch S1 for the photography preparation is turned on to start various operations including a light measurement, an exposure calculation, and an automatic focusing (AF). When the release button 22 is pressed all the way to a second stage, a switch S2 is turned on to carry out the exposure control. Indicated at 23 is a slide switch which is manipulated to change a still picture mode between an automatic still picture mode and a manual still picture mode. For example, the automatic still picture mode is set when the slide switch 23 is positioned on the left side (toward the center of the camera in the drawing of FIG. 2) while the manual still picture mode is set when it is positioned on the opposite side. Indicated at 24 is an on-body display unit including, e.g., a liquid crystal panel for displaying a shutter speed, an aperture value, and the like. Indicated at 25 is a display instruction button which, when being operated, sends an instruction signal to cause display data stored in an image memory 110 (see FIG. 6) provided in the camera main body 20 to be displayed in a monitor 47 including a color liquid crystal panel (see FIG. 6). Indicated at 26 is a memory change switch which is operated to change image signals stored in display memories 111, 112 provided in the main body 20. At the head of the main body 20 is provided a connecting structure on which a flash device (not shown) is mountable according to needs.

A preview switch 27 is provided at a suitable position on the outer surface of the taking lens unit 21. This switch 27 is operated to display in the monitor 47 an object image picked up through a diaphragm set according to a control aperture value.

As shown in FIG. 3, a viewfinder 28 as the monitor 47 is provided in an upper portion of a back face of the camera main body 20. In a position near this viewfinder 28 is provided an eye sensor 29 including a light emitter 291 such as a LED and a light receiver 292 such as a silicon photocell (SPC). The light emitter 291 and the light receiver 292 are arranged adjacent to each other. The eye sensor 29 is adapted to detect whether a camera operator is viewing through the viewfinder 28. The light projected from the light emitter 291 is reflected by the face or the eye of the camera operator viewing through the viewfinder 28, and the reflected light is detected by the light receiver 292. In this way, the eye detection is conducted.

Indicated at 30 is a gaze area setting switch for setting and resetting a gaze area within an angle of view which is determined in response to the gaze of the camera operator detected by a gaze detecting circuit 2 to be described later.

The grip GP is externally covered with a cover 31 made of resilient rubber. As shown in FIG. 4, conductive patterns 311 and 312 which are insulated from each other are arranged opposingly within the interior of the grip GP. Between the rubber 31 and the conductive patterns 311, 312 is arranged an unillustrated conductive rubber. When the camera operator presses the external cover 31 of the grip GP so as to hold the camera fast, the conductive patterns 311, 312 become conductive with each other through the conductive rubber. With this construction, the grip GP serves as a grip switch Sg.

Figure 5:
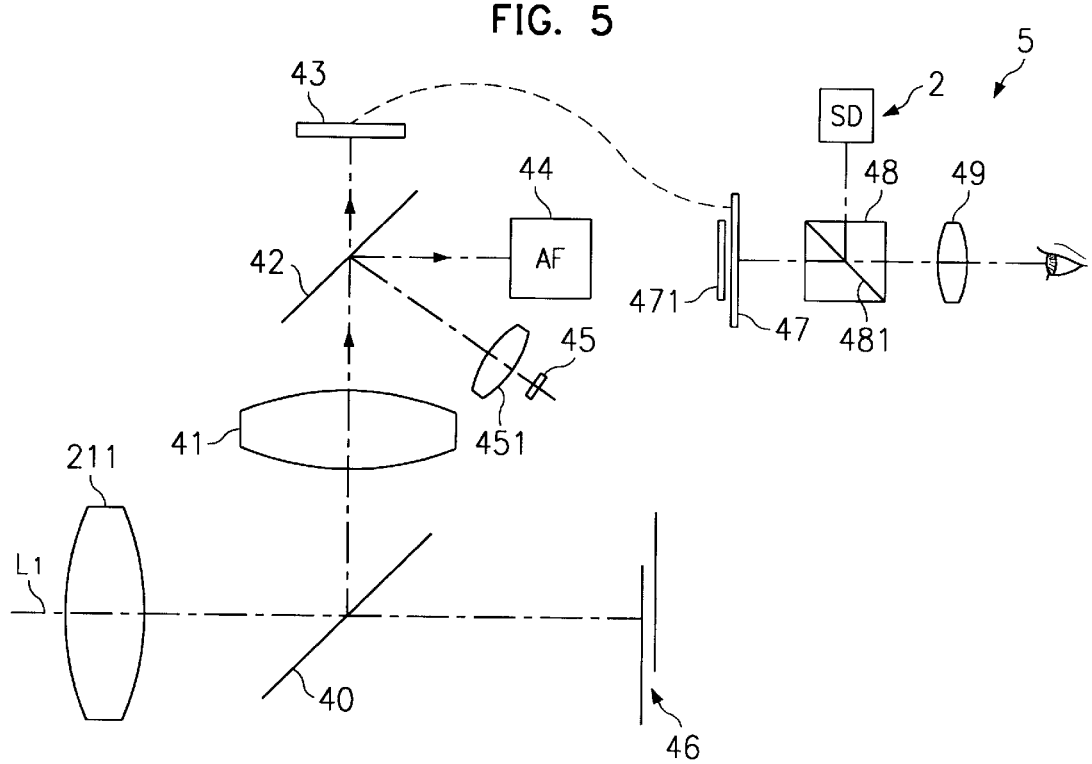
FIG. 5 is a diagram showing the internal construction of a taking lens unit and an optical system provided in a main body of the first camera system.

FIG. 5 is a diagram showing the internal construction concerning the taking lens unit 211 and an optical system provided in the camera main body 20.

In the camera main body 20 is fixedly disposed a mirror 40. This mirror 40 is a semitransparent and extremely thin pellicle mirror and is adapted to introduce a portion of a beam of light transmitted through the taking lens 211 to a CCD 43 serving as an area sensor, an AF sensor 44 and a light measuring sensor 45 through a small optical system 41 such as a lens and a semitransparent mirror 42. It is noted that the mirror 40 may be pivotable on a vertical plane to cross or parallel with an optical axis L1 of the taking lens 211. In this case the mirror 40 is normally positioned on the optical axis L1 as shown in FIG. 5, but it moves away from the optical axis L1 during the exposure control so as to introduce a light image transmitted through the taking lens 211 to a focal plane shutter 46 disposed therebehind and an unillustrated storage medium such as a film. It is noted that the mirror 40 may be fixed at one specified position.

The CCD 43 includes solid state photoelectric conversion elements arranged in the form of a matrix. On the front face of the CCD 43 are arranged red(R)-, green(G)-, and blue (B)-filters in correspondence with the photoelectric conversion elements. The light image transmitted through the semitransparent mirror 42 is picked up as a color image.

The AF sensor 44 includes an AF sensor module and detects a focus condition using, for example, a phase difference detecting method. The light measuring sensor 45 measures the brightness of the object based on the beam of light transmitted through a condenser lens 451. The structure of AF and AE areas of the AF sensor 44 and the light measuring sensor 45, respectivly, will be described after the description of the gaze detecting circuit 2.

The monitor 47 includes a two-dimensional color LCD or the like and displays an image picked up by the CCD 43 or an image stored in an image memory 110 to be described later. This monitor 47 is capable of displaying specified marks and photographing conditions such as a shutter speed Tv and an aperture value Av in a superimposed manner in addition to the images. Indicated at 471 is a back light as a light source for the monitor 47. Indicated at 49 is an eye-piece lens which allows the camera operator to view an image displayed in the monitor 47 through the viewfinder 28.

An optical member 48 has a surface 481 by which a spot light used to detect the gaze is reflected and through which a light representative of the image from the monitor 47 is transmitted.

The gaze detecting circuit 2 is provided to detect the gaze of the camera operator viewing through the viewfinder 28, and includes an infrared LED, a semitransparent mirror for changing a return optical path from a forward one, and an infrared area sensor. The infrared area sensor is divided into areas AR1 to AR16 to be described later. The use of the infrared ray is intended to avoid the influence of the available light. The gaze of the camera operator is determined based on by which gaze area in the infrared area sensor the light projected from the infrared LED and reflected by the eye of the camera operator is received. The above detection may be made using a known gaze detection method which uses a first Purkinje image or first and fourth Purkinje images, or other known method.

Figure 7:
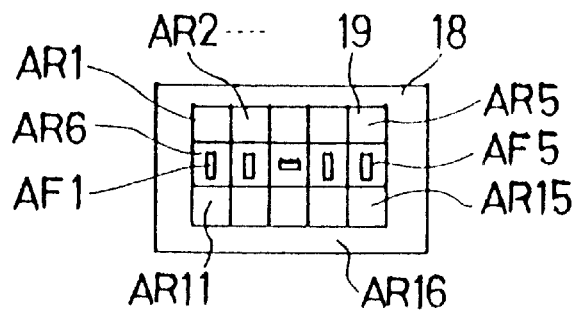
FIG. 7 is a diagram showing gaze areas, sensing areas of an AF sensor and a light measuring sensor corresponding to the gaze areas.

FIG. 7 is a diagram showing gaze areas, sensing areas of the AF sensor 44 and the light measuring sensor 45 corresponding to the gaze areas. Indicated at 18 is a picture frame within which an image to be photographed lies, and at 19 is a gaze detection area frame.

As shown in FIG. 7, the gaze detection area frame 19 is used to indicate a range within which the gaze is detectable. The frame 19 is located substantially at the center of the picture frame 18, and the area of the former frame to that of the latter frame is 1:2. The area in the frame 19 is equally divided by three in a vertical direction and equally divided by five in a horizontal direction, thereby forming fifteen equal-sized rectangular gaze areas. The gaze detection is made by determining which one of the first to fifteenth gaze areas (AR1 to AR15) has received the light reflected by the eye of the camera operator. An area AR 16 is an area within the picture frame 18 but outside the gaze detection area frame 19.

Sensing areas AF1 to AF5 of the AF sensor 44 for detecting the focus condition are arranged at positions corresponding to the gaze areas AR6 to AR10 on the second row. Only the center AF area is placed horizontally, but all the other AF areas are placed vertically. Sensing areas AE1 to AE15 (not shown) of the light measuring sensor 45 for detecting the brightness of the object are arranged at positions corresponding to the gaze areas AR1 to AR15.

Figure 8:
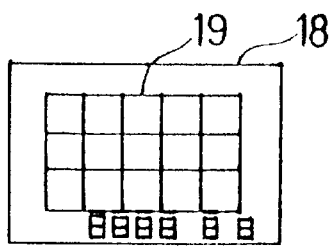
FIG. 8 is a diagram showing marks and the like which can be displayed in the monitor.

FIG. 8 is a diagram showing various marks which can be displayed in the monitor 47. The gaze detection area frame 19 and the frames for the respective gaze areas AR1 to AR16 are displayable in the monitor 47. Below the gaze detection area frame 19 are provided two display regions: the one including display segments of four figures for displaying the shutter speed Tv and the others including display segments of two figures for displaying the aperture value Av.

Figure 9:
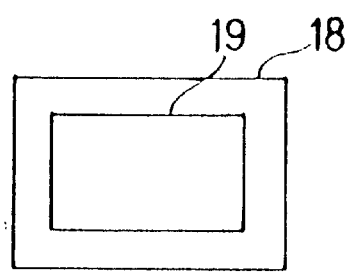
FIG. 9 is a diagram showing a state where a gaze detection area frame is displayed in the monitor.
Figure 10:
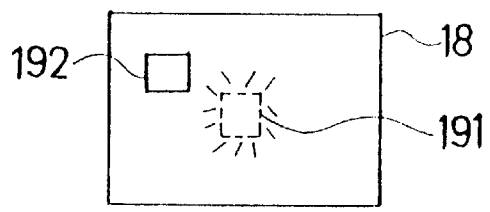
FIG. 10 is a diagram showing a state where a gaze area is displayed in the monitor.

FIG. 9 is a diagram showing a state where the gaze detection area frame 19 is displayed in the monitor 47. FIG. 10 is a diagram showing a state where the gaze area is displayed in the monitor 47. In accordance with the gaze detection result, the gaze detection area frame 19 is displayed (as shown in FIG.9) or the frame representative of the detected gaze area AR (as shown in FIG. 10). In FIG. 10, the gaze area AR represented by broken line 191 and displayed on and off is the gaze area AR presently detected by the gaze area detecting circuit 2 and the gaze area AR represented by solid line 192 and displayed on is the gaze area AR manually set through the gaze area setting switch 30 out of the detected gaze areas AR. When both areas overlap, this overlapping area is displayed, for example, on and off. The AF and AE operations are carried out for the gaze area AR represented by the solid line 192.

Figure 1:
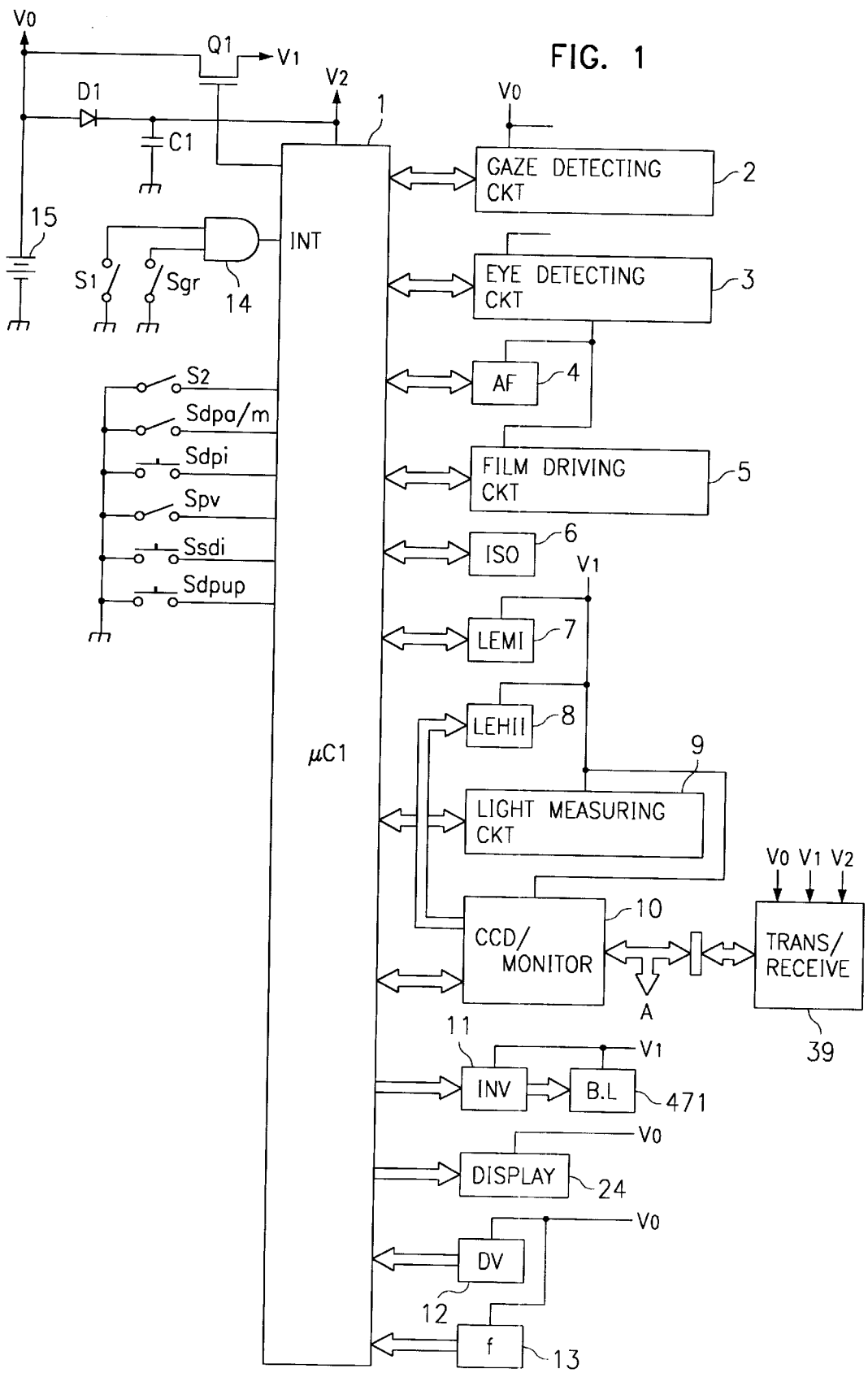
FIG. 1 is a circuit block diagram of a camera system as a first embodiment of the invention.

FIG. 1 is a circuit block diagram showing the camera provided with the monitor according to the invention.

In this figure, indicated at 1 is a microcomputer ($\mu$C1). The microcomputer 1 receives signals from various switches and operable members and signals representative of images picked up by the CCD 43, and executes various calculations and a sequence control for an overall camera in accordance with a program prewritten in an internal ROM (not shown).

A power supply 15 includes an electric battery or the like and supplies a voltage V0 to specified circuits. Between the power supply 15 and the microcomputer 1 are provided a rectifier diode D1 and a back-up capacitor C1. A switch Q1 is, for example, a CMOS transistor which is turned on and off in accordance with a control signal from the microcomputer 1, thereby supplying a voltage V1 to specified circuits.

An eye detecting circuit 3 includes the aforementioned eye sensor 29. A focus condition detecting circuit 4 (indicated at AF in FIG. 1) detects a focus condition in each AF area in accordance with the signal obtained by the AF sensor 44 and outputs the detection data to the microcomputer 1. A film driving circuit 5 drives a film in synchronously with the exposure control and resets the mechanisms for conducting the photographing operation (in this case the focal plane shutter) to their initial positions. A film sensitivity reading circuit 6 (indicated at ISO in FIG. 1) reads film sensitivity data provided on a film or a cartridge in which the film is loaded with the use of an optical, electrical or magnetic means. A LEMI 7 is a lens driving circuit for driving the lens for focusing, and a LEMII 8 is a lens driving circuit for driving the lens to correct the camera shake. These lens driving circuits drive the lens through a mount portion between the camera main body 20 and the taking lens 211. A light measuring circuit 9 obtains light measurement data for each AE area in accordance with the detection signal from the light measuring sensor 45 and outputs the obtained data to the microcomputer 1.

A CCD/monitor unit 10 includes the CCD 43, a microcomputer ($\mu$C2) 100 for processing an image signal picked up by the CCD 43, a memory for storing a processed signal and the monitor 47 for color-displaying the data. The circuit 10 will be described in detail later.

An inverter 11 (indicated at INV in FIG. 1) is a dc-to-ac inverter for converting a dc voltage V1 into an ac voltage of a specified level so as to supply an ac voltage to the back light 471 when the monitor 47 is a LCD. An encoder 12 (indicated at DV in FIG. 1) includes a bit mark member carrying bit marks which are, for example, representative of positions, and a reader for reading the information of each bit on the bit mark member. The bit mark member and the reader are arranged respectively at a stationary side and a rotatable side of the taking lens unit 21 so as to be opposed to each other. The encoder 12 outputs distance information, based on a projected amount from the taking lens unit 21, as coded data. An encoder 13 (indicated at f in FIG. 1) includes a bit mark member and a reader similar to the encoder 12. These members are arranged respectively at the stationary side and a side of a zooming lens of the taking lens unit 21. The encoder 13 outputs focal length information as coded data. An AND circuit 14 has one input terminal thereof connected to the switch S1 and the other input terminal thereof connected to the grip switch Sg. An output terminal of the AND circuit 14 is connected to an interrupt terminal INT of the microcomputer 1.

There will be described next various switches.

S1

The switch S1 is turned on when the release button 22 is pressed to the first stage, thereby starting various operations such as the AE and AF calculations to prepare for the photographing operation.

S2

The switch S2 is turned on when the release button 22 is pressed to the second stage, thereby starting an exposure control to carry out the photographing operation.

Sdpa/m

The switch Sdpa/m is provided to change a still picture mode between an automatic still picture mode and a manual still picture mode, and corresponds to the slide switch 23 shown in FIG. 2. In the automatic still picture mode, the pictures displayed in the monitor 47 are changed automatically from animated pictures to still pictures after the photographing operation when the single shooting is conducted. In the manual still picture mode, the photographed image is picked up by the CCD 43 and is stored in the image memory 110 temporarily and the stored image is displayed as a still picture in the monitor 47 through the manual operation after the photographing operation.

Switch Sdpi

The switch Sdpi is provided to display as a still picture the image stored in the image memory 110 during the photographing operation, and corresponds to the display instruction button 25.

Switch Spv

The switch Spv is provided to display in the monitor 47 the image picked up through the diaphragm set at a control aperture value, and corresponds to the preview switch 27 shown in FIG. 2.

Switch Ssdi

The switch Ssdi is provided to set and reset the gaze area detected by the gaze detecting circuit 2, and corresponds to the gaze area setting switch 30.

Switch Sdpup

The switch Sdpup is provided to change sequentially the images stored in the display memories, and corresponds to the memory change switch 26.

Figure 6:
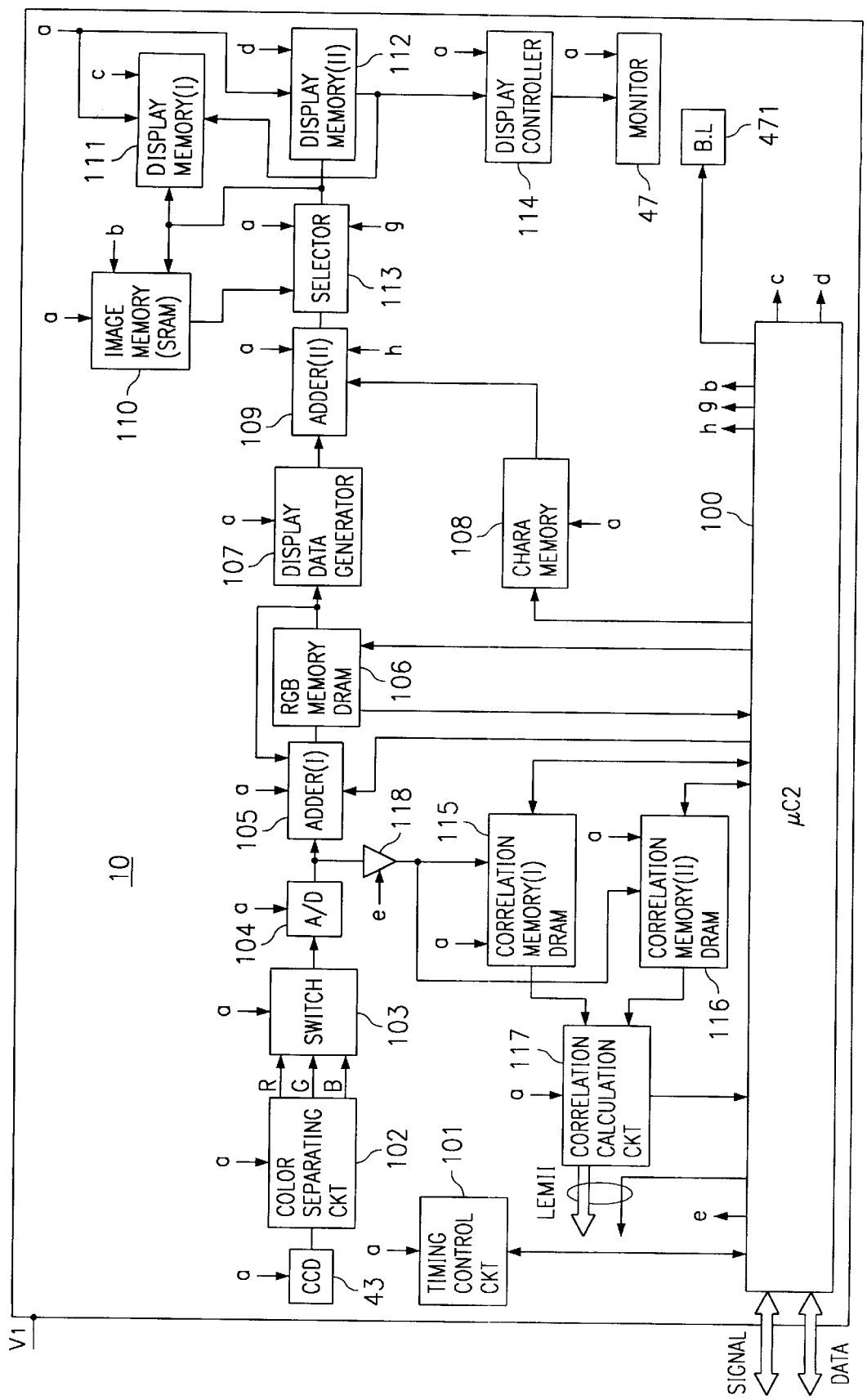
FIG. 6 is a circuit construction diagram showing a CCD/monitor unit of the first camera system.

FIG. 6 is a circuit construction diagram of the CCD/monitor unit 10.

The CCD/monitor unit 10 is provided internally within the CCD/monitor unit 10. The microcomputer 100 sends command signals and control signals to respective circuits in the CCD/monitor unit 10 and conducts data communication with the microcomputer 1 upon the receipt of a command from the microcomputer 1.

The CCD 43 includes, for example, 400×600 (240,000) photoelectric conversion elements arranged in the form of a matrix.

A timing control circuit 101 outputs a timing signal a to the specified circuits upon the receipt of the control signal from the microcomputer 100. A color separating circuit 102 separates the image signal picked up by the CCD 43 into three color image signals of red, green, and blue. A switcher 103 outputs selectively the respective color image signals to an A/D converter 104 in accordance with the timing signal a. The A/D converter 104 converts the received analog image signal into a digital signal.

An adder(I) 105 adds an output signal of the A/D converter 104 and a signal from a RGB memory 106 in such a manner as to be described later and outputs the resultant to the RGB memory 106. The adder(I) 105 is also capable of sending the output signal of the A/D converter 104 directly to the RGB memory 106 without performing the addition if necessary. The RGB memory 106 includes a D-RAM or like storage medium and stores the image signal output from the adder(I) 105. A display data generator 107 processes the image signal stored in the RGB memory 106 into an image signal representative of data displayable in the monitor 47. A character memory 108 stores characters including letters, frames, gaze area marks which are displayed in the monitor 47, and outputs a designated character signal in accordance with the command from the microcomputer 100. An adder (II) 109 adds and outputs the image signal from the display data generator 107 and the character signal from the character memory 108.

The image memory 110 includes a S-RAM or the like for storing the picked up image to be displayed. The image memory 110 has a capacity of storing a plurality of images, each image consisting of 60,000 pixels (bytes). Each of the display memories 111, 112 includes a S-RAM or the like having a storage capacity of 60,000 bytes, and stores temporarily the image to be displayed in the monitor 47. The images to be displayed are stored alternately in the display memories 111, 112 so that the images can be displayed continuously. The stored images are read repeatedly at a given speed and are introduced to the monitor 47. A selector 113 can alternatively display in the monitor 47 the image generated by the display data generator 107 and the actually photographed image which is stored in the image memory 110. A display controller 114 generates and sends an operation signal to the monitor 47 in accordance with the image signal output from the display memory 111 or 112.

Correlation memories 115 and 116 include a D-RAM each and stores a specific part, e.g., a central part, of the picked up image. A correlation calculating circuit 117 calculates correlation between two images upon the receipt of the image signals from the correlation memories 115 and 116 so as to obtain a camera shake amount, and drives the LEMII 8 based on the obtained camera shake amount to correct image shake. A digital gain controller circuit 118 amplifies an input signal digitally with a gain set in accordance with a control signal e.

The operation of the camera will be described hereafter. With the reference to FIGS. 11 to 19, a control operation carried out by the microcomputer 1 will be described.

Various flags will be first described. TABLE-1 below shows contents of states when the respective flags are set or reset.

TABLE 1

| FLAG | SET | RESET |
|---|---|---|
| SGRF | EYE DETECTED | EYE NOT DETECTED |
| TMF | TIMER ON | TIMER OFF |
| RSTF | AREA CANCELED | AREA NOT CANCELED |
| ARF | AREA DESIGNATED | AREA NOT DESIGNATED |
| AFEF | IN-FOCUS CONDITION OBTAINED | IN-FOCUS CONDITION NOT OBTAINED |
| DIF | DISPLAY MEMORY I USED | DISPLAY MEMORY II USED |
| SPF | STILL PICTURE MODE ON | ANIMATED PICTURE MODE ON |

An eye flag SGRF is indicative of whether or not a camera operator eye, has been detected. A timer flag TMF is reset at a specified period after no gaze area is detected. A gaze area reset flag RSTF is set when the designated gaze area is canceled. A gaze area flag ARF is set when a gaze area is designated. An in-focus flag AFEF is set when an in-focus condition is attained. A flag DIF is set when the display memories 111, 112 are used. A still picture flag SPF is set when the still picture mode is on. A flag SPIF is a control flag for inputs and outputs of the display memories 111, 112. Throughout this specification, the flag is set when it is set at 1, whereas it is not set when it is set at 0.

Figure 11:
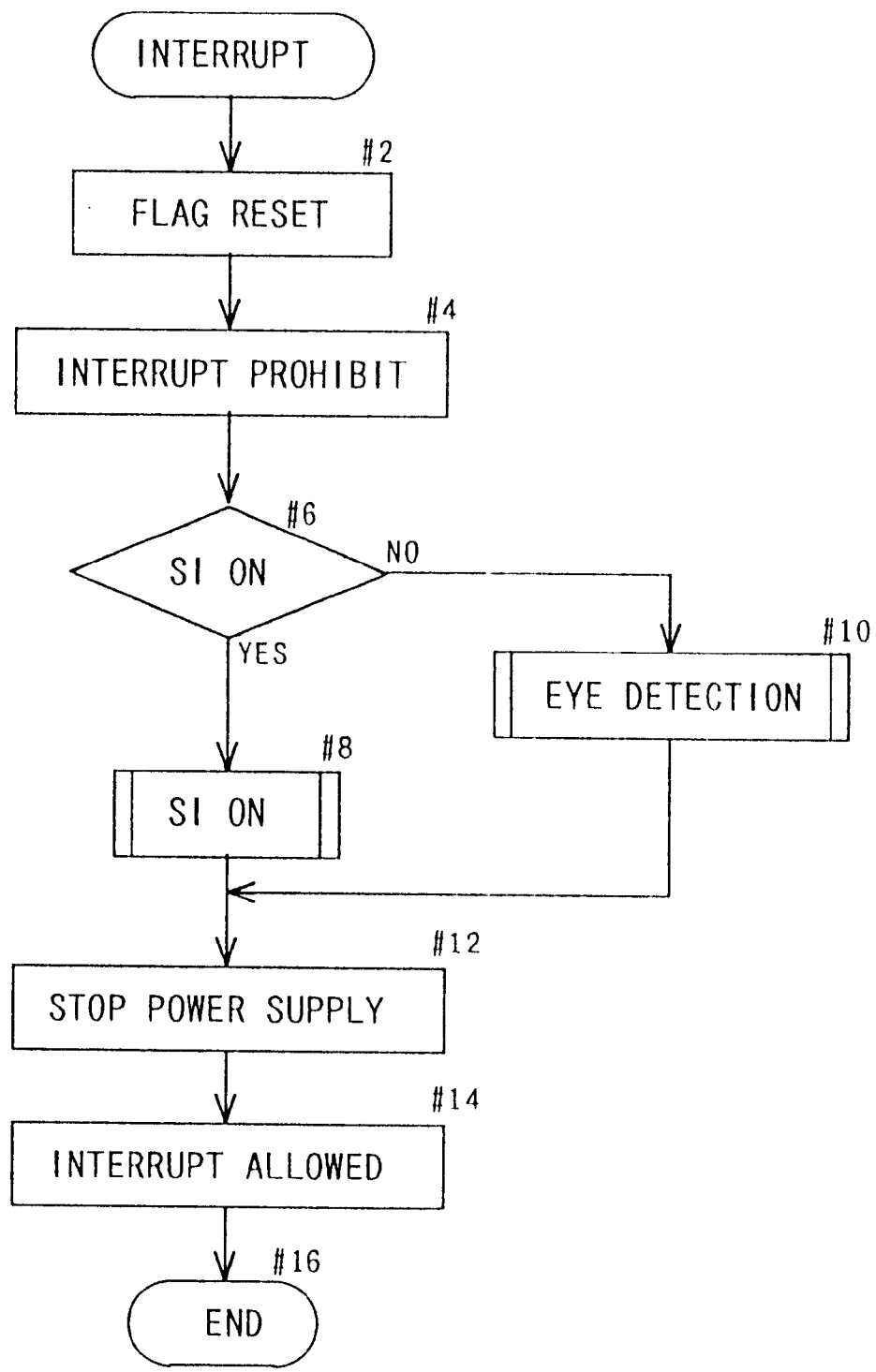
FIG. 11 is a flow chart showing an interrupt routine executed when a switch S1 or grip switch Sg is turned on in the first camera system.

FIG. 11 is a flow chart showing an interrupt routine executed when the switch S1 or the grip switch Sg is turned on.

When the interruption is made by turning on the switch S1 or Sg, the microcomputer 1 resets all the flags in Step #2 and prohibits any interrupt to this routine in Step #4. It is then discriminated whether this interruption is made by turning on the switch S1 in Step #6. This routine proceeds to a subroutine "S1 ON" (Step #8) if the switch S1 has been turned on, while proceeding to a subroutine "Eye Detection" if the grip switch Sg has been turned on (Step #10). Subsequently, the transistor Q1 is turned off so as to stop the power supply to the CCD/monitor unit 10 or the like in Step #12; an interrupt to this routine is allowed in Step #14; and this routine ends.

Figure 12B:
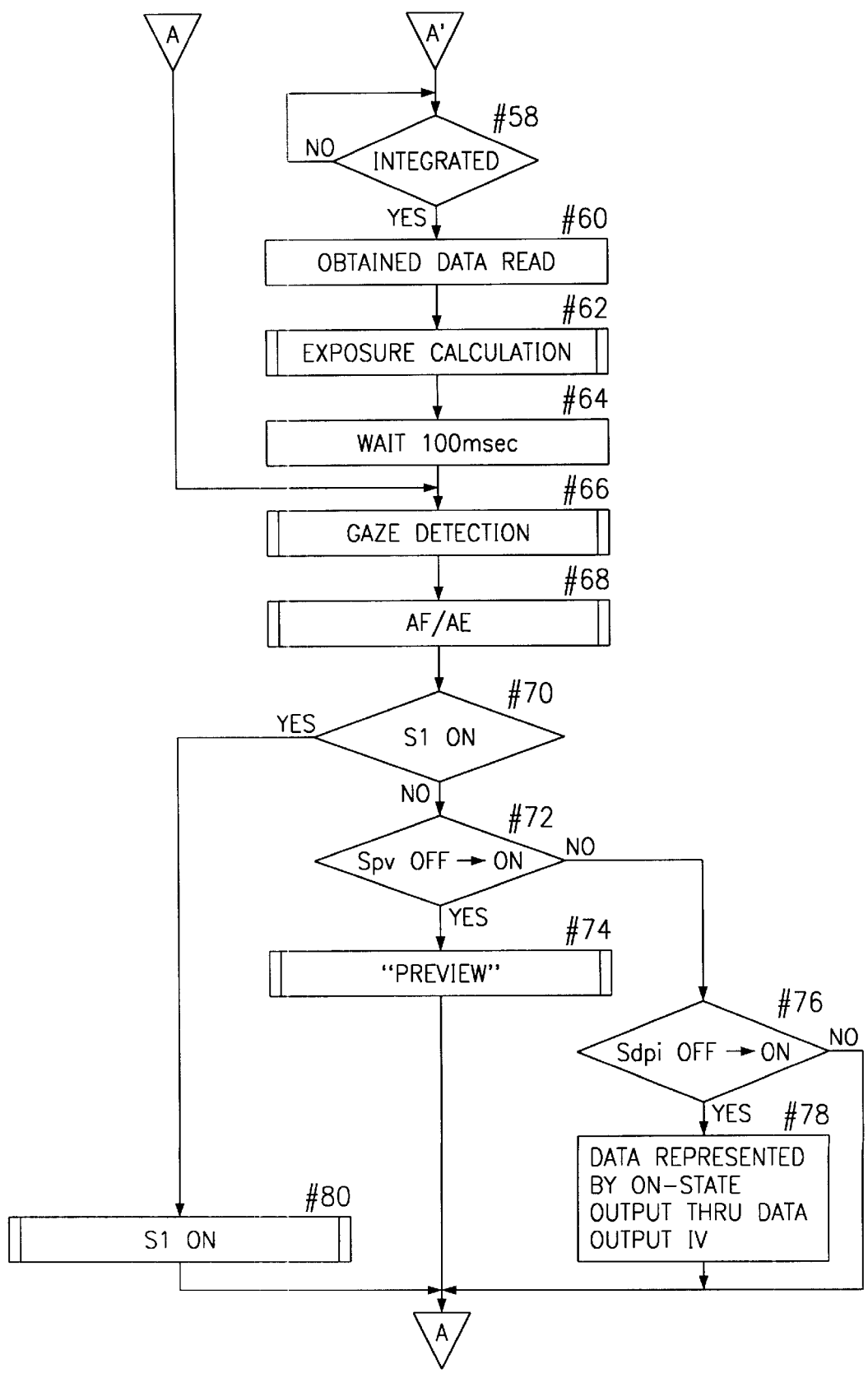

FIGS. 12A and 12B are a flow chart showing the subroutine "Eye Detection."

It is first discriminated whether an eye has been detected by checking the state of the eye flag SGRF in Step #30.

Unless detected (SGRF=1) a count value N for measuring a time is reset to "0" in Step #32 and the eye flag SGRF is set to indicate that this subroutine is carried out for the eye detection in Step #34. The light emitter 291 of the eye sensor is turned on for 10 msec in Step #36 and a data from the light receiver 292 during this period is read in Step #38. The presence or absence of the light reception data is discriminated in Step #40. If no light reception data is detected, the count value N is incremented by one in Step #42 and it is discriminated whether N=Kn in Step #44. Kn is a value corresponding to 2 seconds. If N=Kn, the eye flag SGRF is reset on the lapse of 2 seconds in Step #46, and this subroutine returns. On the other hand, this subroutine proceeds to #36 if N≠Kn.

If the light reception data is detected in Step #40, it is judged that the camera operator is viewing through the viewfinder 28 and the transistor Q1 is turned on to supply the power to various circuits in Step #48. After waiting for 10 msec until the light measuring circuit 9 is stabilized (Step #50), the light measurement data is read in Step #52. The read light measurement data is output to the CCD/monitor unit 10 through a data output I in Step #54 and a provisional focal condition detection AF1 is carried out in Step #56. Subsequently, the light energy received by the CCD 43 is integrated for a period set based on the light measurement data in Step #58 and the obtained data is read in Step #60. In Step #62, an exposure calculation is carried out based on the light measurement data obtained in Step #52. Concurrently, a signal representative of the completion of the first integrating operation is sent from the CCD/monitor unit 10 to the microcomputer 1. Upon the completion of the exposure calculation, 100 msec is allowed to lapse in Step #64.

The provisional focus condition detection AF1 in Step #56 is carried out to attain the in-focus condition for a given AF area before the AF area is set as a result of the gaze detection or manual section. The focus condition detection results in the areas AF1 to AF5 being read from the AF circuit 4, and the taking lens 211 driven in accordance with a specified area setting algorithm. This area setting algorithm may be the one which attains an in-focus condition for the object lying closest to the camera.

FIG. 13 is a flow chart showing a subroutine "Exposure Calculation."

Firstly, in this subroutine, the film sensitivity SV of the loaded film is read by the film sensitivity reading circuit 6 in Step #90. Using the read sensitivity SV together with a fully open aperture value (Av0) written in the ROM provided in the taking lens unit 21 and the light measurement value BV as parameters, a shutter speed Tv and an aperture value Av are obtained in accordance with a predetermined program curve in Step #92. Thus, obtained data are output to the CCD/monitor unit 10 through a data output II in step #94.

TABLE-2 below shows output systems for various data.

TABLE 2

| | oI | oII | oIII | oIV |
|---|---|---|---|---|
| 1 BV | ○ | | | |
| 2 Av DISPLAY | | ○ | | ○ |
| 3 Tv DISPLAY | | ○ | | ○ |
| 4 AREA FRAME DISPLAY | ○ | | ○ | |
| 5 CURSOR POSITION DISPLAY | | | ○ | |
| 6 FOCAL LENGTH | | | | ○ |
| 7 SERIES/SINGLE SHOOTING | | | | ○ |
| 8 SWITCH INFORMATION | ○ | | ○ | ○ | where oI, oII, oIII, oIV denote data outputs I, II, III, IV.

Referring back to FIG. 12B, the gaze detection is conducted in Step #66.

Figure 14A:
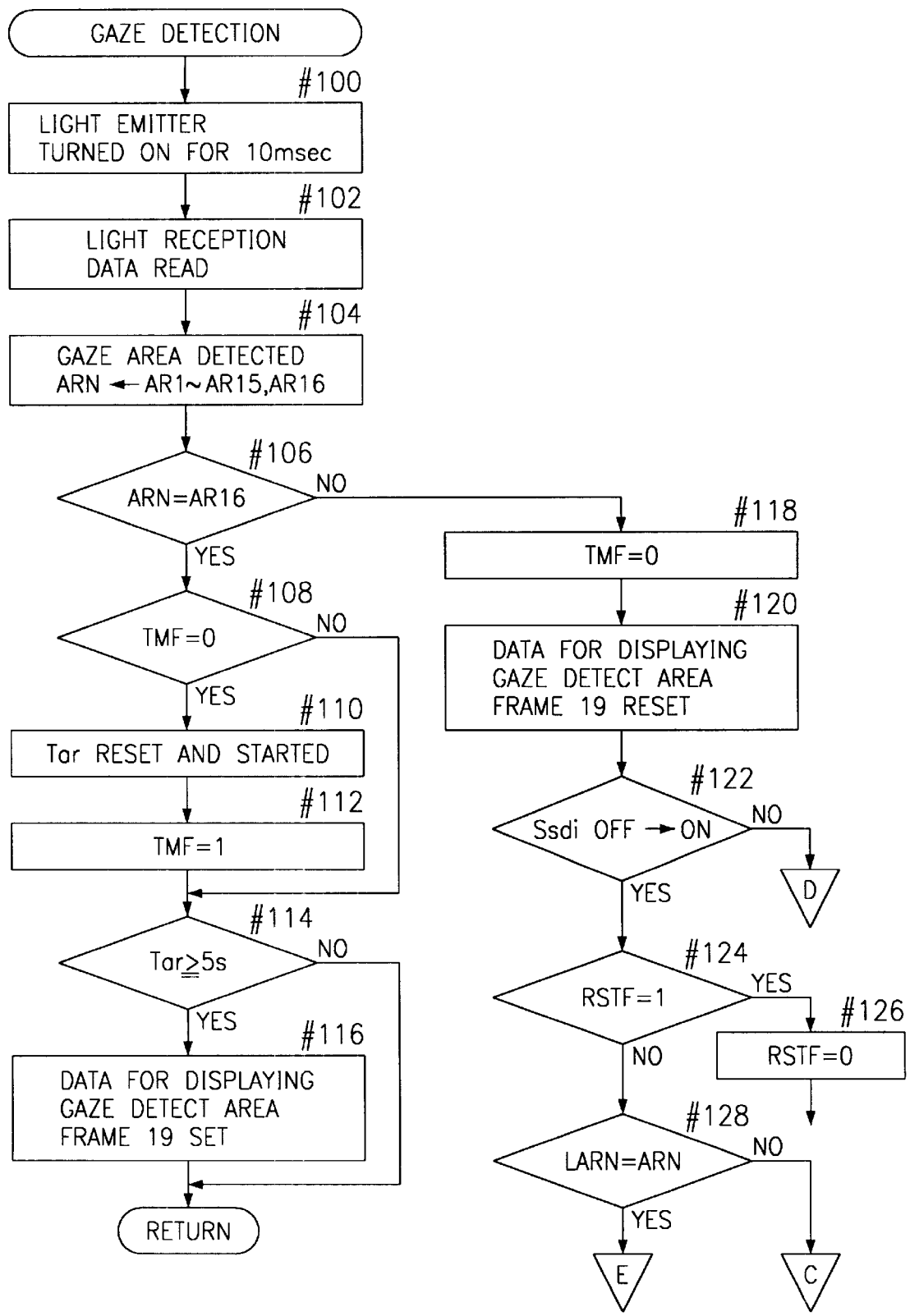
FIGS. 14A and 14B are a flow chart showing a subroutine "Gaze Detection"
Figure 14B:
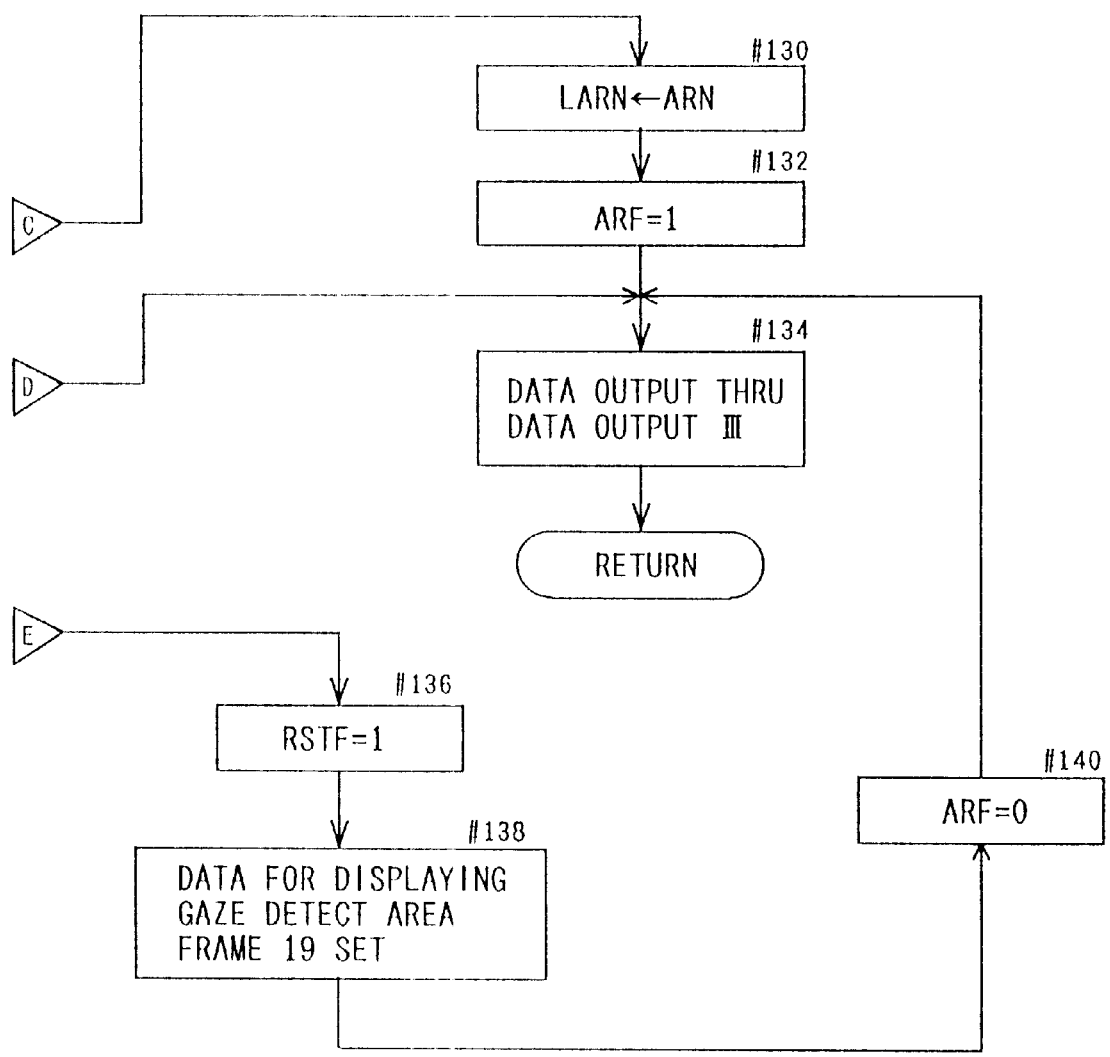

FIGS. 14A and 14B are a flow chart showing a subroutine "Gaze Detection."

In this subroutine, the light emitter (infrared LED) in the gaze detecting circuit 2 is turned on for 10 msec. in Step #100 and the light reception data is read in Step #102 on the assumption that the emitted light is reflected by the eye of the camera operator viewing through the viewfinder 28 and is received by the infrared area sensor. The gaze area upon which the gaze of the camera operator falls is detected based on the light reception data. The detected gaze area is read as an area ARN (where N=1 to 16) in Step #104.

Subsequently, it is discriminated whether the area ARN is the area AR16 in Step #106. If ARN=AR16 (YES in Step #106), it is judged that no gaze area has been detected since the area AR16 does not lie within the detection area, and it is discriminated whether the timer flag TMF for measuring this period is set in Step #108. If the timer flag TMF is not set, the timer Tar is reset and started in Step #110 and the timer flag TMF is set in Step #112.

If the timer flag is set at Step #108, this subroutine proceeds directly to Step #114 so as not to interrupt the time measuring operation of the timer Tar. In Step #114, it is discriminated whether 5 seconds have elapsed following the start of the timer Tar. This subroutine returns unless 5 seconds have elapsed (NO in Step #114). Upon the lapse of 5 seconds (YES in Step #114), a data for displaying the gaze detection area frame 19 is set in Step #116 and this subroutine returns.

On the other hand, if ARN≠AR16 (NO in Step #106), the timer flag TMF is reset in Step #118 and the data for displaying the gaze detection area frame 19 is reset in Step #120.

In Step #122, it is discriminated whether the state of the switch Ssdi for setting or resetting the area ARN upon which the gaze falls has been changed from OFF to ON. If the discrimination result in Step #122 is in the negative, the data to be displayed is output to the CCD/monitor unit 10 through an data output III in Step #134 and this subroutine returns. If the discrimination result in Step #122 is in the affirmative, it is discriminated whether the area reset flag RSTF is set in Step #124. If the area reset flag RSTF is set, this flag RSTF is reset in Step #126; the presently detected area ARN is set as a designated area LARN in Step #130; and the area flag ARF indicative of the gaze area setting is set in Step #132. Consequently, these data are output to the CCD/monitor unit 10 through the data output III in Step #134 and this subroutine returns.

On the other hand, if the area reset flag RSTF is not set in Step #124, it is discriminated whether the designated area LARN is equal to the presently detected area ARN in Step #128. If LARN=ARN, it is judged that the switch Ssdi has been operated to cancel the designated area LARN and the area reset flag RSTF is set in Step #136. Subsequently, the data for displaying the gaze detection area frame 19, which is displayed when the power supply is turned on, is set in Step #138 and the area flag ARF is reset in Step #140 since the gaze area is reset. Consequently, these data are output to the CCD/monitor unit 10 through the data output III in Step #134 and this subroutine returns. If LARN≠(ARN) (NO in Step #128), the operations in Step #130 and subsequent steps are executed on the assumption that the switch Ssdi has been operated to set the gaze area and this subroutine returns.

Figure 15:
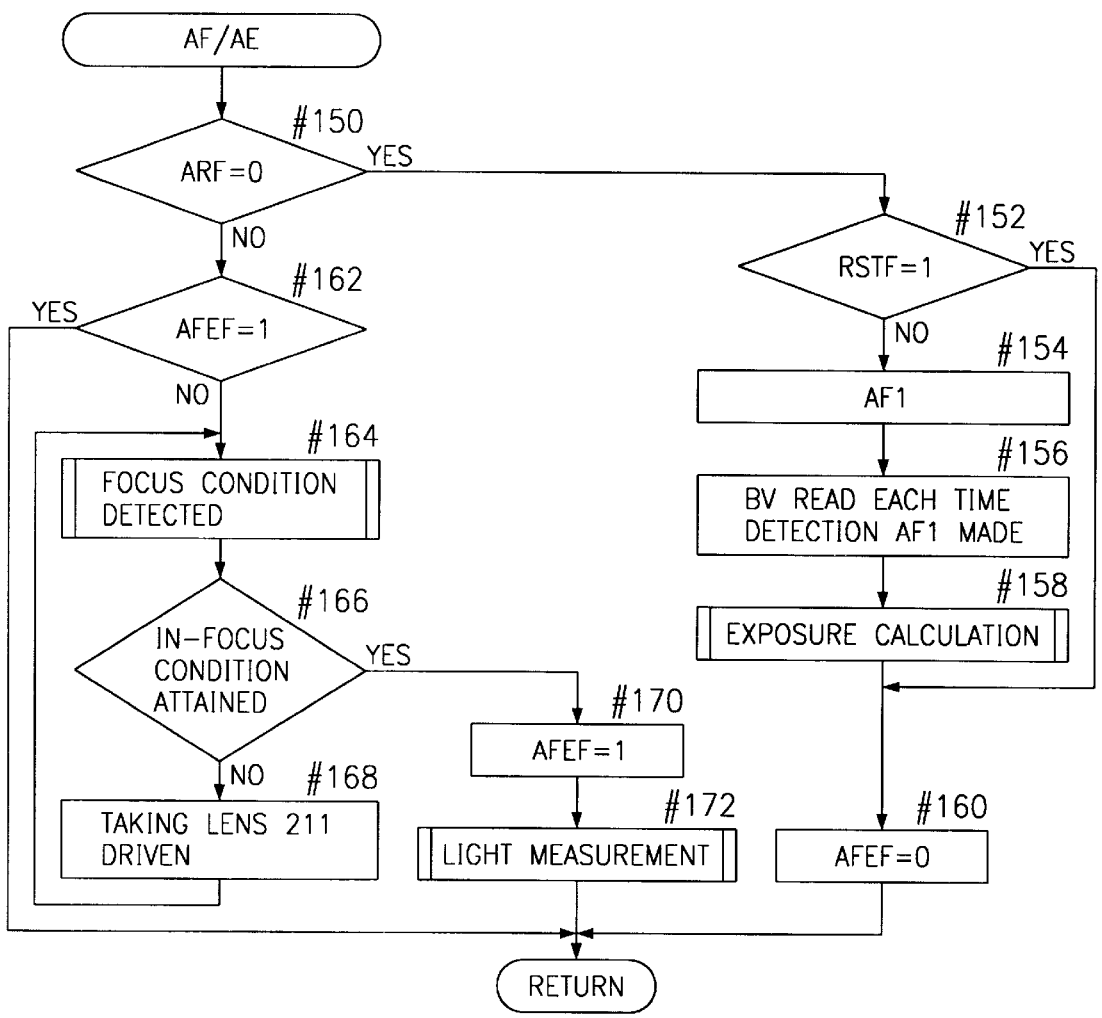
FIG. 15 is a flow chart showing a subroutine "AF/AE"

There will be described a subroutine "AF/AE" next with reference to FIG. 15.

In this subroutine, it is first discriminated whether the area flag ARF is set in response to the operation of the switch Ssdi (gaze area setting switch 30) in Step #150.

If the area flag ARF is not set (yes) in Step #150), it is discriminated whether the area reset flag RSTF is set in Step #152. If the area reset flag RSTF is set (YES in Step #152), this subroutine proceeds to Step #160 skipping Steps 154 to 158 to lock the AF and AE operations until the gaze area AR is set in the next run. This is because it cannot be decided to which area (ARN) the AF and AE operations are applied when the area reset flag RSTF is set. In Step #160, the in-focus flag AFEF indicative of the attainment of the in-focus condition is reset and this subroutine returns. If the area reset flag RSTF is not set (NO in Step #152), it means that the gaze area AR has never been set after the power supply is turned on. In this case, it is thought to be better not to lock the AF and AE operations so that the AF and AE operations can be carried out anytime to various objects. Accordingly, the provisional focus condition detection AF1 is carried out repeatedly (continuous AF); the light measurement value BV is read each time the detection AF1 is made; and the exposure calculation is conducted (Steps #154, #156, #158). Thereafter, the in-focus flag AFEF is reset in Step #160 and this subroutine returns.

On the other hand, if the area flag ARF is set (NO in Step #150), it is discriminated whether the in-focus flag AFEF is set in Step #162. If the in-focus flag AFEF is set, (i.e., the in-focus condition has been already attained (YES in Step #162)), this subroutine returns without carrying out the focus condition detection again (single AF). If the in-focus flag AFEF is not set (NO in Step #162), the focus condition is detected in Step #164 and it is discriminated whether the in-focus condition has been already attained based on the detected focus condition in Step #166. If the in-focus condition has been already attained, the taking lens 211 is driven based on the detected focus condition in Step #168 and this subroutine proceeds to Step #164. Upon the attainment of the in-focus condition (YES in Step #166), the in-focus flag AFEF is set in Step #170; light measurement is conducted in Step #172; and this subroutine returns.

Figure 16:
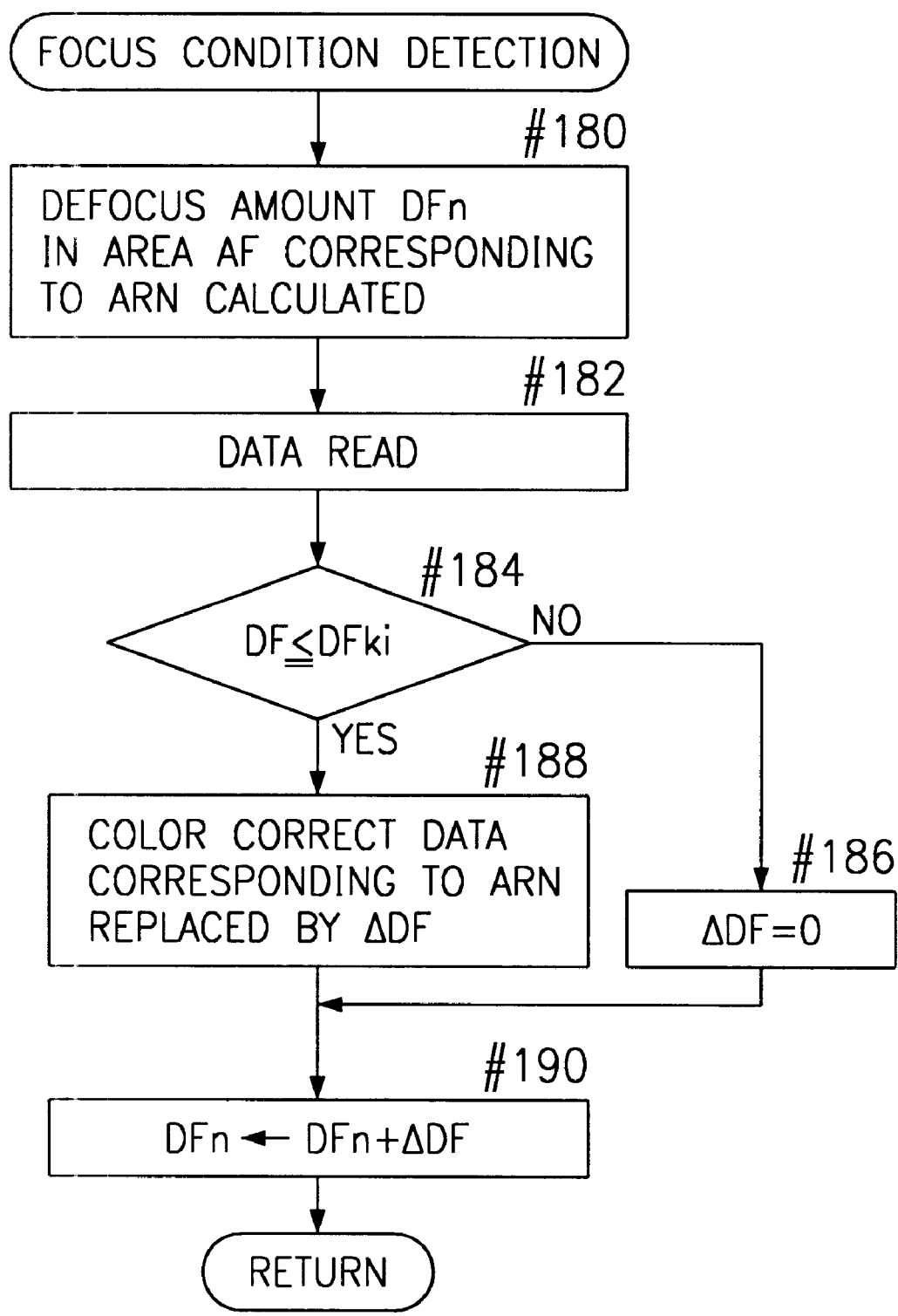
FIG. 16 is a flow chart showing a subroutine "Focus Condition Detection"
Figure 17:
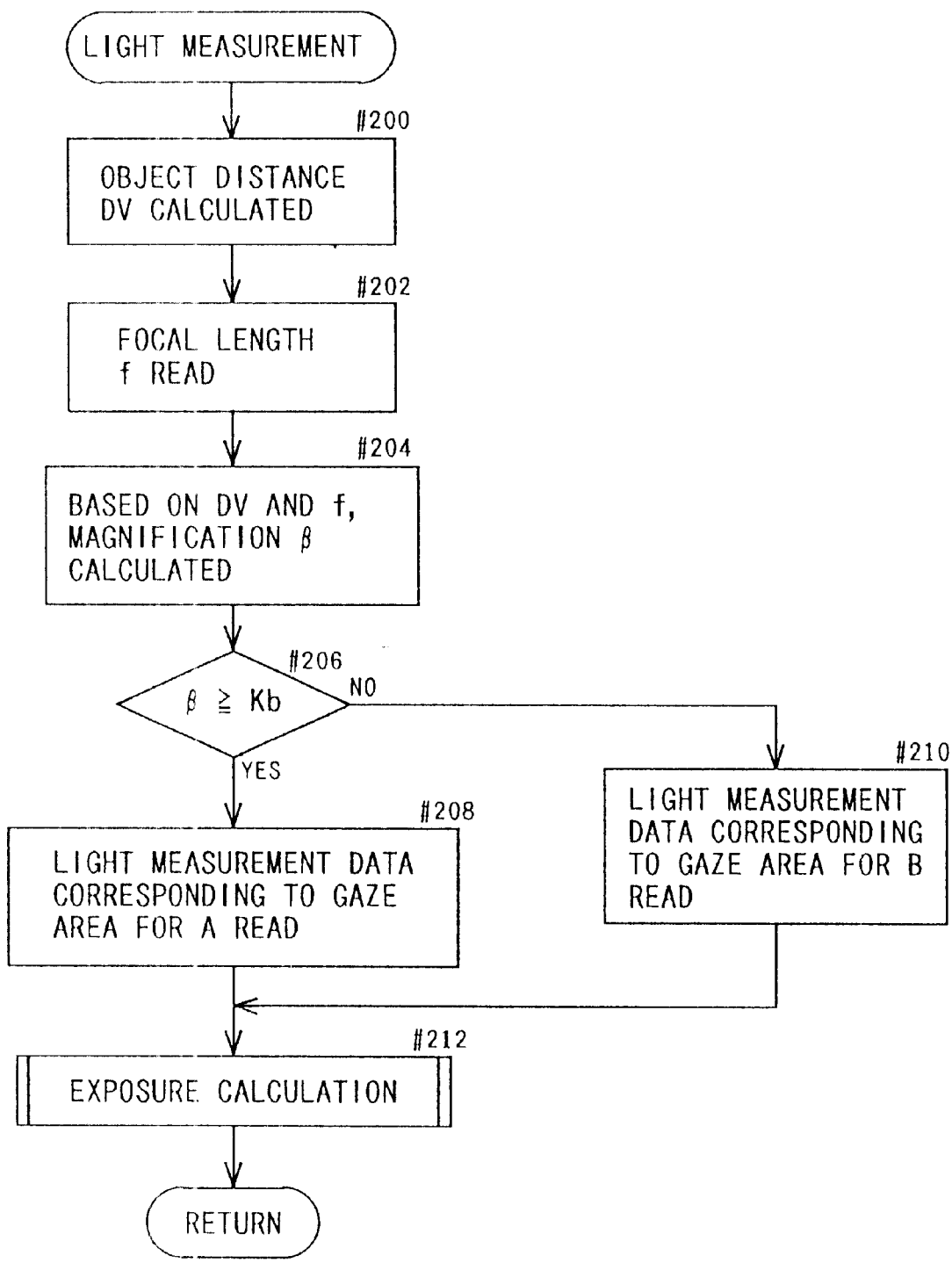
FIG. 17 is a flow chart showing a subroutine "Light Measurement"

There will be next described subroutines "Focus Condition Detection" and "Light Measurement" respectively with reference to FIGS. 16 and 17.

In the subroutine "Focus Condition Detection," a defocus amount DFn in the area AF corresponding to the set gaze area ARN is first calculated in Step #180. TABLE-3 below shows the correspondence between the gaze areas and the AF areas.

TABLE 3

| GAZE AREA | AF AREA |
|---|---|
| AR1, AR6, AR11 | AREA IN AR6 |
| AR2, AR7, AR12 | AREA IN AR7 |
| AR3, AR8, AR13 | AREA IN AR8 |
| AR4, AR9, AR14 | AREA IN AR9 |
| AR5, AR10, AR15 | AREA IN AR10 |

Subsequently, data including color correction data for all the AF areas are read from the CCD/monitor unit 10 in Step #182 and it is discriminated whether the defocus amount DP is not greater than a predetermined value DFk1 in Step #184. If DF≦DFk1 (YES in Step #184), the color correction data corresponding to the area ARN is replaced by ΔDF in Step #188; the correction value ΔDF is added to the defocus amount DFn (DFn=DFn+ΔDF) in Step #190; and this subroutine returns. Conversely, if DF>DFk1 (NO in Step #184), the correction value ΔDf is set at "0" in Step #186 and the calculation is carried out using this value in Step #190.

The correction using the value ΔDF is not made in the case where the value ΔDF is, for example, as large as 500 μm and accordingly the image on the CCD 43 is fairly unsharp. This is because correct color data cannot be obtained due to the blur of colors.

The light measurement is described next. TABLE-4 below shows the relationship between the detected gaze area and the light measurement data.

TABLE 4

| GAZE AREA | LIGHT MEASUREMENT B | LIGHT MEASUREMENT A |
|---|---|---|
| AR1 | MEAN OF AR1, AR2, AR6, AR7 | AR1 |
| AR2 TO AR4 | MEAN OF AR(N − 1) TO AR(N + 1), AR(N + 4) TO AR(N + 6) | AR(N) |
| AR5 | MEAN OF AR4, AR5, AR9, AR10 | AR4 |
| AR6 | MEAN OF AR1, AR2, AR6, AR7, AR11, AR12 | AR6 |
| AR7 TO AR9 | MEAN OF AR(N − 6) TO AR(N − 4), AR(N − 1) TO AR(N + 1), AR(N + 4) TO AR(N + 6) | AR(N) |
| AR10 | MEAN OF AR4, AR5, AR9, AR10, AR14, AR15 | AR10 |
| AR11 | MEAN OF AR6, AR7, AR11, AR12 | AR11 |
| AR12 TO AR14 | MEAN OF AR(N − 6) TO AR(N − 4), AR(N − 1) TO AR(N + 1) | AR(N) |
| AR15 | MEAN OF AR9, AR10, AR14, AR15 | AR15 |

The light measurement B is conducted when β (magnification)<Kb (specified value) and the value thereof is a mean of values obtained in the gaze areas specified in its column. The light measurement A is conducted when β≧Kb and the value thereof is the value obtained in the gaze area specified in its column.

In the subroutine "Light Measurement," an object distance DV is first calculated based on the lens projected amount in Step #200 and a focal length f is read in Step #202. Based on the object distance DV and the focal length f, is calculated a magnification β is calculated in Step #204. It is then discriminated whether the obtained magnification β is not smaller than a specified value Kb in Step #206. If β≧Kb (YES in Step #206), the light measurement data corresponding to the gaze area specified for the light measurement A in TABLE-4 is read from the CCD/monitor unit 10 in Step #208. Conversely, if β<Kb (NO in Step #206), the light measurement data corresponding to the gaze areas specified for the light measurement B in TABLE-4 are read from the CCD/monitor unit 10 and a mean value thereof is calculated in Step #210. In Step #212, the exposure calculation is carried out based on thus obtained light measurement data. The reason why the light measuring operation is separated into the light measurement A and the light measurement B for a photograph of an "entire" object (for example, a landscape) having a small magnification β averaging the light measurement data corresponding to a plurality of gaze areas.

Referring back to FIG. 12B, it is discriminated whether the switch S1 is on in Step #70 after the AF/AE operations has been executed. If the switch S1 is on, a subroutine "S1 ON" is executed in Step #80 and this subroutine proceeds to Step #66. If the switch S1 is off, it is discriminated whether the state of the switch Spv has been changed from OFF to ON in Step #72. If the discrimination result in Step #72 is in the affirmative, a subroutine "Preview" is executed in Step #74. If the discrimination result in Step #72 is in the negative, it is discriminated whether the state of the switch Sdpi which is operated to display in the monitor 47 the image stored in the image memory 110 has been changed from OFF to ON in Step #76. If the discrimination result in Step #76 is in the affirmative, a data represented by the ON-state of this switch (hereinafter referred to as a switch data) is output to the CCD/monitor unit 10 through a data output IV in Step #78, and this subroutine proceeds to Step #66. If none of these switches has been operated, this subroutine proceeds directly to Step #66.

Figure 18A:
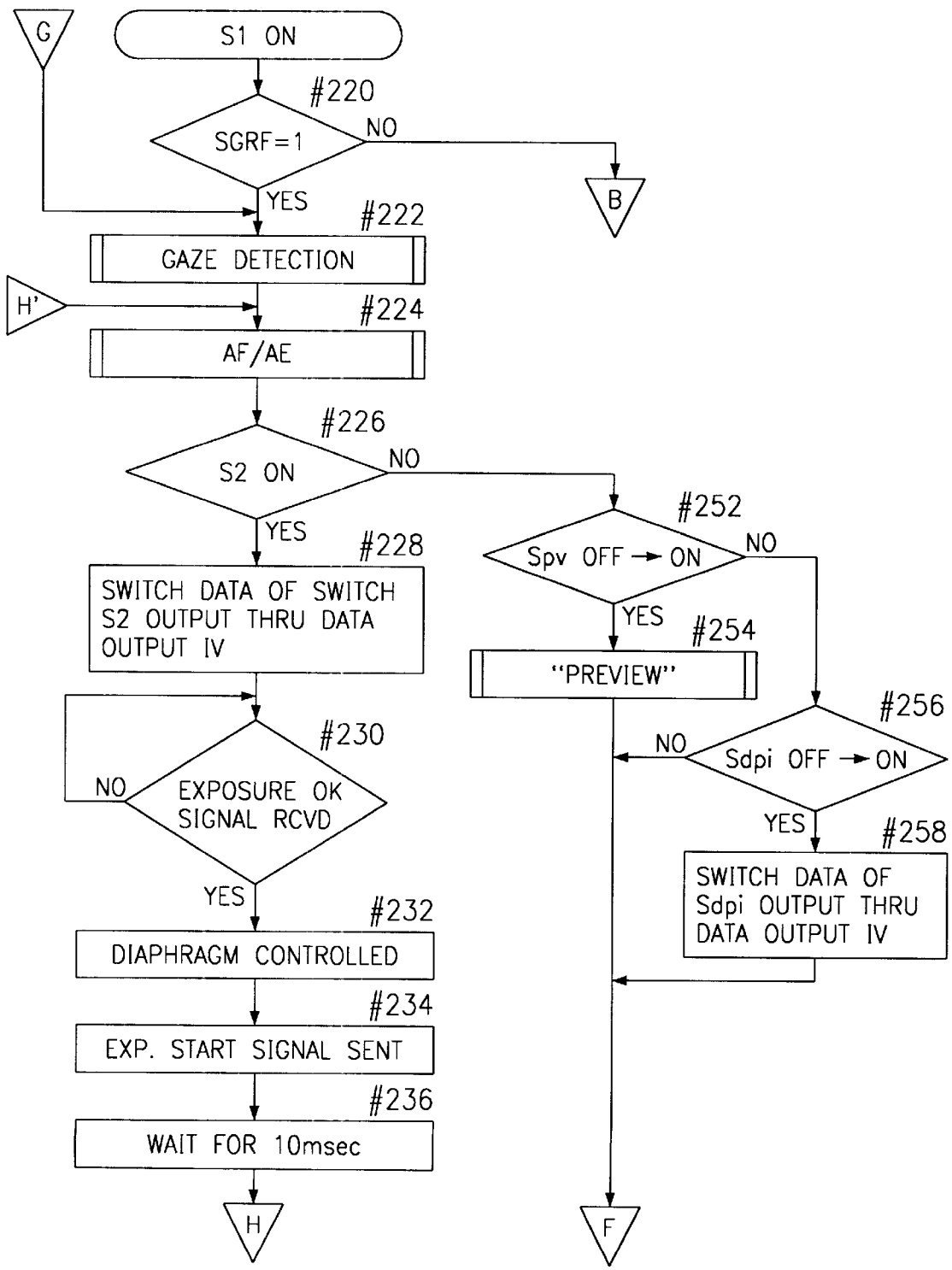
FIGS. 18A and 18B are a flow chart showing a subroutine "S1 On"
Figure 18B:
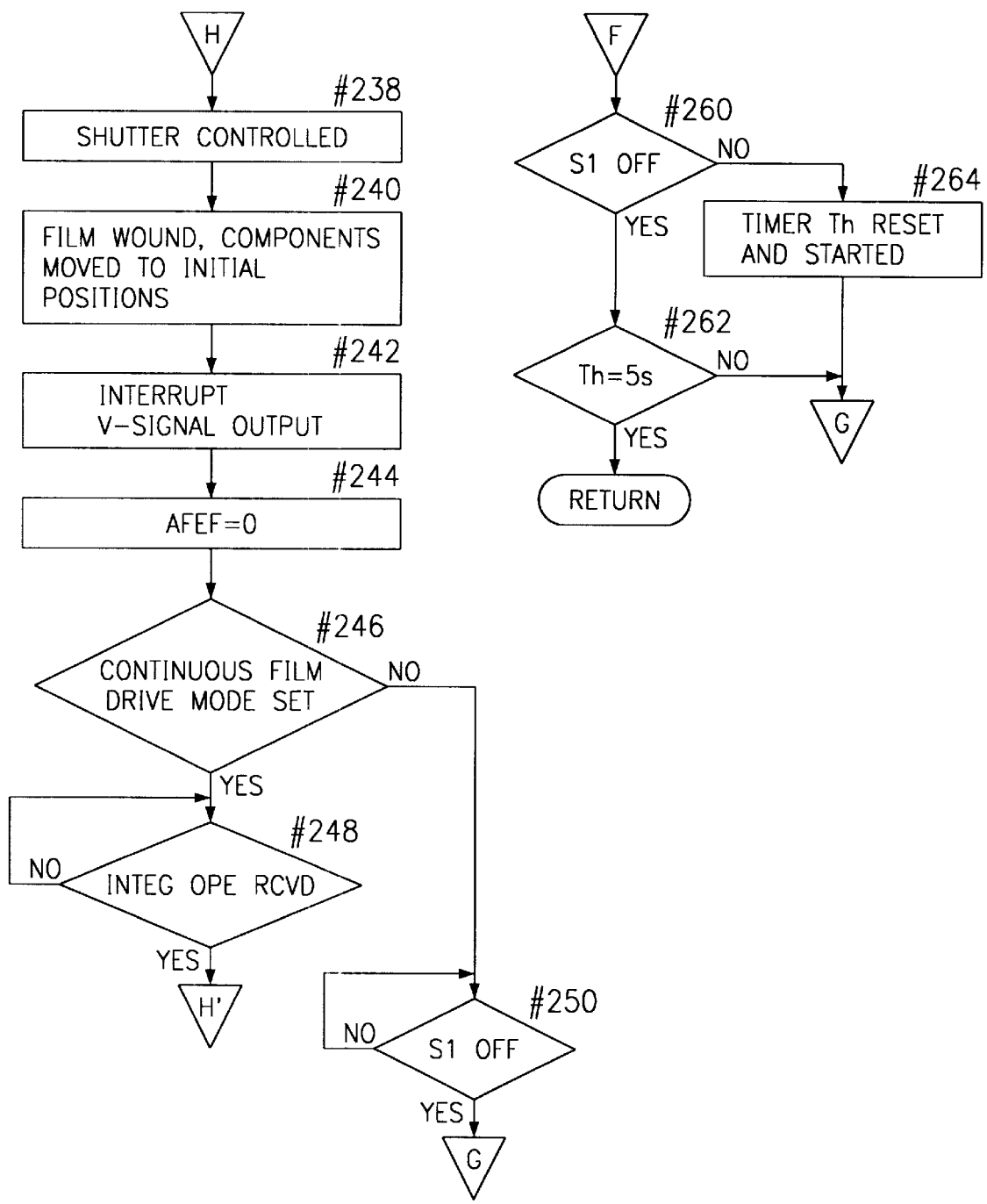

The subroutine "S1 ON" will be described with reference to FIGS. 18A and 18B.

In this subroutine, it is first discriminated whether the eye flag SGRF is set in Step #220. The flag SGRF indicates whether the eye detection has been already made when the switch S1 is on. If an eye has been detected (YES in Step #220), the gaze detection, the AF/AE operations are carried out (Steps #222, #224) since the CCD/monitor unit 10 and the AF lens have been already initialized.

It is then discriminated whether the switch S2 is on in Step #226. If the switch S2 is off, it is discriminated whether the state of the switch Spv has been changed from OFF to ON in Step #252. If the discrimination result in Step #252 is in the affirmative, the subroutine "Preview" is executed in Step #254. If the discrimination result in Step #252 is in the negative, it is discriminated when the state of the switch Sdpi has been changed from OFF to ON in Step #256. If the discrimination result in Step #256 is in the affirmative, the switch data of the switch Sdpi is output to the CCD/monitor unit 10 through the data output IV in Step #258 and this subroutine proceeds to Step #260.

In Step #260, it is discriminated whether the switch S1 is off. If the switch S1 is on, a timer Th is started in Step #264 and this subroutine proceeds to Step #222. On the other hand, if the switch S1 is off, it is discriminated whether 5 seconds have elapsed following the start of the timer Th in Step #262. This subroutine returns upon the lapse of 5 seconds, while proceeding to Step #222 if 5 seconds have not yet elapsed. If the eye flag SGRF is not set in Step #220, this subroutine proceeds to Step #48 (FIG. 12A).

If the switch S2 is on in Step #226, the switch data of the switch S2 is output to the CCD/monitor unit 10 through the data output IV in Step #228 and the routine waits in Step #230 until an "exposure OK" signal from the CCD/monitor 10 is received. Upon the reception of this exposure OK signal, the diaphragm is controlled according to the obtained aperture value in Step #232; an exposure start signal is sent to the CCD/monitor unit 10 in Step #234; and it is waited for 10 msec in Step #236. Thereafter, an exposure control is conducted, i.e., the shutter is controlled in accordance with the obtained shutter speed in Step #238. Upon the completion of the exposure control, the film is wound and the respective components are moved to their initial positions in Step #240. An interrupt V-signal is output to control the opened diaphragm suitably for the next integrating operation of the CCD 43 in Step #242 and the in-focus flag AFEF is reset (step #244) to carry out the AF operation again #244.

It is then discriminated whether the continuous film drive mode is set in Step #246. If the continuous film drive mode is set, it is waited until a signal representative of the completion of the integrating operation of the CCD 43 and the calculating operation is received in Step #248. Upon the reception of this signal, this subroutine proceeds to Step #224. The camera operator is allowed to view animated pictures during the series shooting by carrying out, in this way, the integrating operation of the CCD 43 and obtaining new data for the focus condition detection and the light measurement. Further, the gaze detection is not conducted during the series shooting in consideration of a reduction in the gaze detection accuracy due to the undesirable camera shake resulting from a shock given when the shutter components are returned to their initial positions and the film is wound. If the camera is of the mirror-up type in which the light does not reach the viewfinder 28 during the series shooting, it may be appropriate not to conduct the gaze detection during that time since the camera operator cannot see the object through the viewfinder 28.

If the single film drive mode is set in Step #246, it is waited until the switch S1 is turned off in Step #250. This subroutine proceeds to Step #222 when the switch S1 is turned off. Thus, in the CCD/monitor unit 10, the presently photographed still image is displayed in the monitor 47 while the switch S1 is on.

Figure 19:
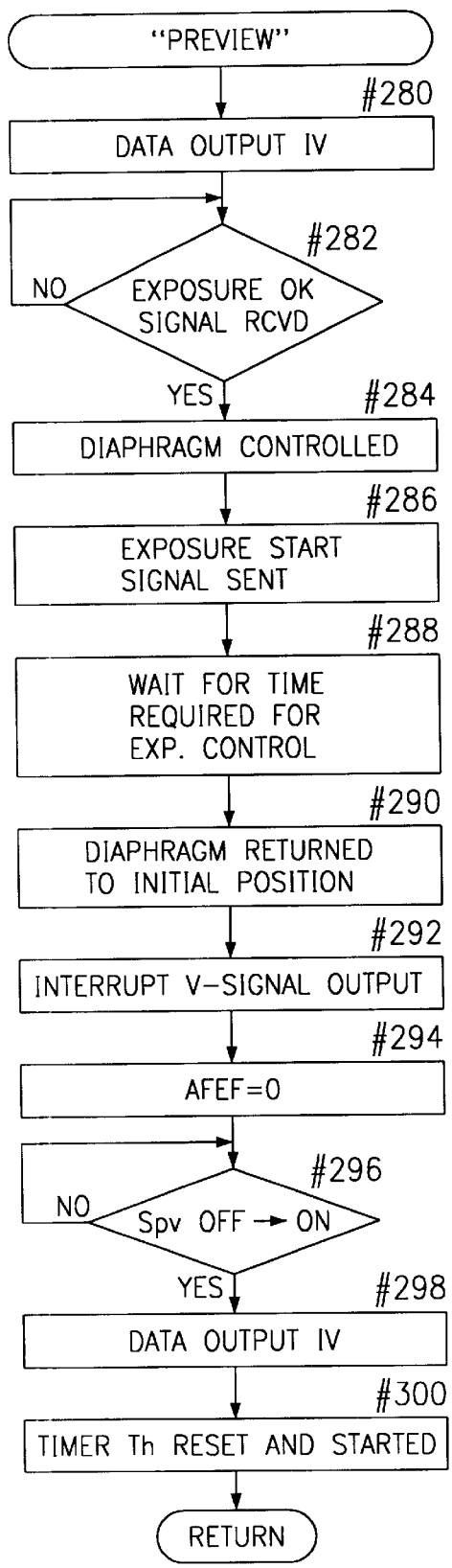
FIG. 19 is a flow chart showing a subroutine "Preview"

The subroutine "Preview" will be described next with reference to FIG. 19.

The switch data of the switch Spv is first output to the CCD/monitor unit 10 (data output IV) in Step #280 and the microcomputer 1 waits until receiving the exposure OK signal from the CCD/monitor unit 10 in Step #282.

Upon the receipt of the exposure OK signal, the diaphragm is controlled according to the control aperture value in Step #284 and the exposure start signal is sent to the CCD/monitor unit 10 in Step #286. Thereafter, it is waited for a time required for the exposure control in Step #288 and the diaphragm is returned to its initial position while keeping the shutter, the film feeding device, and the like as they are in Step #290.

Subsequently, the interrupt V-signal is output in Step #292 and the in-focus flag AFEF is reset in Step #294. In Step #296, it is waited until the switch Spv is turned on. As long as the switch Spv is off, no still picture is displayed in the CCD/monitor unit 10. When the switch Spv is turned on, the switch data of the switch Spv is output to the CCD/monitor unit 10 (data output IV) in Step #298; the timer Th is reset and started in Step #300; and this subroutine returns.

FIGS. 20 to 30 are flow charts showing an operation sequence in the CCD/monitor unit 10 and these operations are controlled by the microcomputer 100.

Figure 20:
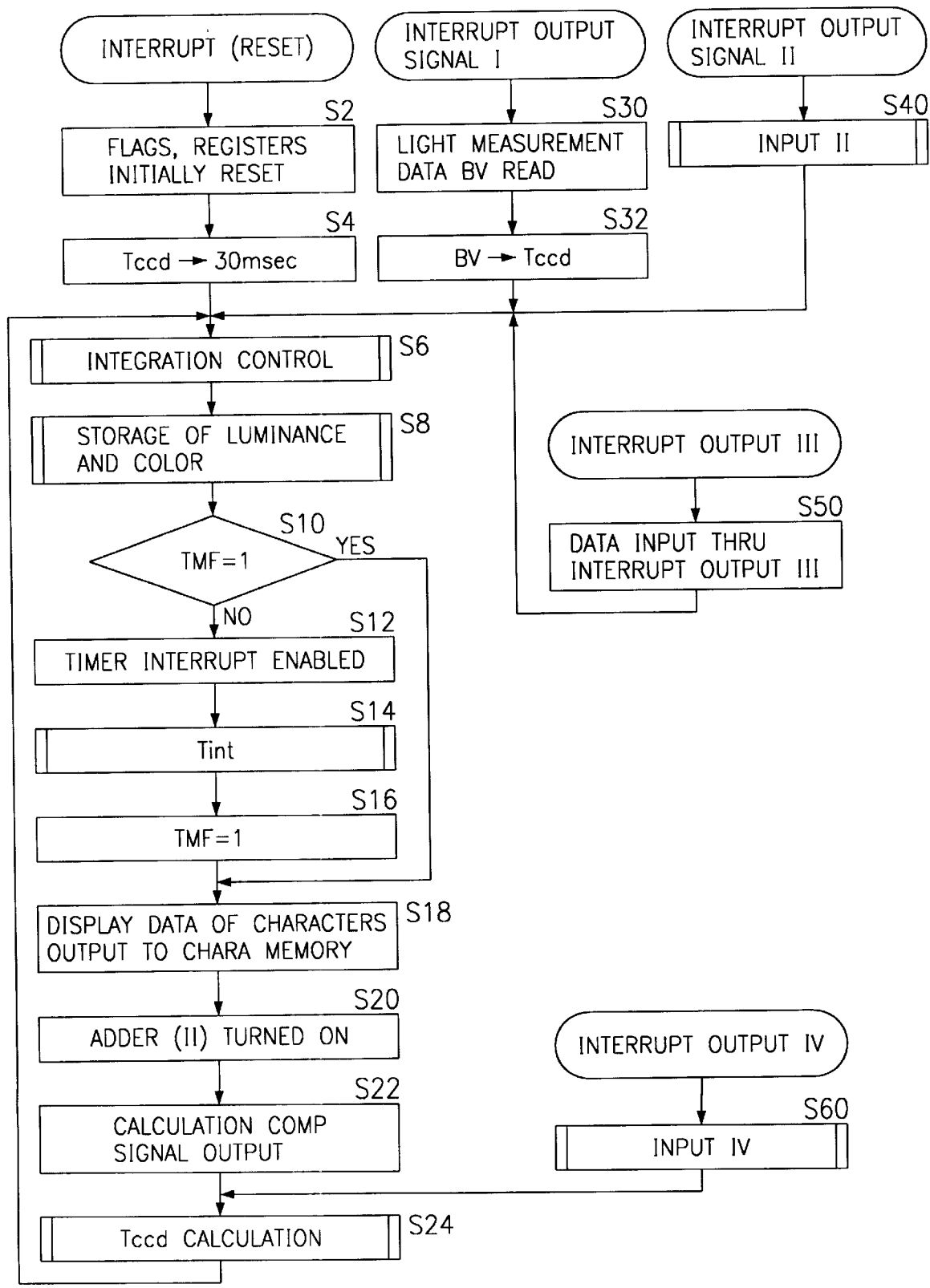
FIG. 20 is a flow chart showing another interrupt routine executed when power is applied to the first camera system or other occasions.

FIG. 20 is a flow chart showing an interrupt routine executed when the power supply is turned on.

Upon the application of power to the microcomputer 100, flags, registers, and the like are initially reset in Step S2.

More specifically, a variable N is set at 0; the display mode is set at the animated picture mode; the display memory 111 is set to a state where an input is allowed but an output is not; the display memory 112 is set to a state where an input is not allowed but an output is allowed; and the flag SPIF is set at 1. An integrating time Tccd for the CCD 43 is initially set at 30 msec. in Step S4 and a subroutine "Integration Control" is executed in Step 6.

Figure 21:
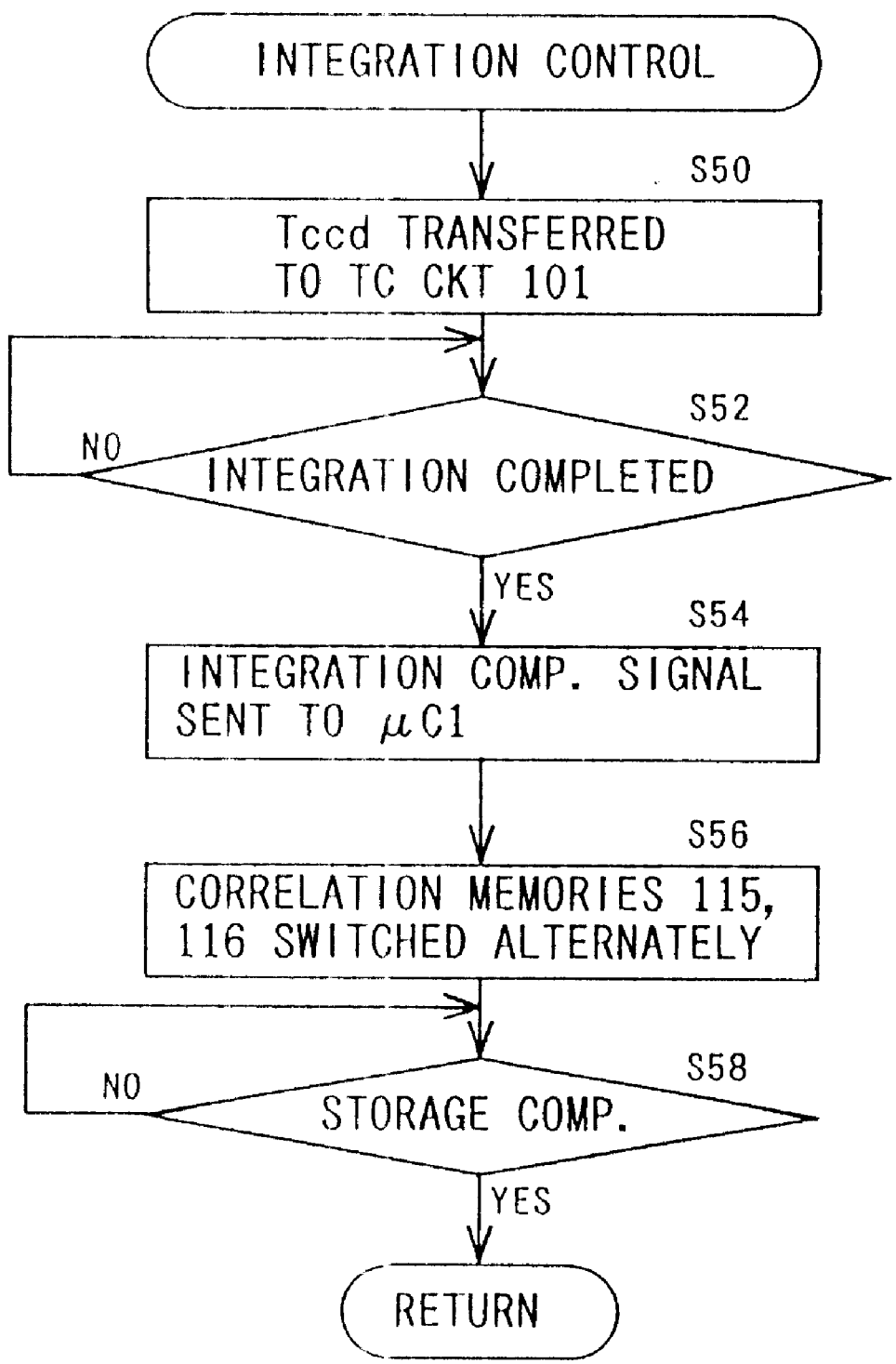
FIG. 21 is a flow chart showing a subroutine "Integration Control"

This subroutine "Integration Control" is described with reference to FIG. 21.

The integrating time Tccd is first transferred to the timing control circuit 101 in Step S50. Upon the receipt of this data, the timing control circuit 101 starts the integrating operation of the CCD 43 and outputs an integration completion signal to the microcomputer 100 (step #244) when the integrating operation is completed in Step S52. Upon the receipt of the integration completion signal, the microcomputer 100 sends this signal to the microcomputer 1 in Step S54 and causes the correlation memories 115, 116 for detecting the camera shake to be switched alternately in Step S56. This subroutine returns after the microcomputer 100 receives a storage completion signal indicative of the storage of the image data in Step S58. This storage completion signal is input from the timing control circuit 101.

Figure 22:
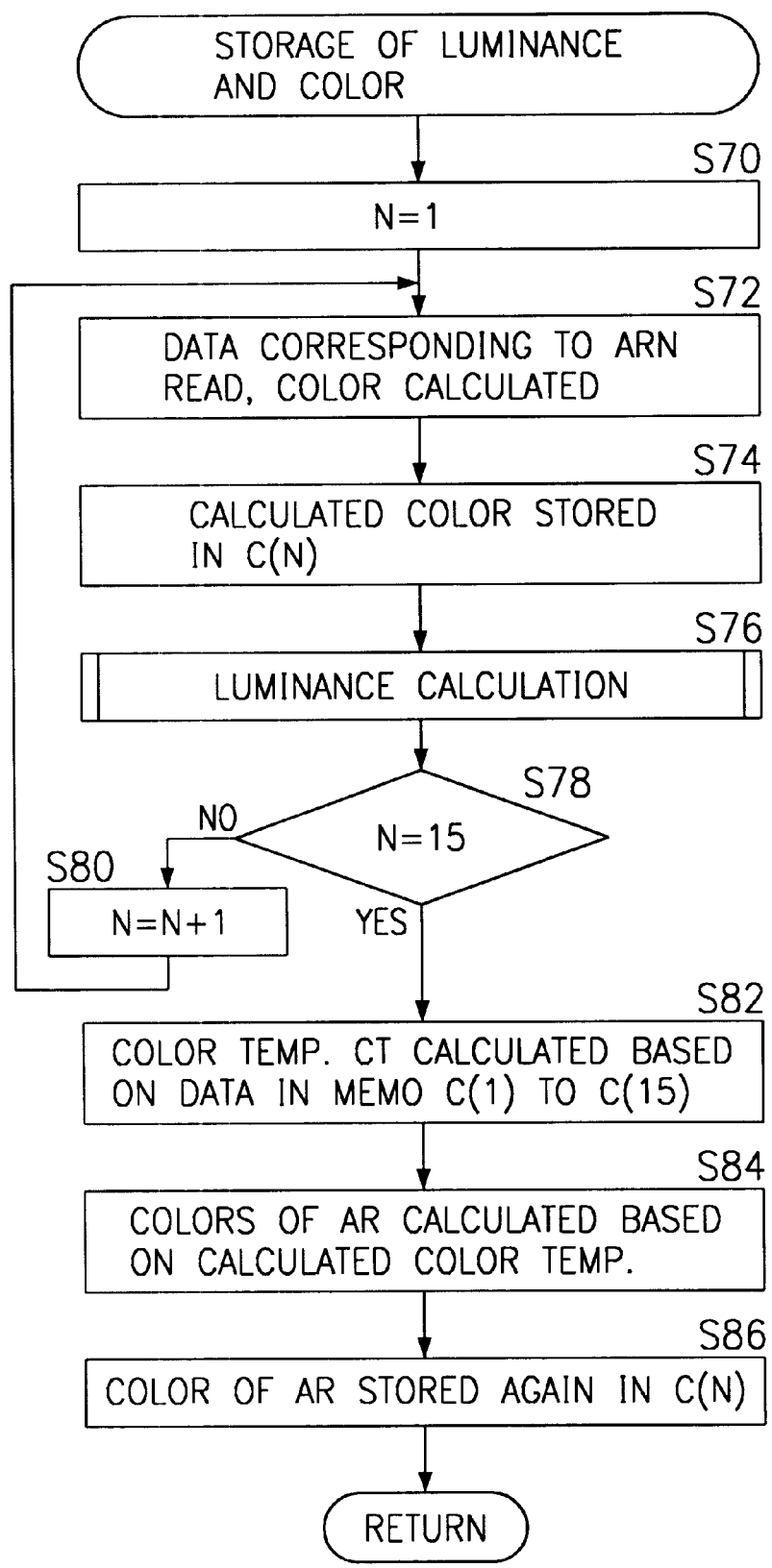
FIG. 22 is a flow chart showing a subroutine "Storage of Luminance and Color"

FIG. 22 is a flow chart showing a subroutine "Storage of Luminance and Color" executed in Step S8 in FIG. 20.

This subroutine is executed to store the luminance and the color on the respective areas AR of the CCD 43. Firstly, the variable N indicative of the specific area AR is set at "1" in Step S70. The data corresponding to the designated area AR is read from the RGB memory 106 and the color is calculated based on this read data in accordance with a predetermined operational expression in Step S72. The calculated color is stored in the color memory C(N) in the microcomputer 100 in Step 74. It is noted that the data obtained in this subroutine are stored in a memory provided in the microcomputer 100. Then, a subroutine "Luminance Calculation" is executed in Step S76.

Figure 23:
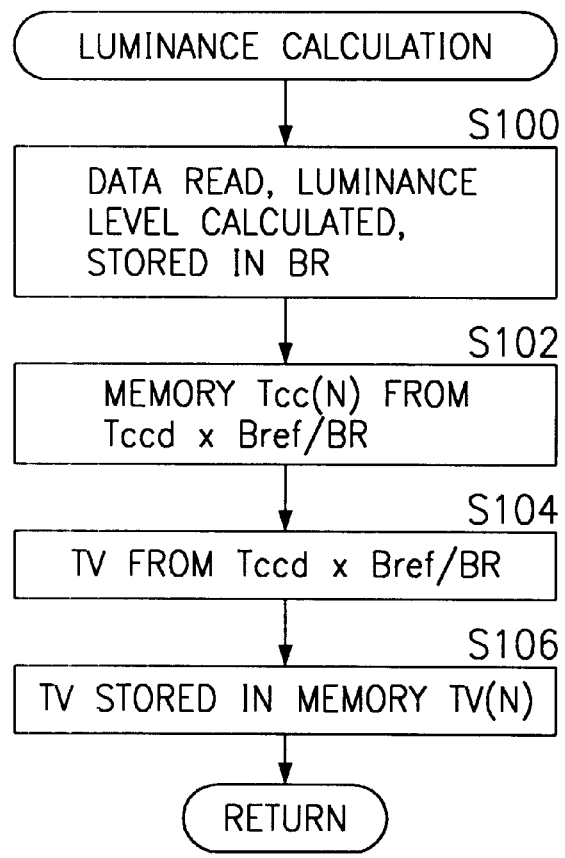
FIG. 23 is a flow chart showing a subroutine "Luminance Calculation"

This subroutine "Luminance Calculation" is described next with reference to FIG. 23.

The data corresponding to the designated area AR is first read from the RGB memory 106 and a mean luminance level of this area AR is calculated based on the read data and is stored in a register BR in Step S100. In Step S102, the present integrating time Tccd is multiplied by a ratio of a reference level Bref of the signal from the CCD 43 to the mean luminance level and the multiplication result is stored in a memory Tccd(N). Further, a value (Tccd×Bref/BR) is converted into a logarithmic value TV in Step 104 and thus obtained logarithmic value is stored in a memory TV(N) in Step 106.

Referring back to FIG. 22, it is discriminated whether N=15 in Step S78. If N≠15, this subroutine proceeds to Step S72 after the variable N is incremented by one in Step 80. If N=15, a color temperature CT of an entire picture (i.e., a temperature of the light source) and color temperatures of the respective areas AR are calculated based on the data stored in the memories C(1) to C(15) in Steps S82 and colors of the areas AR are calculated based on thus calculated color temperatures in Step S84. Thus obtained colors of the areas AR are stored again in the color memories C(N) in Step S86.

Referring back to FIG. 20, it is discriminated whether the timer flag TMF is set in Step S10. Unless the timer flag TMF is set, a timer interrupt is enabled in Step S12: a timer subroutine timer interrupt, or "Tint", is executed in Step S14; and the timer flag TMF is set in Step S16. If the timer flag TMF is set in Step S10, this subroutine proceeds directly to Step S18.

In Step S18, a display data representative of characters is output to the character memory 108 to be stored temporarily therein. The adder(II) 109 is then turned on in Step S20. At this time, in accordance with the signal from the timing control circuit 101, the display data is output to either one of the display memories 111 and 112 in synchronously with the output of the image data to be displayed. The character is displayed in a specified position on a screen of the monitor 47. The characters to be displayed in the monitor 47 include the frames 19, 191, 192, the aperture value Av, the shutter speed Tv, the selected area, the gaze area, and the like.

Subsequently, a calculation completion signal is output in Step S22; a subroutine "Tccd Calculation" is executed in Step S24; and this subroutine proceeds to Step S6.

Figure 24:
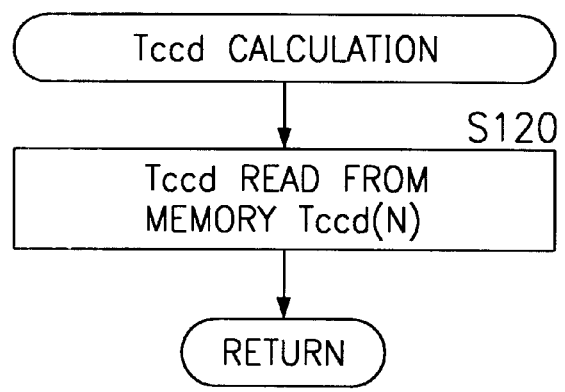
FIG. 24 is a flow chart showing a subroutine "Tccd Calculation"

FIG. 24 is a flow chart showing the subroutine "Tccd Calculation."

The integrating time Tccd is read from the memory Tccd(N) in Step 120 and then this subroutine returns.

Figure 25:
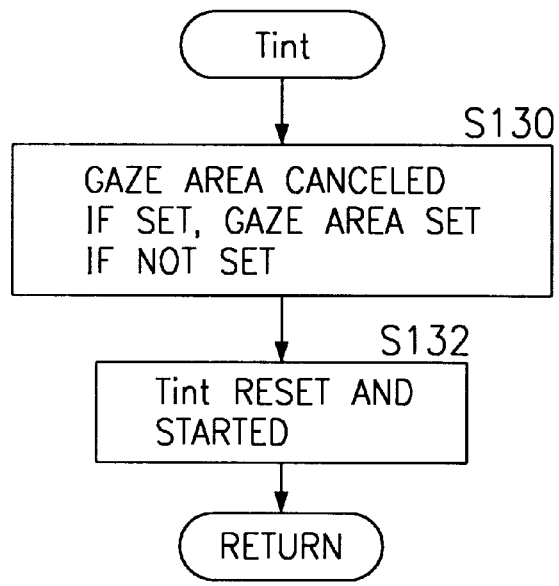
FIG. 25 is a flow chart showing a subroutine "Timer Interrupt (Tint)"

FIG. 25 is a flow chart showing a subroutine timer interrupt or Tint.

This subroutine is executed when the timer measures a predetermined period, e.g. 0.5 seconds. In Step S130, such a data is generated which cancels the gaze area if it is set and sets the gaze area if it is not set. Then, the timer Tint is reset and started in Step S132 and this subroutine returns.

In FIG. 20, upon the receipt of an "interrupt output I" from the microcomputer 1, the light measurement data BV at that time is read in Step S30 and the integrating time Tccd of the CCD 43 is calculated based on this light measurement data BV in Step S32. Thereafter, the integration control is executed in Step S6. Upon the receipt of an "interrupt output II" from the microcomputer 1, a subroutine "Input II" is executed in Step S40.

Figure 26:
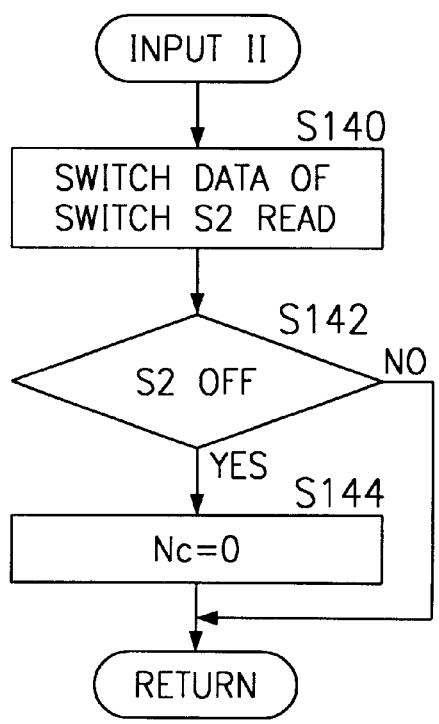
FIG. 26 is a flow chart showing a subroutine "Input II"

FIG. 26 is a flow chart showing the subroutine "Input II."

The switch data of the switch S2 is read in Step S140. It is then discriminated whether the switch S2 is off in Step S142. If the switch S2 is off, this subroutine returns after a variable Nc to be described later is set at "0" in Step S144. Conversely, if the switch S2 is on, this subroutine directly returns.

Other interrupts from the microcomputer 1 include a data input through the "interrupt output III" (Step S50) and an input IV (Step S60) through an "interrupt output IV. The input IV is used to control instructions for the displays or the like.

Figure 27A:
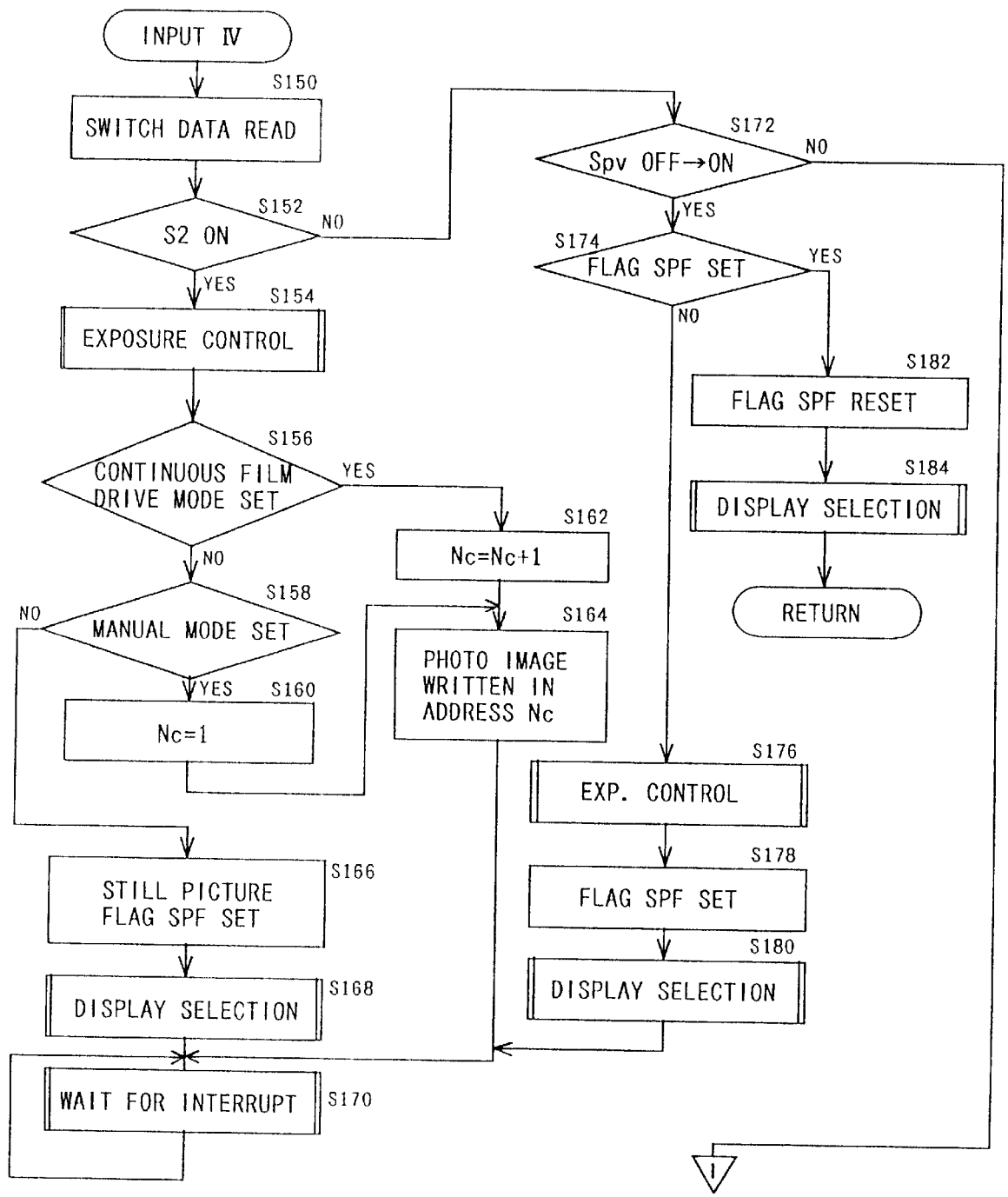
FIGS. 27A, and 27B are a flow chart showing a subroutine "Input IV"
Figure 27B:
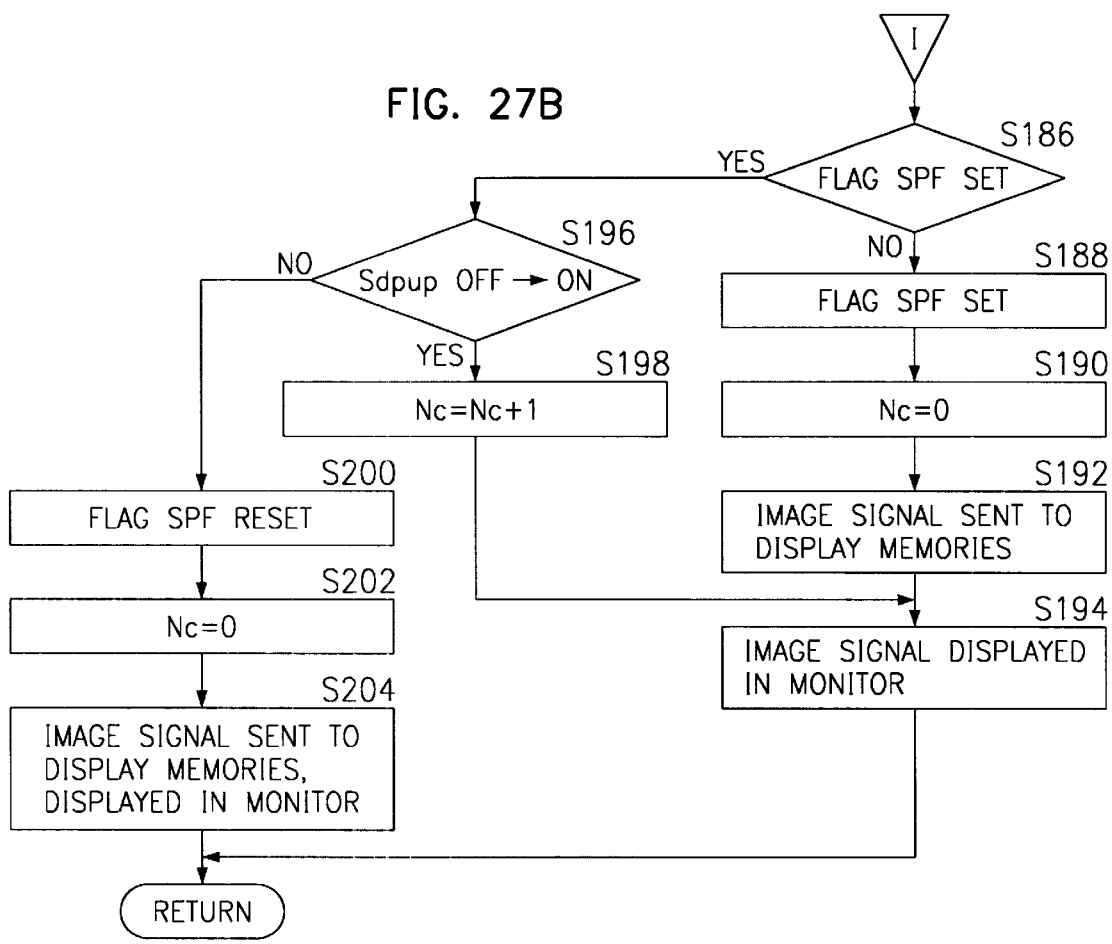

The subroutine "Input IV" will be described with reference to FIGS. 27A and 27B.

The switch data of the switch S2 is read in Step S150 and it is then discriminated whether the switch S2 is on in Step S152. If the switch S2 is on, a subroutine "Exposure Control" is executed in Step S154.

Figure 28:
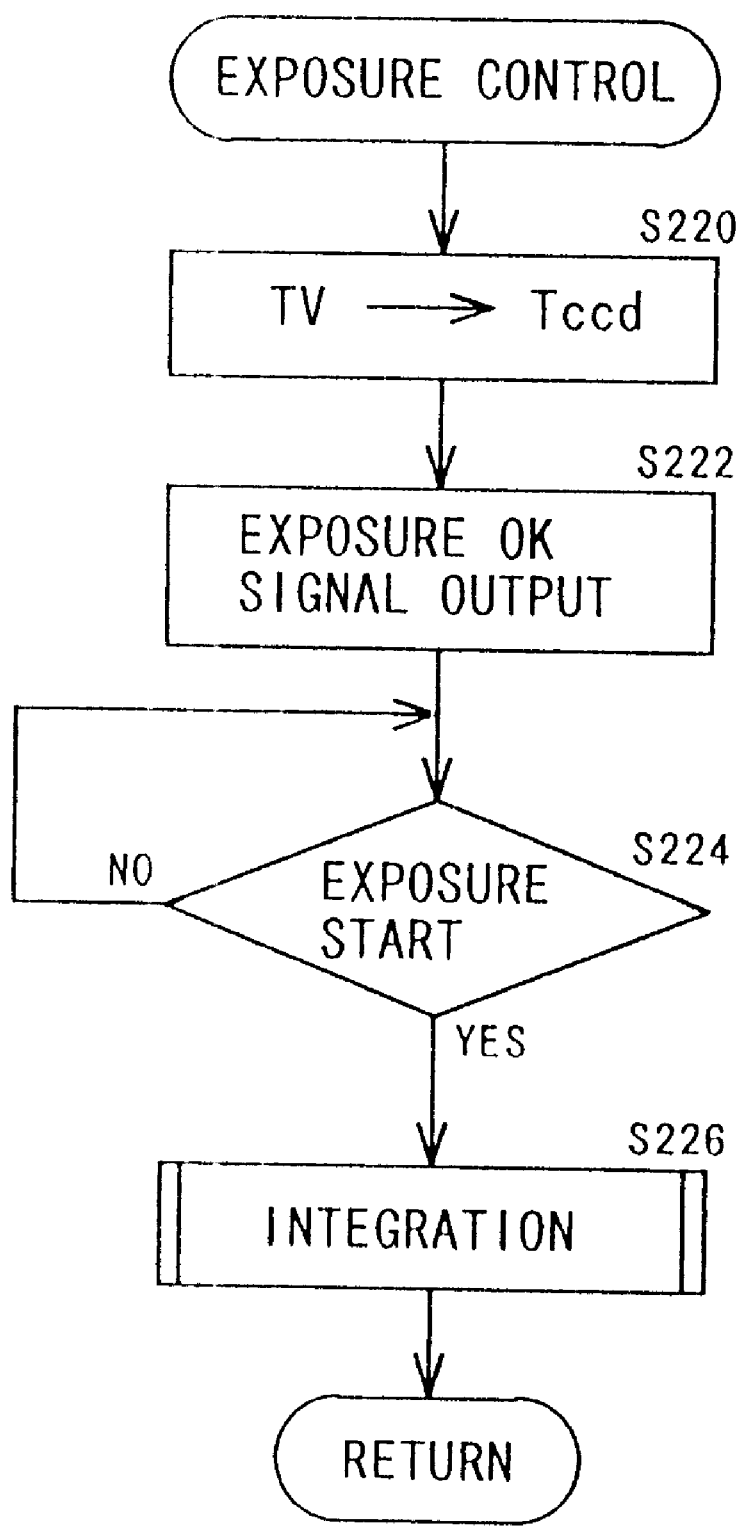
FIG. 28 is a flow chart showing a subroutine "Exposure Control"

This subroutine "Exposure Control" will be described with reference to FIG. 28.

The shutter speed Tv expressed as a logarithmic value which is input from the microcomputer 1 is converted into the actual integrating time Tccd of the CCD 43 in Step S220 and the exposure OK signal is output in Step S222. It is then waited until the exposure start signal is input from the microcomputer 1 in Step S224. Upon the receipt of this signal, a subroutine "Integration" is executed in Step S226 and this subroutine returns.

Figure 29:
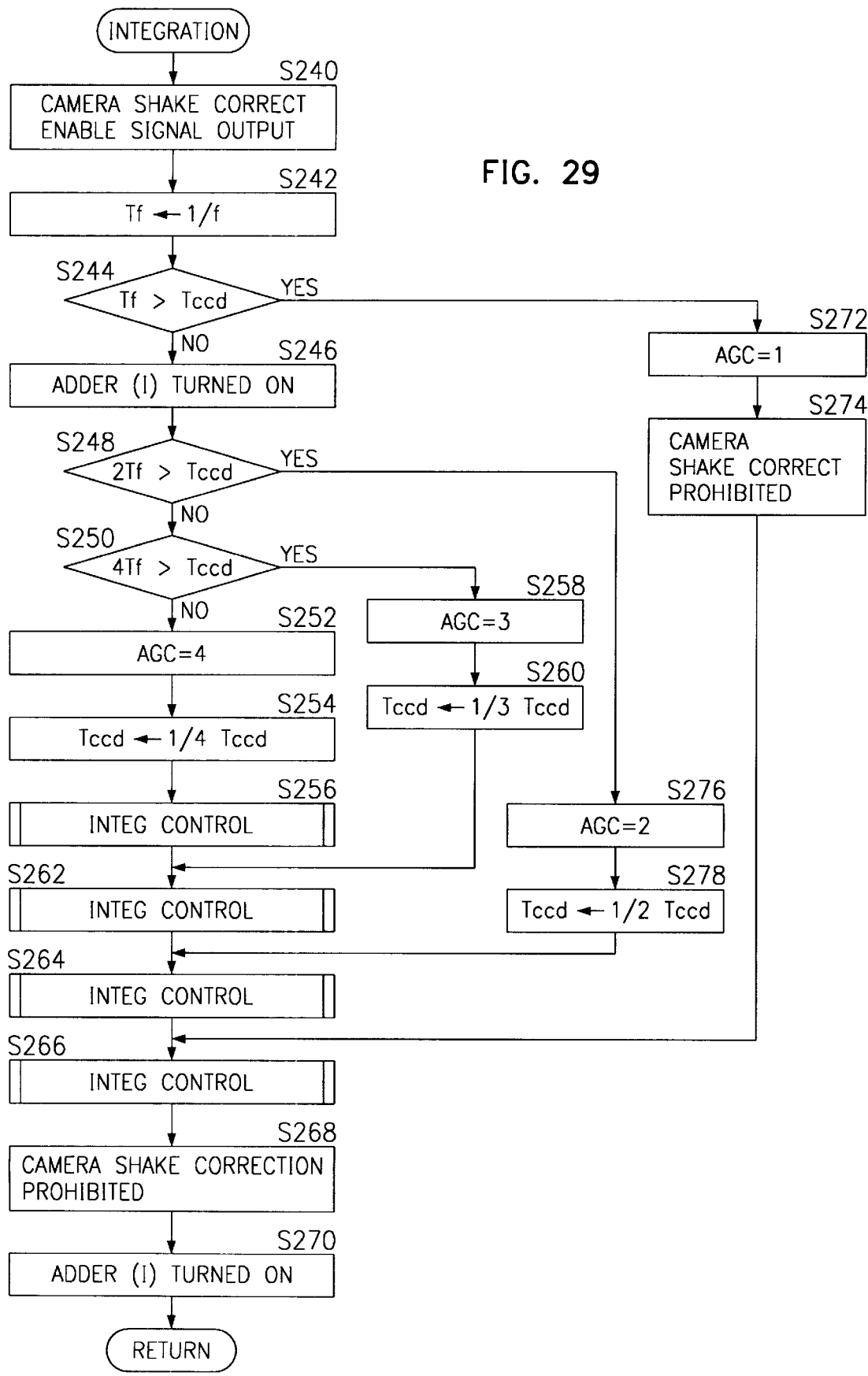
FIG. 29 is a flow chart showing a subroutine "Integration"

The subroutine "Integration" will be described with reference to FIG. 29.

Concurrently with the execution of this subroutine, the camera shake (shaking of the object) is detected in the CCD/monitor unit 10. When an exposure time is long, the camera shake detection is required to be made a plurality of times during the exposure. Accordingly, in this case, the integrating time Tccd is divided by a desired integer; the exposure is conducted for each divided time; and consequently the respective read image data are added in digital manner.

A camera shake correction enable signal is output to the lens drive circuit LEMII 8 in Step S240 and a limit shutter speed Tf (normally 1/f) is calculated based on the read focal length f of the lens in Step 242. The limit shutter speed Tf is the slowest shutter speed at which the camera shake can be prevented. It is then discriminated whether the limit shutter speed Tf is greater than the integrating time Tccd in Step 244. If Tf>Tccd, the gain of the digital gain controller 118 is set at "1" on the assumption that the possibility of the camera shake is low in Step 272; the camera shake correction is prohibited in Step S274; and this subroutine proceeds to Step S266. The integration control is executed in Step S266; the camera shake correction is prohibited in Step S268; the adder (I) 105 is turned on Step S270; and this subroutine returns.

If Tf≦Tccd, the adder (I) 105 is turned on in Step S246. It is then discriminated whether 2Tf>Tccd in Step S248. If 2Tf>Tccd, the gain of the digital gain controller 118 is set at "2" on the assumption that the camera shake amount is small in Step S276 and the integrating time is divided by 2, i.e. is changed to Tccd/2, in Step S278. Consequently, the integration control is conducted twice in Steps S264 and S266. Upon the completion of the integration control, the camera shake correction is prohibited in Step S268; the adder (I) 105 is turned on Step S270; and this subroutine returns.

If 2Tf≦Tccd in Step S248, it is discriminated whether 4Tf>Tccd in Step S250. If 4Tf>Tccd, the gain of the digital gain controller 118 is set at "3" in Step S258 and the integrating time is divided by 3, i.e. is changed to Tccd/3, in Step S260. Consequently, the integration control is conducted three times in Steps S262, S264 and S266. Upon the completion of the integration control, the camera shake correction is prohibited in Step S268; the adder (I) 105 is turned on Step S270; and this subroutine returns.

If 4Tf≦Tccd in Step S250, the gain of the digital gain controller 118 is set at "4" in Step S252 and the integrating time is divided by 4, i.e. is changed to Tccd/4, in Step S254. Consequently, the integration control is conducted four times in Steps S256, S262, S264 and S266. Upon the completion of the integration control, the camera shake correction is prohibited in Step S268; the adder (I) 105 is turned on Step S270; and this subroutine returns.

The signal gain-controlled in the digital gain controller 118 is output alternately to the correlation memories 115, 116 for each integration. The correlation calculating circuit 117 correlates the image signals read from the memories 115, 116 to detect how much the image has been shifted, and outputs the correlation result to the LEMII 8. The LEMII 8 calculates a correction amount based on the received correlation result and drives the taking lens 211 by the obtained correction amount.

At this time, the image signals are added after each integration and are stored again in the RGB memory 106. This enables the attainment of the image for the entire exposure time and of the proper luminance of the image on the screen of the monitor 47.

Referring back to FIGS. 27A and 27B, after the exposure control is completed in Step S154, it is discriminated whether the continuous film drive mode is set in Step S156. If the continuous film drive mode is set, the variable Nc indicative of the address of the image memory 110 is incremented by one in Step S162 and the photographed image is written in an address corresponding to the incremented variable Nc in Step S164. More specifically, the still picture mode is not set when the continuous film drive mode is set and the photographed images are stored one by one so that the photographed images can be viewed as animated pictures upon the completion of the series shooting. Thereafter, the routine awaits any interrupt in Step S170. If the single film drive mode is set in Step S156, it is discriminated whether the manual mode is set in Step S158. If the manual mode is set, the animated picture mode is kept on without being changed to the still picture mode and the variable Nc is set at 1 in Step S160. Accordingly, the photographed image is written in the same address of the image memory 110 in Step S164. On the other hand, if the automatic mode is set in Step S158, the still picture flag SPF is set to set the still picture mode in Step S166 and a subroutine "Display Selection" is executed in Step S168.

Figure 30:
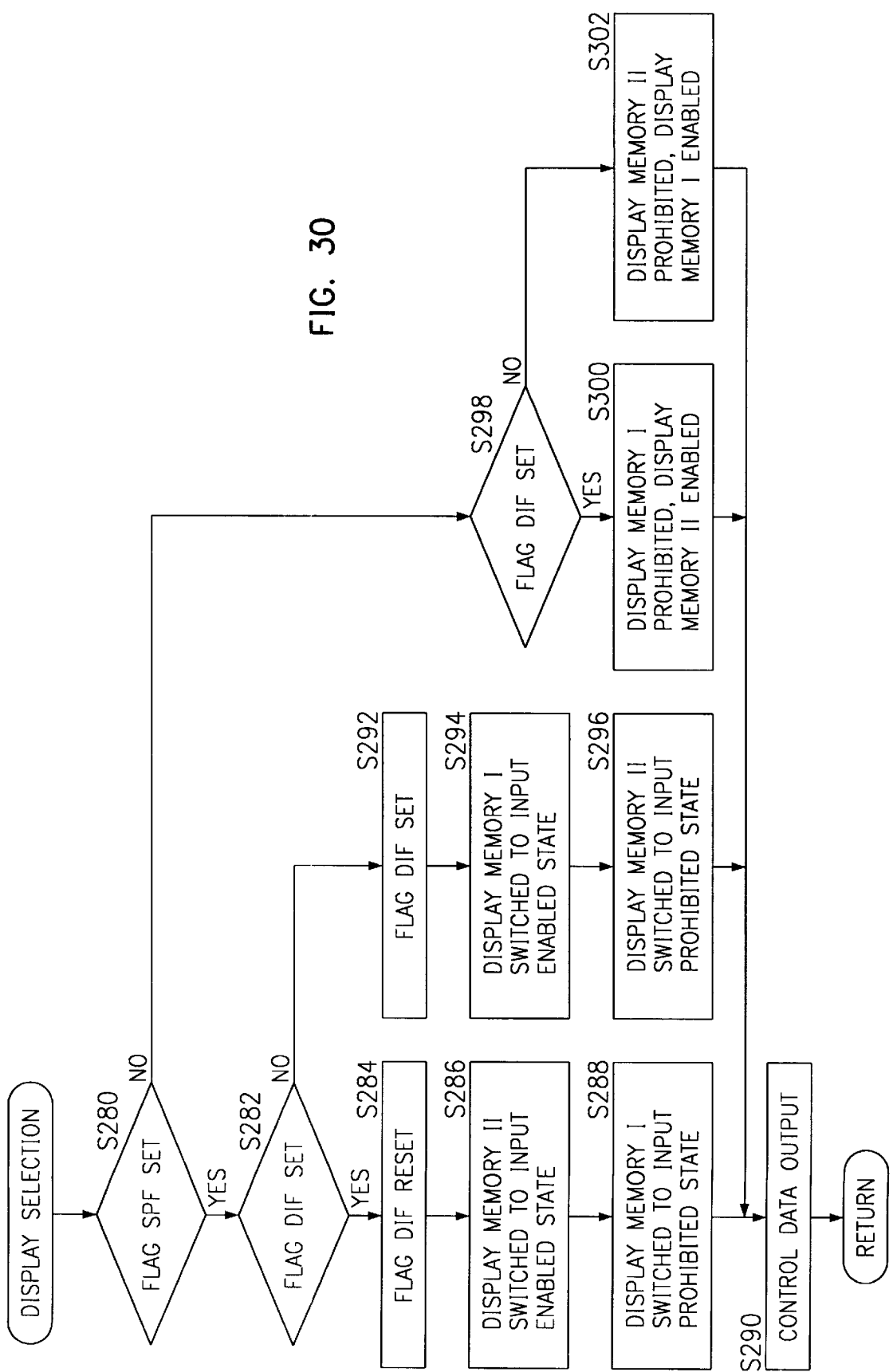
FIG. 30 is a flow chart showing a subroutine "Display Selection"

This subroutine "Display Selection" will be described with reference to FIG. 30.

It is first discriminated whether the flag SPF is set in Step S280. If the still picture flag SPF is set, it is then discriminated whether the flag DIF is set in Step S282.

If the flag DIF is set, this flag is reset in Step S284. Subsequently, the display memory 112 (denoted by display memory II in FIG. 30) is switched to an input enabled state in Step S286 and the display memory 111 (denoted by display memory I in FIG. 30) is switched to an input prohibited state in Step S288. Control data are output to the display memories 111, 112 in Step S290 and this subroutine returns. If the flag DIF is not set in S282, this flag is set in Step S292. Subsequently, the display memory 111 is switched to an input enabled state in Step S294 and the display memory 112 is switched to an input prohibited state in Step S296. The control data are output to the display memories 111, 112 in Step S296 and this subroutine returns.

If the still picture flag SPF is not set in Step S280, it is discriminated whether the flag DIF is set in Step S298. If the flag DIF is set, the display memory 111 is prohibited to output the display data while the display memory 112 is enabled to output the display data in Step S300. Conversely, if the flag DIF is set, the display memory 112 is prohibited to output the display data while the display memory 111 is enabled to output the display data in Step S302. As will be seen from the above, in the still picture mode, one of the display memories 111, 112 is brought into a state where the input is prohibited but the output is enabled, whereas the other is brought into a state where the input is enabled but the output is prohibited. Thus, the still picture can be displayed. In addition, the animated pictures can be displayed immediately after the display mode is changed from the still picture mode to the animated picture mode since a new image data is already stored in one of the display memories.

Referring back to FIGS. 27A and 27B, if the switch S2 is off in Step S152, it is discriminated whether the state of the switch Spv has been changed from OFF to ON in Step S172. If the discrimination result is in the affirmative, it is discriminated whether the still picture flag SPF is set in Step S174. If the still picture flag SPF is set, it is judged that the switch Spv has been operated to cancel the still picture mode and this flag SPF is reset in Step S182. Then, the subroutine "Display Selection" is executed in Step S184 and this subroutine returns. If the still picture flag SPF is not set in Step S174, the subroutine "Exposure Control" is executed in Step S176 to display the image picked by the CCD 43 in the monitor 47. Thereafter, the flag SPF is set in Step S178; the subroutine "Display Selection" is executed in Step S180: and this subroutine proceeds to Step S170.

If the discrimination result is in the negative in Step S172, it is discriminated whether still picture SPF is set in Step S186. If the flag SPF is not set, the flag SPF is set in Step S188 on the assumption that this routine is entered through the operation in the manual mode. Then, the variable Nc is set at 0 in Step S190 and the image signal from the address "0" (=Nc) of the image memory 110 is sent to the display memories 111, 112 and is displayed in the monitor 47 in Steps S192 and S194. If the flag SPF is set at Step S186, it is discriminated whether the state of the switch Sdpup has been changed from OFF to ON in Step S196. If the discrimination result is in the affirmative, the variable Nc is incremented by one and thereby the image signal from the address Nc of the image memory 110 is sent to the display memories 111, 112 and is displayed in the monitor 47 in Steps S198, S194.

If the discrimination result is in the negative in Step S196, the still picture flag SPF is reset in Step S200 on the assumption that this routine is entered by canceling the manual mode. Then, the variable Nc is set at 0 in Step S202 and the image signal from the address "0" (=Nc) of the image memory 110 is sent to the display memories 111, 112 and is displayed in the monitor 47 in Steps S204. Consequently, this subroutine returns.

Figure 31:
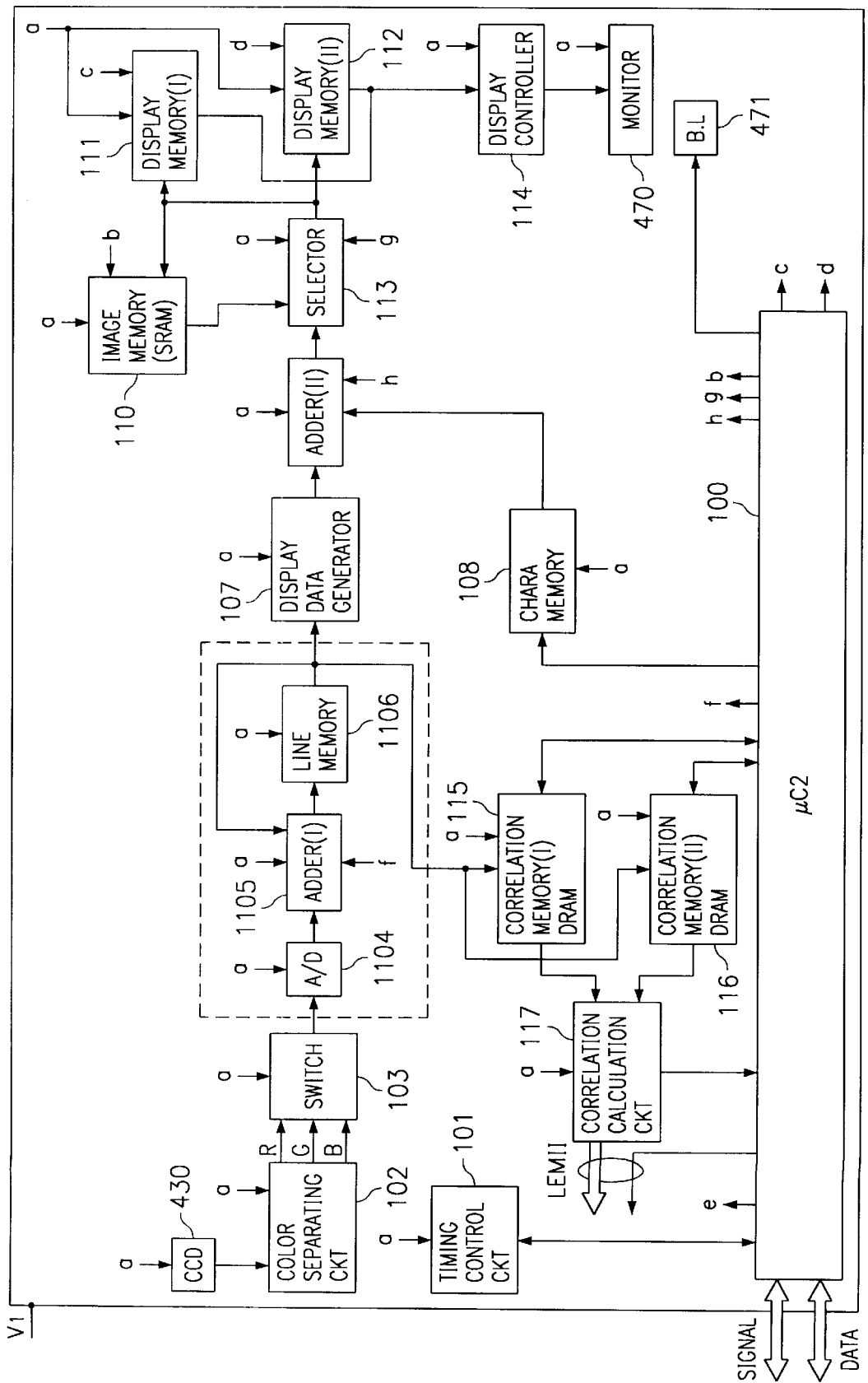
FIG. 31 is a diagram showing a modification of the CCD/monitor unit 10 shown in FIG. 6.

FIG. 31 shows a modified example of the CCD/monitor unit 10 shown in FIG. 6. It will be appreciated that like reference numerals denote like parts in FIGS. 6 and 31.

Figures 32, 33, 34:
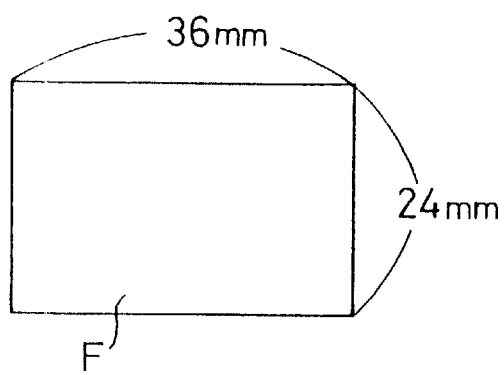
FIG. 32 is a diagram showing the arrangement of photoelectric conversion elements of a CCD 430 and R-, G-, and B-filters.
FIG. 33 is a diagram showing the arrangement of the R-, G-, and B-filters in a color monitor 470.
FIG. 34 is a diagram showing the dimensions of a frame of film.

FIG. 32 shows the arrangement of photoelectric conversion elements of a CCD 430 and R-, G-, B-filters. FIG. 33 shows the arrangement of R-, G-, B-filters on a color monitor 470. FIG. 34 shows the dimensions of a frame of film. In FIGS. 32 and 33, H1, H2, . . . denote lines and V1, V2, . . . denote columns.

In the CCD 430, color filters are arranged repeatedly in the order of R, G, B in a line direction H and the same color filters are arranged in a column direction V. The CCD 430 in use includes 280,000 pixels. The monitor 470 in use has the same filter arrangement as the CCD 430 and includes 70,000 pixels.

The number of pixels for picking up an image is four times as large as that of pixels for displaying the image. When a pixel pitch of the CCD 430 is considered in terms of the film size (24 mm×36 mm), an area on the film surface per pixel is 0.056 mm$^2$, which satisfies sufficiently the fineness required for measuring the brightness and the color temperature of the object. Accordingly, a specific number of pixels of the CCD 430 are combined into one pixel unit, so that the number of these pixel units equals that of the pixels of the monitor 470. In this embodiment, four pixels of the CCD 430 is treated as one pixel unit. In this case, the area on the film surface per pixel unit becomes 0.11 mm$^2$. This is still sufficiently fine considering that the area on the film surface corresponding to a range of the current spot metering is a circle of a diameter of 5 to 7 mm.

Also, the AF sensor 44 will have a resolution of 0.1 mm$^2$ on the film surface. Accordingly, it could be seen that the resolution of the AF sensor 44 is almost equal to the above-mentioned pixel pitch of 0.11 mm$^2$ of the CCD 430.

Hereafter, a control system for the modified CCD/monitor circuit 10 will be described.

A pixel unit of four pixels determined by the lines H1, H2 and the columns V1, V2 of the CCD 430 is caused to correspond to a pixel determined by the line H1 and the column V1 of the monitor 470. This pixel unit is assumed to be red (R). A next pixel unit of four pixels determined by the lines H1, H2 and the columns V3, V4 of the CCD 430 is caused to correspond to a pixel determined by the line H1 and the column V2 of the monitor 470. This pixel unit is assumed to be blue (B). A next pixel unit of four pixels determined by the lines H1, H2 and the columns V5, V6 of the CCD 430 is caused to correspond to a pixel determined by the line H1 and the column V3 of the monitor 470. This pixel unit is assumed to be green (G). In this manner, the color is determined for the rest of the pixel units. The color (temperature), the luminance, and the camera shake amount are detected using the outputs from the pixels corresponding to the CCD 430.

The above control is executed particularly by a portion of the CCD/monitor unit 10 enclosed by a broken line in FIG. 31 and the microcomputer 100.

More specifically, an A/D converter 1104 samples the signals for one line from the CCD 430 every other pixel in accordance with a timing signal a from a timing control circuit 101. For example, there are read pixel signals corresponding to the columns V1, V3, V5, . . . Vn (n=odd integer), . . . for the line H1. The pixel signals for every other pixel are sequenced in the order of R, B, G and are stored in a line memory 1106. The pixel signals stored in the memory 1106 are fed back to an adder (I) 1105 in which the pixel signals of the same color from the pixels adjacent in the column direction (here the line H2) are added to the fedback pixel signals. In a display data generator 107, signals to be displayed are generated sequentially from these added signals. Thus generated signals are written in an image memory 110 or display memories 111, 112.

In this case, data concerning the color can be generated from two of the four pixels in the CCD 430 and the data for these two pixels are added as described above. Accordingly, an integrating time can be shorted to ½ in this embodiment. The luminance and color are calculated by the microcomputer 100 using the contents stored in the display memories 111, 112.

The above construction enables the RGB memory 106 to be replaced by the line memory 110 and the storage capacity of the display memories 111, 112 to be reduced, thereby reducing a production cost. Further, the integrating time can be shortened to ½, which enables the animated pictures to be displayed in a shorter cycle even when the exposure time is long, and shortens a camera shake detecting cycle to thereby reduce the number of correlations to be conducted. Furthermore, the processing in the display data generator 107 can be simplified since the microcomputer 100 calculates the luminance and the color using the contents of the display memories 111, 112.

According to the filter arrangement and the pixel number of the CCD 430 and the monitor 470, the timing signal a of the timing control circuit 101 may be adjusted suitably and the integrating time and the storage capacity may be changed suitably.

Figure 35:
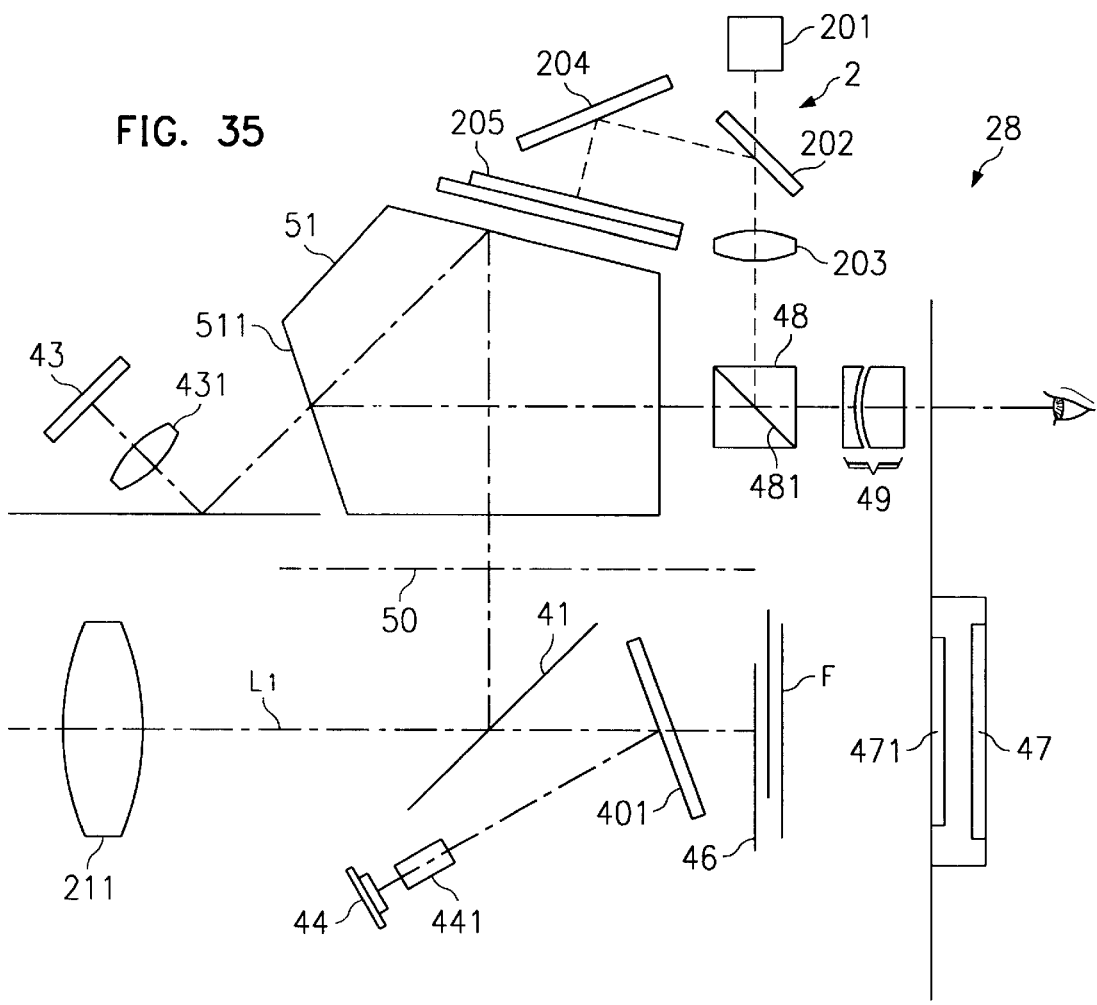
FIG. 35 is a diagram, similar to FIG. 5, showing the interior construction of a camera system as a second embodiment of the invention in which an optical viewfinder and a monitor are provided separately.
Figure 36:
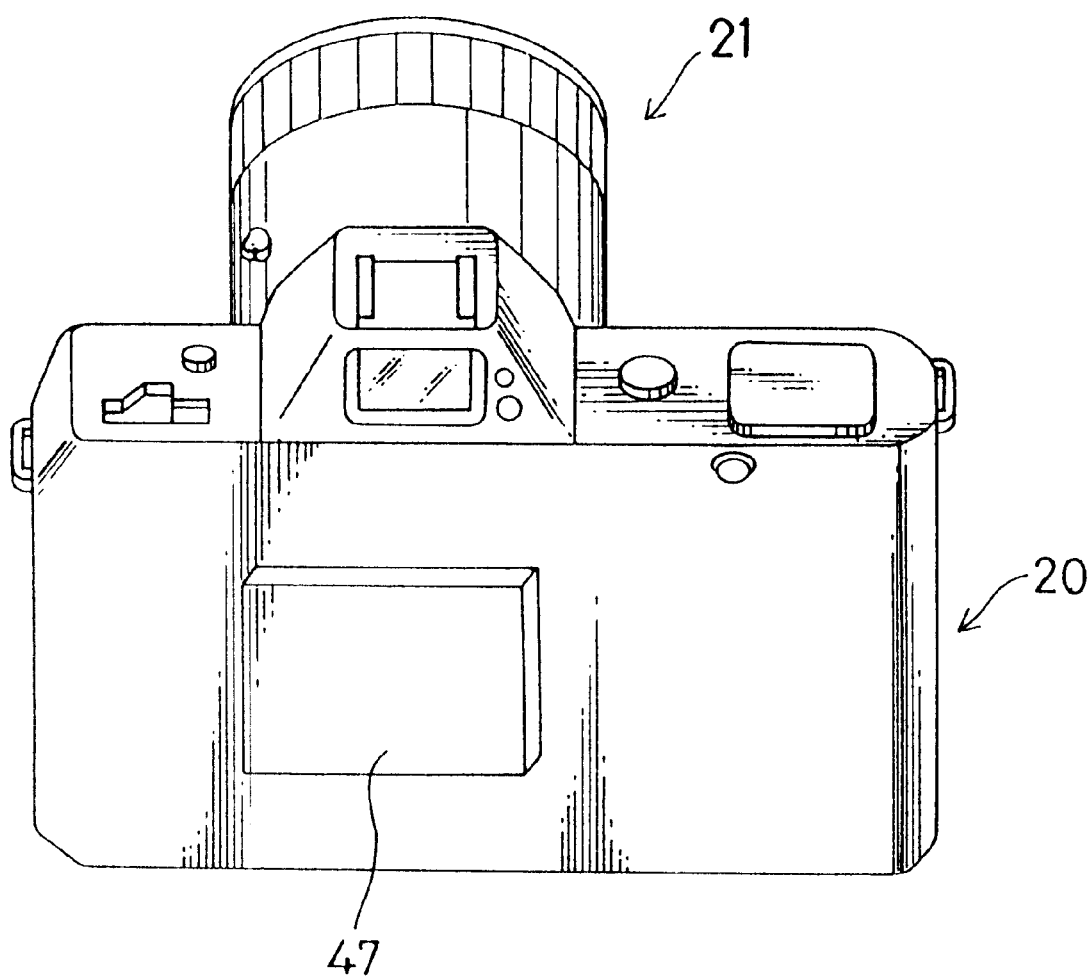
FIG. 36 is a rear perspective view, similar to FIG. 3, showing the second camera system having the interior construction shown in FIG. 35.

FIG. 35 is an interior construction diagram showing a second embodiment in which an optical viewfinder and a monitor 47 are provided separately. FIG. 36 is a rear perspective view of the second camera provided with a monitor as such an embodiment. It should be noted that like reference numerals denote like parts in the first embodiment.

The monitor 47 is arranged at a back cover of a camera main body 20 and a photographed image or the like is observable in the monitor 47 from behind the second camera.

As shown in FIG. 35, an optical viewfinder 28 is located above and a taking lens unit is located below.

In the taking lens unit, an AF sensor 44 is capable of picking up an object image which has passed through a pellicle mirror 41 which is a semitransparent mirror, has been reflected by a sub-mirror 401, and has passed through a relay lens 441. The sub-mirror 401 moves down from an optical path during the photographing operation. A film F is exposed by operating controllably a shutter 46 in this state.

The optical viewfinder 28 employed in this embodiment is a normal one including a virtual focusing plate 50, a pentagonal roof prism 51, a lens 48, an eye-piece lens 49 and the like. A portion of a beam of light transmitted through a taking lens 211 is reflected toward the viewfinder by the pellicle mirror 40 and forms an image on the virtual focusing plate 50. This image is introduced to the viewfinder 28 through the roof prism 51, the lens 48 and the eye-piece lens 49, thereby allowing the camera operator to view the object image.

A gaze detecting circuit 2 is arranged before and above the roof prism 51 and includes an infrared LED 201, a semi-transparent mirror 202 for changing a return optical path from a forward one, a focusing lens 203, a semitransparent surface 481, a mirror 204 placed on the return optical path, and an infrared area sensor 205. In the infrared area sensor 205, there are formed gaze areas AR1 to AR16 as described in the foregoing embodiment.

One of the surfaces of the roof prism 51 constitutes a semitransparent mirror 51 and reflects a portion of a beam of light. The reflected beam forms an image through a relay lens 431, and thus the formed image is picked up by the CCD 43 disposed at this image forming position. The image picked up by the CCD 43 is introduced to the monitor 47 to be displayed therein in a manner similar to the one described in the foregoing embodiment.

Although the light image transmitted through the taking lens is introduced to the CCD in the foregoing embodiments, it may be also appropriate to provide an optical system different from the taking lens unit to pick up the image. This arrangement will eliminate the inconvenience that the integrating operation in the CCD can be carried out only after the diaphragm is opened during the series shooting. Thus, the animated pictures can be displayed more lively during the series shooting because an image changing interval can be shortened.

Further, in the foregoing embodiments, the focus condition is detected each time the gaze area is set as the provisional focus condition detection AF1 (single AF). However, the AF mode may be switched automatically between the single AF mode and the continuous AF mode according to the object (still/moving).

Next, a third embodiment of the invention will be described with reference to FIGS. 37 to 85. The third embodiment enables a remote control for photography. It should be noted that like reference numerals denote like parts in the first embodiment.

Figure 38:
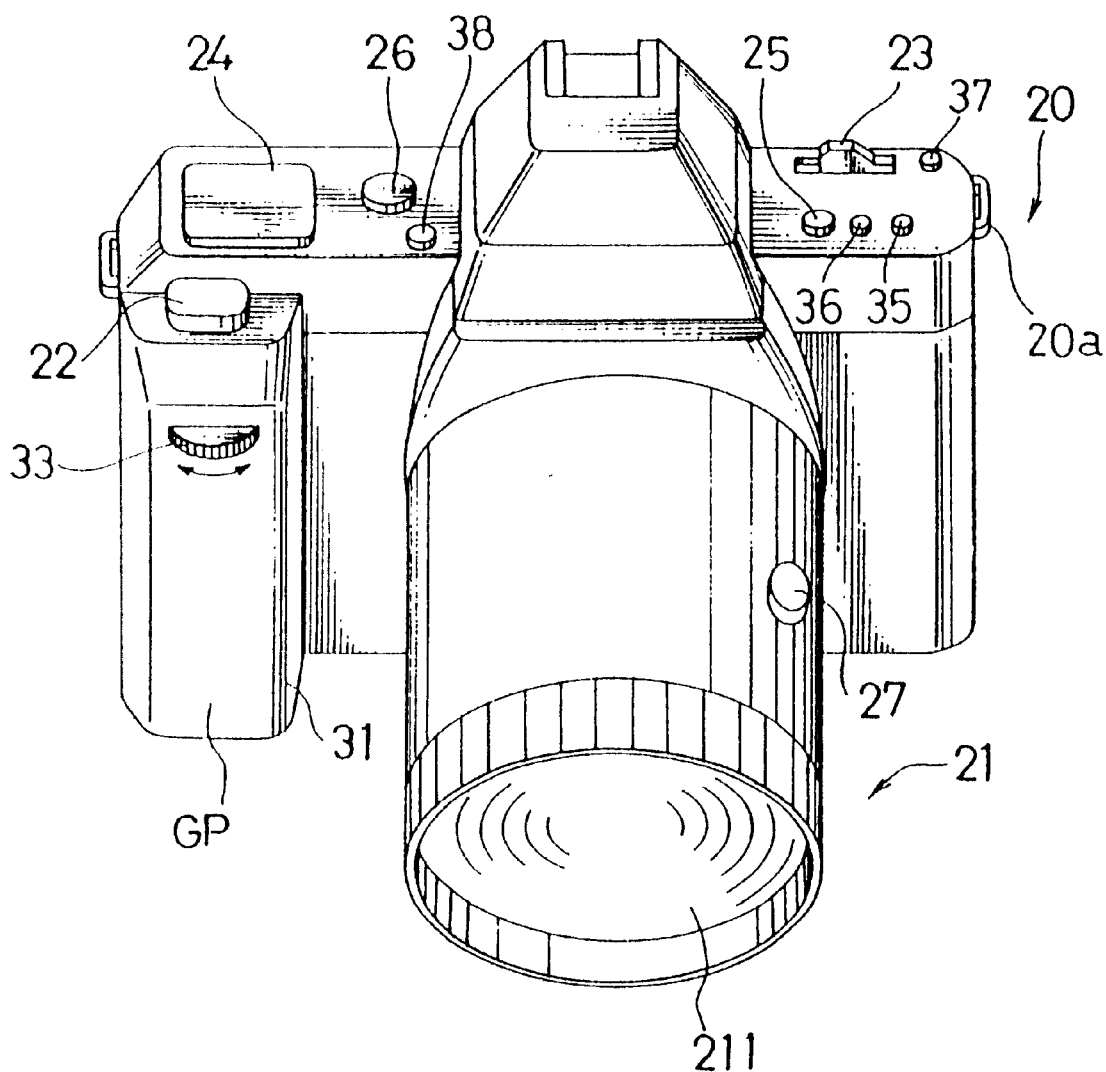
FIG. 38 is a front perspective view showing the external configuration of the third camera system.
Figure 39:
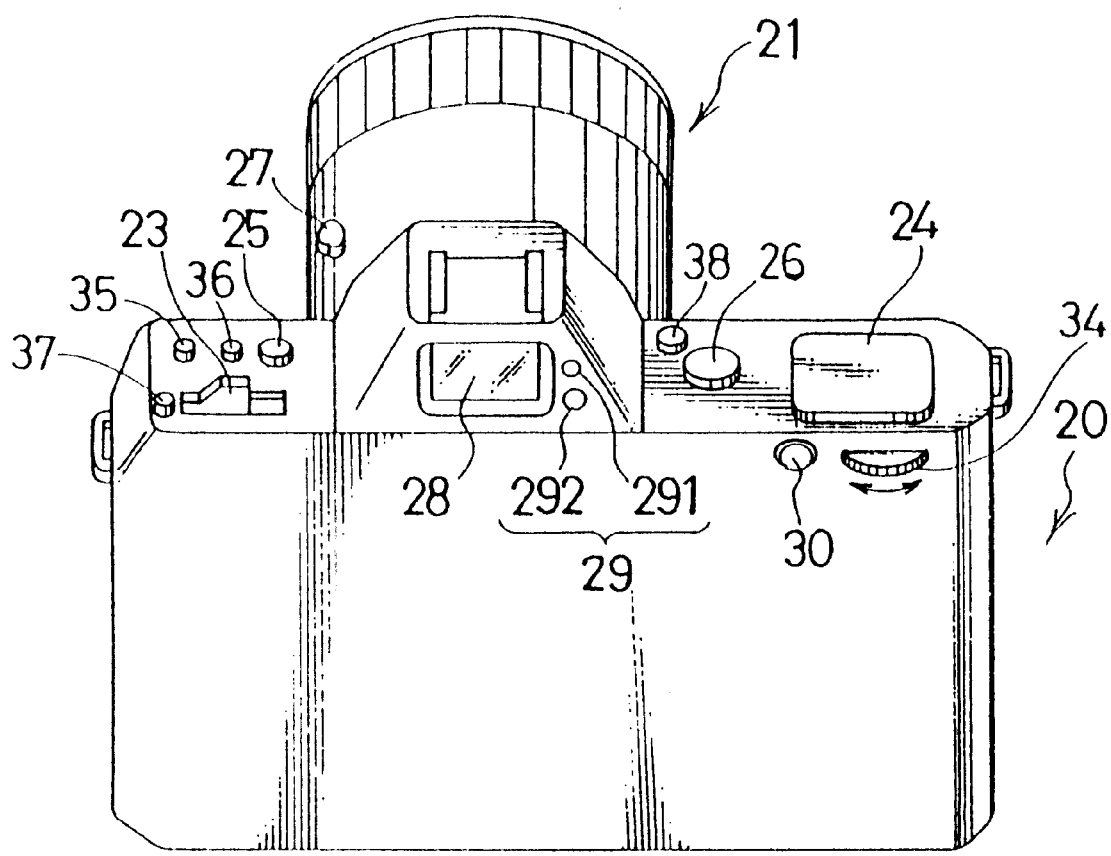
FIG. 39 is a rear perspective view showing the external configuration of the third camera system.
Figure 40:
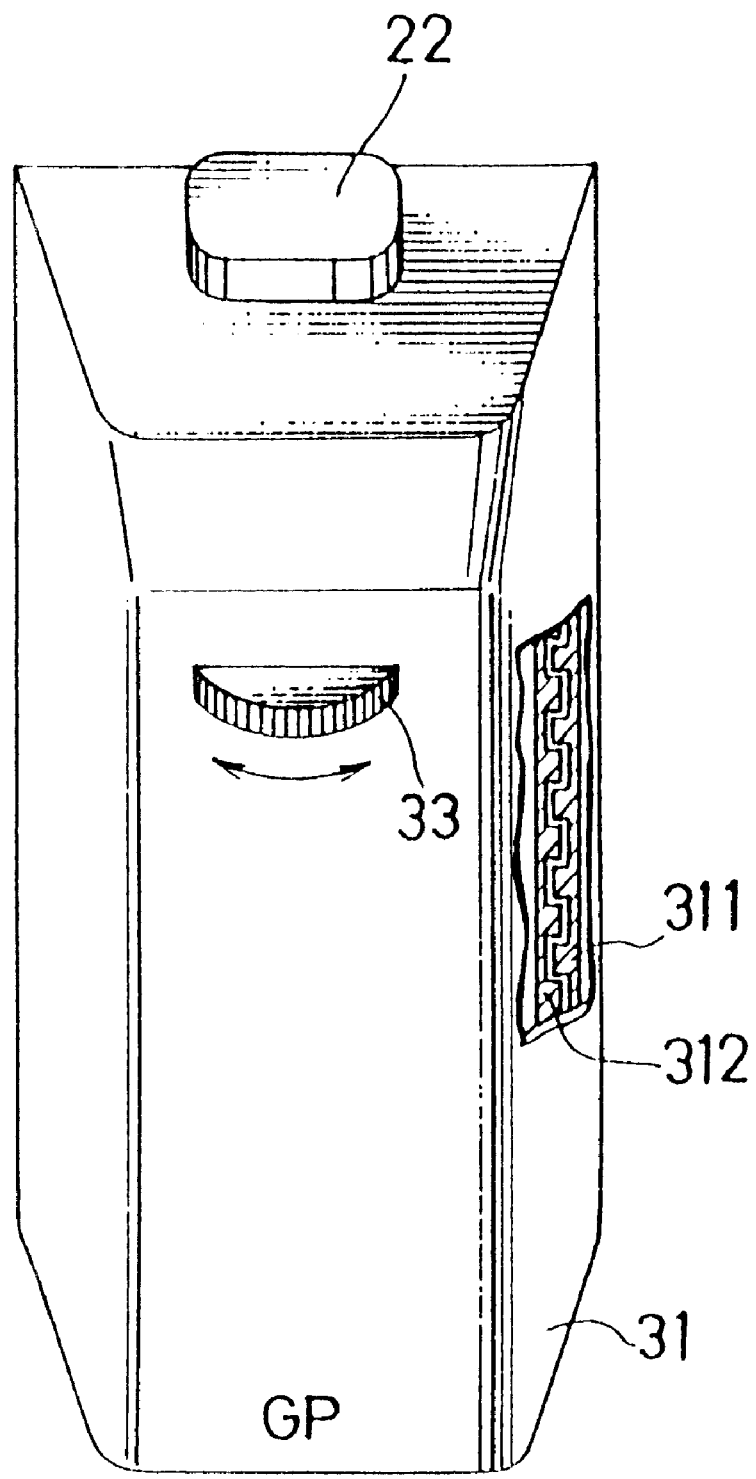
FIG. 40 is a diagram partially in section showing enlargedly a grip GP of the third camera system.

FIGS. 38 to 40 show the external configuration of the third camera according to the invention. FIG. 38 is a front perspective view of the camera; FIG. 39 is a rear perspective view thereof; and FIG. 40 shows enlargedly a grip GP.

This camera includes, similar to the first camera, a camera main body 20 and an integral or interchangeable taking lens unit 21. In a suitable position on one front side of the main body 20 is formed a grip GP which is held by a camera operator during a photographing operation. The following various operable members and other members are arranged on a top face of the camera main body 20: a release button 22, a slide switch 23, an on-body display unit 24, a display instruction button 25, a memory change switch 26.

Indicated at 33 is a front control dial which is provided at a suitable position on a front face of the grip GP and is rotated when numerical values of a photographing information are changed. Indicated at 34 is a rear control dial which is provided at a suitable position on a back face of the camera main body 20 and functions similar to the front control dial 33. Switches 35 to 37 are provided on the top face of the camera main body 20. The switch 35 is a color correction switch which is operated to perform color correction while viewing the monitor 47. The switch 36 is an exposure correction switch which is operated to perform exposure correction during the photographing operation under the ambient light. The switch 37 is an exposure correction switch which is operated to correct an amount of flash light during a flash firing photographing operation. When the front or rear control dial 33 or 34 is rotated in a state where these switches 35 to 37 are operated, the numerical values of parameters for the correction is changed. Indicated at 38 is an exposure mode changeover switch which is provided on the top face of the camera main body 20 and is operated to change an exposure mode of the camera (P, A, S, M). When the front or rear control dial 33 or 34 is rotated in a state where the exposure mode changeover switch 38 is operated, the exposure mode is changed.

Also, there are provided a preview switch 27, a viewfinder 28 as a monitor 47, a gaze area setting switch 30, and a cover 31. In a position near the viewfinder 28 is provided an eye sensor 29 including a light emitter 291 such as a LED and a light receiver 292 such as a silicon photo-cell (SPC).

Figure 42:
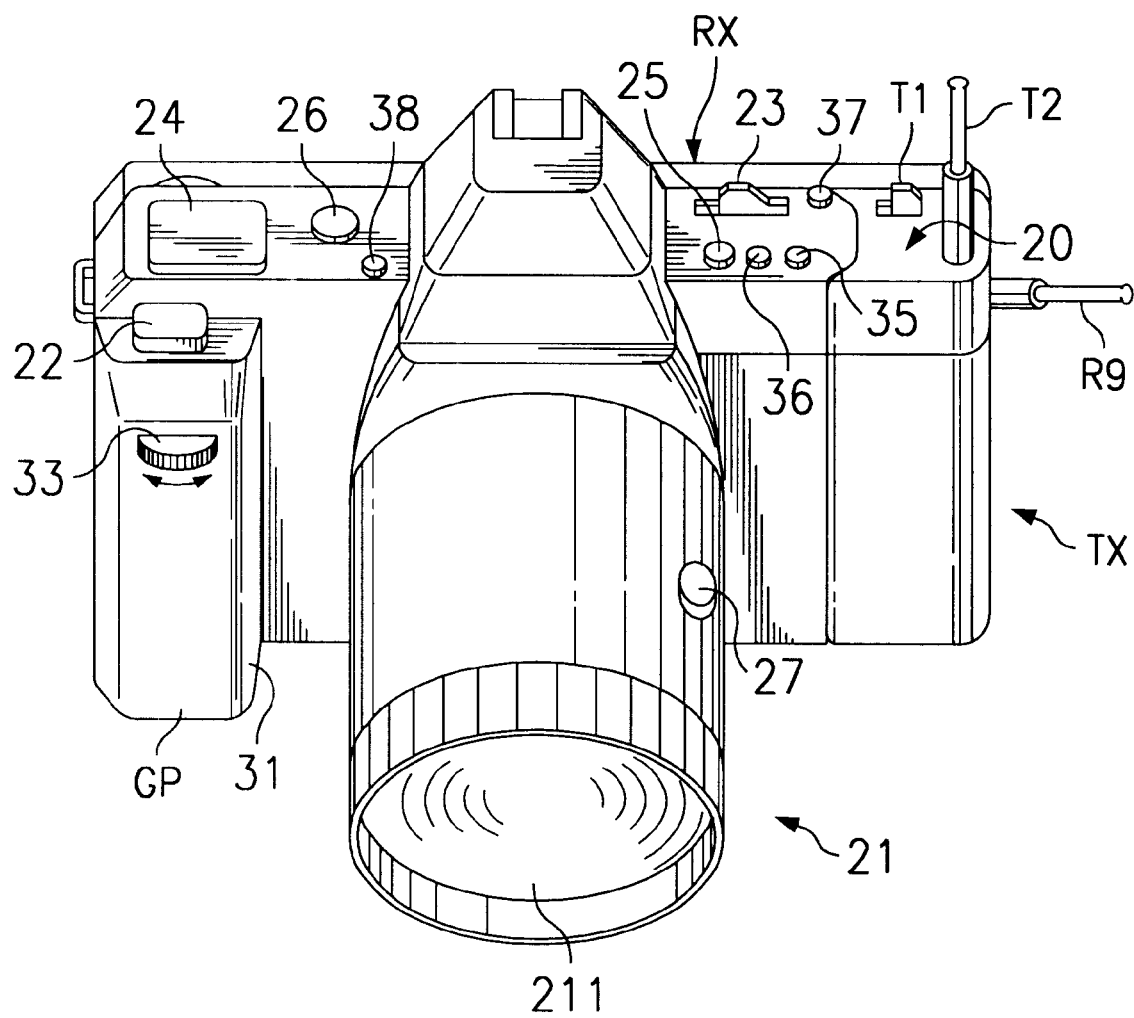
FIG. 42 is a front perspective view showing the camera system when the transceivers TX, RX are mounted thereon.
Figure 43:
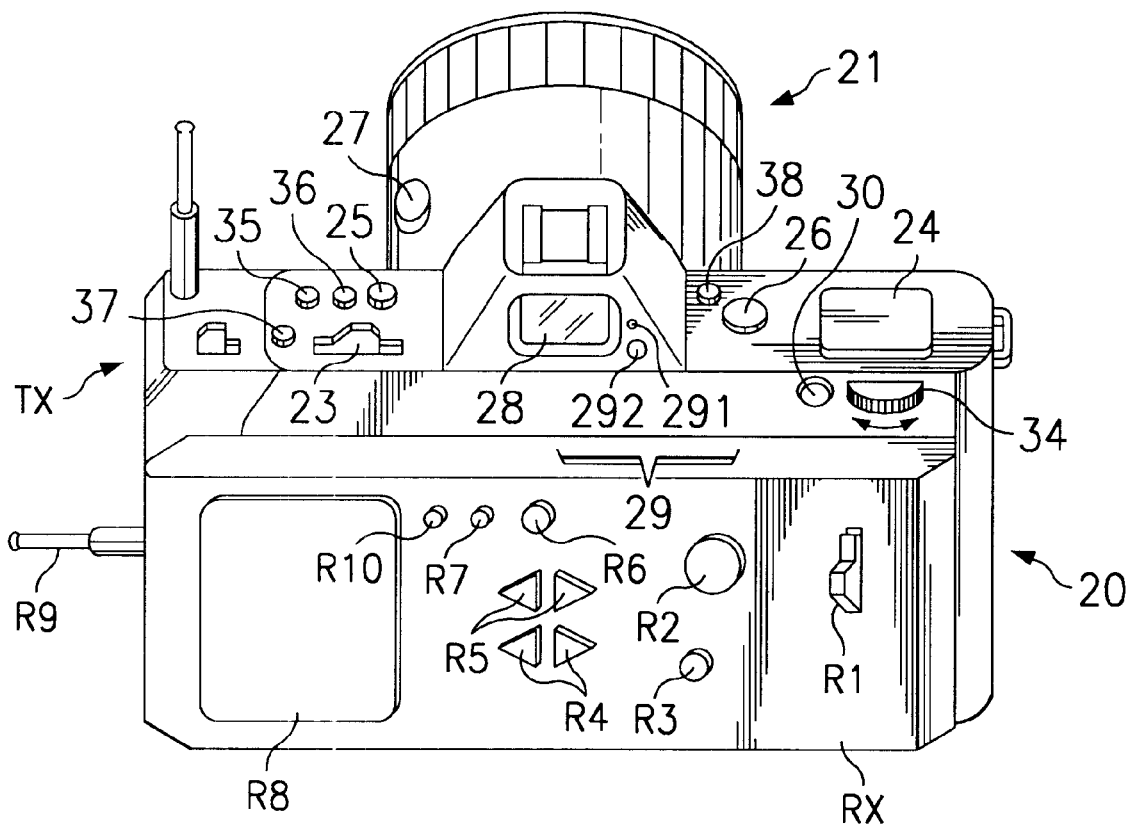
FIG. 43 is a rear perspective view showing the third camera system when the transceivers TX, RX are mounted thereon.

FIGS. 41A and 41B are diagrams showing respectively the exterior of transceivers TX, RX for transmitting and receiving image data. FIG. 41A shows the transceiver TX on the camera main body side and FIG. 41B shows the transceiver RX for conducting a remote control. These transceiver TX, RX are mountable on the camera main body 20 in consideration of the portability. FIGS. 42, 43 are front and rear perspective views showing respectively the camera main body 20 when the transceivers TX, RX are mounted thereon. A left side face of the transceiver TX (in the drawing of FIG. 41B) is so formed as to conform with the right side face of the camera main body 20 when viewed from front. These side faces are connected with each other through a holding member 20a so that the transceiver TX is mounted detachably on the camera main body 20. The transceiver RX is mounted detachably on the back face of the camera main body 20 through an unillustrated holding member with being held horizontally.

The transceivers TX, RX include each switches and other operable members corresponding to the switches and the like operable at the camera main body side. More specifically, indicated at T1 is a switch which is operated to conduct a remote control through the transceiver TX, and at T2 is an antenna through which signals are transmitted to and received from the transceiver RX. Indicated at R1 is a power supply switch for the transceiver RX; at R2 a release button corresponding to the release button 22; and at R3 an exposure mode changeover switch corresponding to the exposure mode changeover switch 38. Indicated at R4 are up- and down-switches corresponding to the front control dial 33; at R5 up- and down-switches corresponding to the rear control dial 34; at R6 a preview switch corresponding to the preview switch 27; at R7 an exposure correction switch under the ambient light corresponding to the exposure correction switch 36; at R8 a two-dimensional color liquid crystal display which functions similar to the monitor 47; R9 an antenna for transmitting and receiving signals to and from the transceiver TX; and R10 an exposure correction switch under the flash light which corresponds to the exposure correction switch 37. When the transceiver RX is mounted on the camera main body 20, the camera operator is allowed to view an image to be photographed which is displayed on the color liquid crystal display R8 of the transceiver RX without viewing through the viewfinder.

Figure 44:
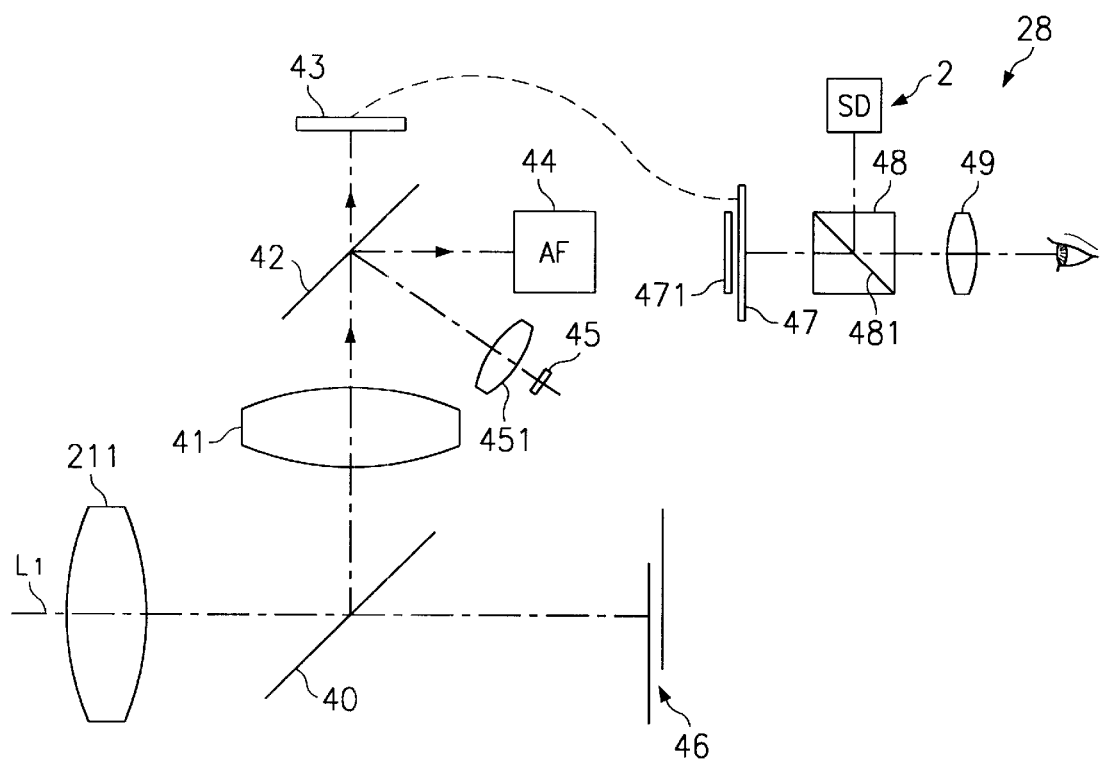
FIG. 44 is a diagram showing the internal construction of a taking lens unit and an optical system provided in a main body of the third camera system.

FIG. 44 is a diagram showing the internal construction concerning the taking lens unit 211 and an optical system provided in the third camera main body 20. The internal construction is similar to that of the first camera, which is shown in FIG. 5.

In the camera main body 20 is disposed a mirror 40 in such a manner similar to that of FIG. 5. This mirror 40 is adapted to introduce a portion of a beam of light transmitted through the taking lens 211 to a CCD 43, an AF sensor 44 and a light measuring/adjusting sensor 45 through a small optical system 41. The CCD 43 includes solid state photoelectric conversion elements arranged in the form of a matrix. Further, there is provided an optical member 48 for reflecting a spot light to detect the gaze.

The AF sensor 44 includes an AF sensor module and detects a focus condition, and the light measuring/adjusting sensor 45 measures the brightness of the object based on the beam of light transmitted through a condenser lens 451. The monitor 47 includes a two-dimensional color LCD or the like and displays an image picked up by the CCD 43 or an image stored in an image memory 110 to be described later.

Figure 49:
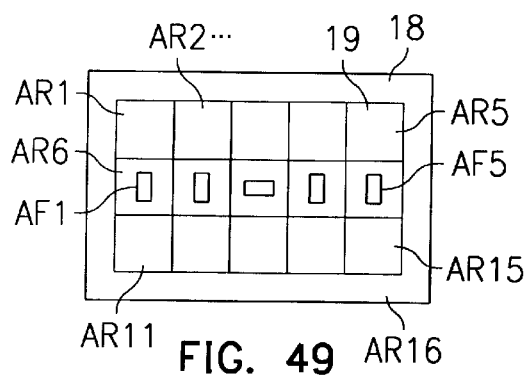
FIG. 49 is a diagram showing gaze areas, sensing areas of an AF sensor and a light measuring/adjusting sensor corresponding to the gaze areas.

The gaze detecting circuit 2 is provided to detect the gaze of the camera operator viewing through the viewfinder 28. FIG. 49 shows gaze areas, sensing areas of the AF sensor 44 and the light measuring/adjusting sensor 45 corresponding to the gaze areas. A gaze detection area frame 19 is used to indicate a range within which the gaze is detectable.

Figure 50:
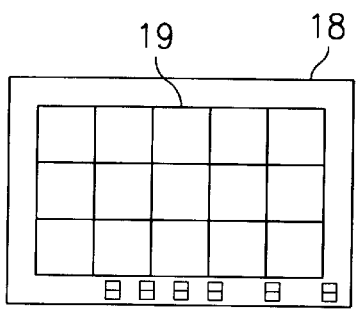
FIG. 50 is a diagram showing marks and the like which can be displayed in the monitor.
Figure 51:
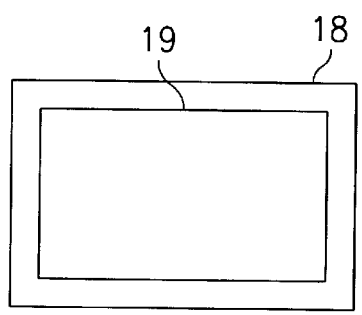
FIG. 51 is a diagram showing a state where a gaze detection area frame is displayed in the monitor.
Figure 52:
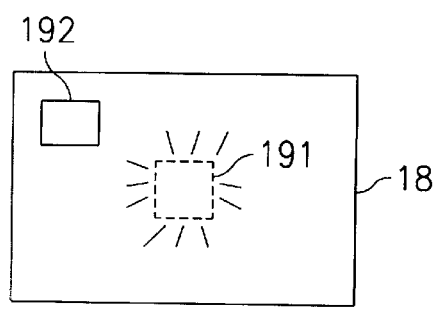
FIG. 52 is a diagram showing a state where a gaze area is displayed in the monitor.

The AF sensor 44 has sensing areas AF1 to AF5 for detecting the focus condition. FIG. 50 shows various marks which can be displayed in the monitor 47. FIG. 51 shows a state where the gaze detection area frame 19 is displayed in the monitor 47. FIG. 52 shows a state where the gaze area is displayed in the monitor 47.

Figure 37:
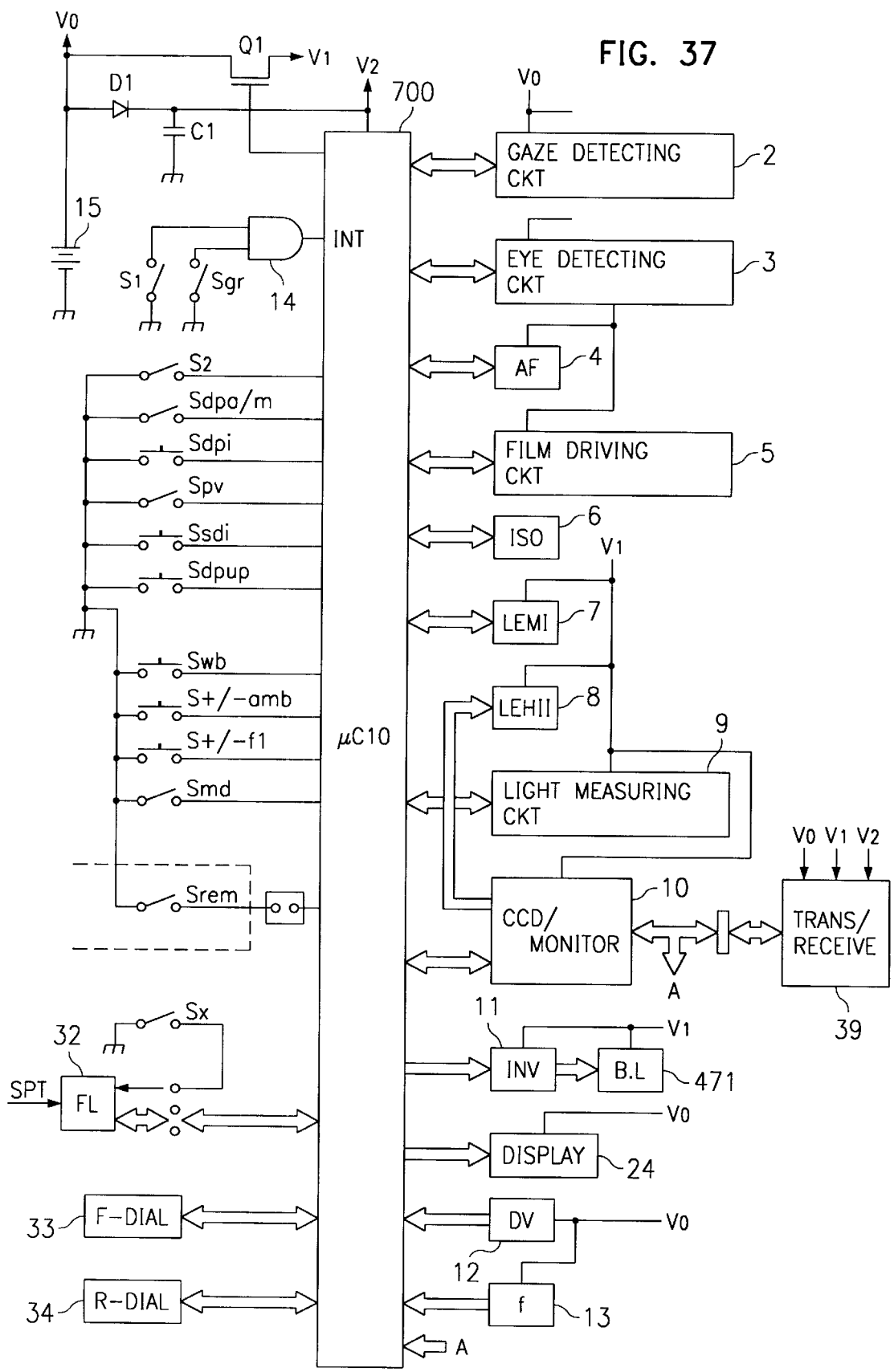
FIG. 37 is a block diagram showing circuits provided in a main body of a camera system as a third embodiment of the invention.

FIG. 37 is a block diagram showing circuits provided in the third camera main body according to the invention.

The third camera is provided with, similar to the first camera, a microcomputer (μC10) 700 receiving signals from various switches and operable members and signals representative of images picked up by the CCD 43, and executing various calculations and a sequence control for an overall camera in accordance with a program prewritten in an internal ROM (not shown), power supply 15 including an electric battery, an eye detecting circuit 3, focus condition detecting circuit (AF) 4, film driving circuit 5, film sensitivity reading circuit (ISO) 6, lens driving circuit (LEMI) 7, lens driving circuit (LEMII) 8, light measuring circuit 9, CCD/monitor unit 10, inverter (INV) 11, encoder (DV) 12, encoder (f) 13, and AND circuit 14.

In addition to the film sensitivity, the film type (Daylight type color film, Tungsten type color film, Monochrome film) can be read by the circuit (ISO) 6.

There is further provided a transmitting/receiving device 39 transmitting the signals representative of the picked up images and various control data to the transceiver RX and receives signals from various operable switches of the transceiver RX. The microcomputer 700 controls these transmitting and receiving operations.

In addition to switches S1, S2, Sdpa/m, Sdpi, Spv, Ssdi, and Sdpup which are similarly provided in the first camera, the third camera has the following switches:

Swb

The switch Swb corresponds to the color correction switch 35. When this switch Swb is operated together with the front control dial 33, bluish colors are corrected. When this switch Swb is operated together with the rear control dial 34, reddish colors are corrected.

Sx

The switch Sx is turned on when a travel of a first blind of the focal plane shutter is completed. In response to the on-state of this switch, the flash device starts firing.

S(±)amb

The switch S(±)amb, corresponding to the exposure correction switch 36, is turned on to carry out the exposure correction.

S(±)fl

The switch S(±)fl, corresponding to the exposure correction switch 37, is turned on to carry out the exposure control only by adjusting the amount of flash light.

Smd

The switch Smd, corresponding to the exposure mode changeover switch 38, is turned on to change the exposure mode.

Srem

The switch Srem is provided to change the control by the transceiver RX to the control by the camera main body 20 and vice versa. When the transceiver TX is mounted on the camera main body 20, thereby operating the switch T1 (i.e., switch Srem), an on- or off-signal of the switch Srem is sent to the microcomputer 700.

Figure 45:
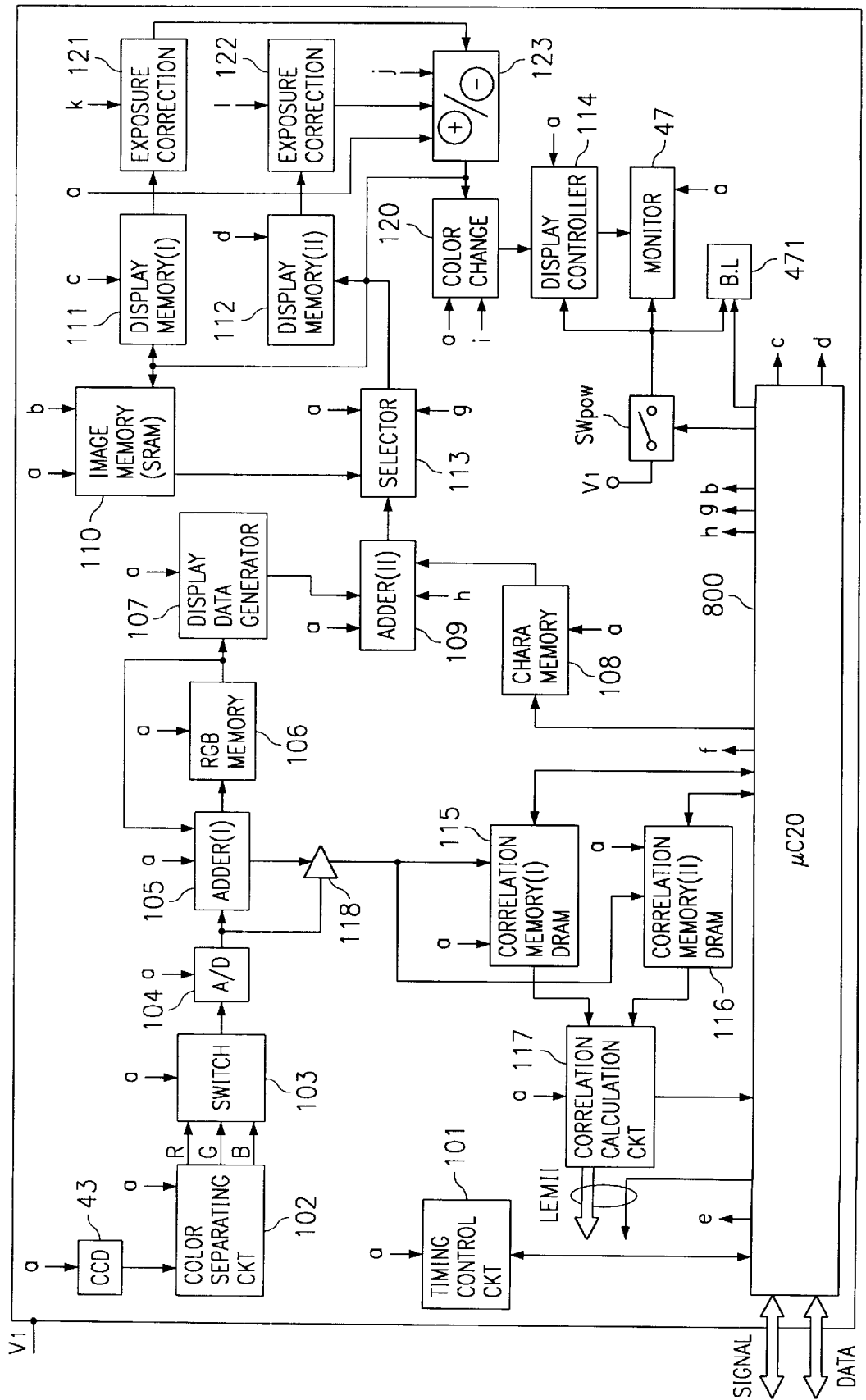
FIG. 45 is a circuit construction diagram showing a CCD/monitor unit.

FIG. 45 is a circuit construction diagram of the CCD/monitor unit 10.

The CCD/monitor unit 10 is provided internally with the microcomputer 800 sending command signals and control signals to respective circuits in the CCD/monitor unit 10 and executing data communication with the microcomputer 700 upon the receipt of a command from the microcomputer 700.

In the CCD/monitor unit 10 are provided CCD 43, timing control circuit 101, color separating circuit 102, switcher 103, A/D converter 104, adder(I) 105, RGB memory 106, display data generator 107, character memory 108, adder(II) 109, image memory 110 including a S-RAM or the like for storing the picked up image to be displayed.

Further, there are provided exposure correcting circuits 121, 122. The images stored in the display memories 111, 112 are output at a given speed repeatedly respectively to the exposure correcting circuits 121, 122 in each of which the exposure correction is applied to the input image in accordance with signals k, l from the microcomputer 800. The images having been subjected to the exposure correction in the exposure correcting circuit 121, 122 are introduced to an adding/subtracting circuit 123. This circuit 123 applies the addition or subtraction to the input signals or sends them to the next stage without performing any processing. The processed image signal is input to the display memories 111, 112, the image memory 110, and a color converting circuit 120. The image signal is introduced to the monitor 47 through a display control circuit 114 after having subjected to the color conversion. Each of the exposure correcting circuits 121, 122 changes the level of its output signal relative to that of its input signal by changing a gain.

A selector 113 may alternatively switch between the image generated by the display data generator 107 and the actually photographed image which is stored in the image memory 110 for display on monitor 47. A display controller 114 generates and sends an operation signal to the monitor 47 in accordance with the image signal output from the display memory 111 or 112. A switch SWpow is operated to control power supply to the display control circuit 114, the monitor 47, the back light 471 for the monitor 47. The switch SWpow is turned off when the control of the camera is changed to the remote control. thereby allowing only the liquid crystal display R8 of the transceiver RX to display the image. This is designed to save power.

The CCD/monitor unit 10 has, similar to the first embodiment, correlation memories 115 and 116 including a DRAM each and storing a specific part of a picked up image, a correlation calculating circuit 117 calculating correlation between the two images upon the receipt of the image signals from the correlation memories 115 and 116 so as to obtain a camera shake amount, and driving the LEMII 8 based on the obtained camera shake amount to correct the image shake, a digital gain controller circuit 118 amplifying an input signal digitally with a gain set in accordance with a control signal e.

Figure 46:
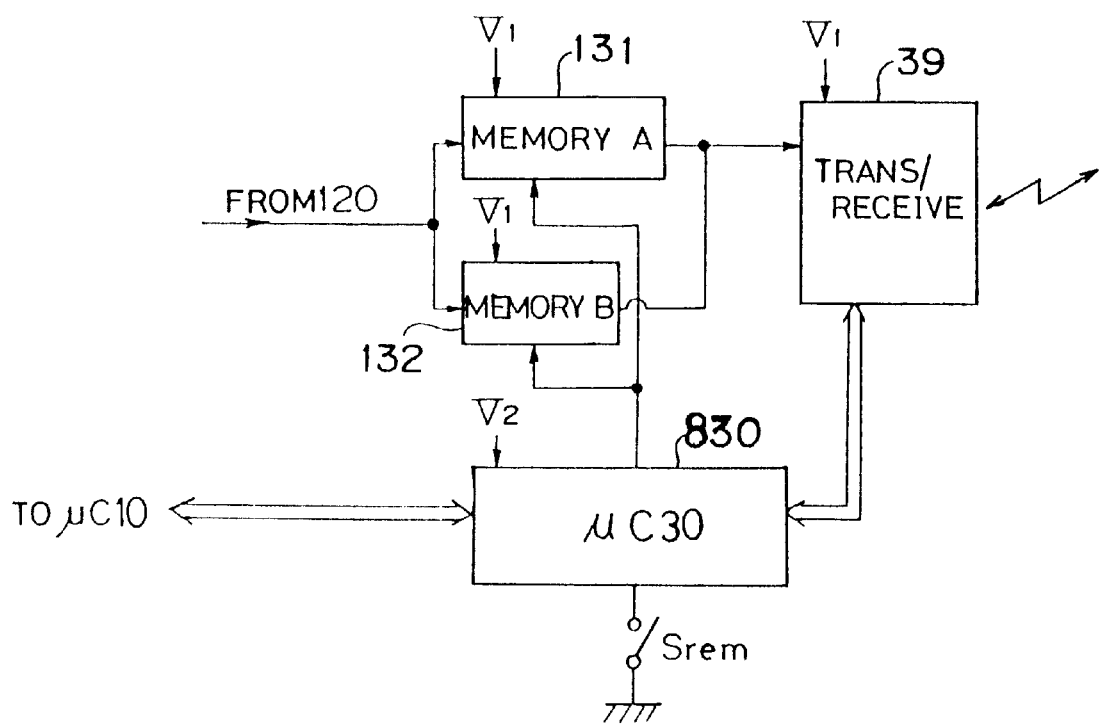
FIG. 46 is a block diagram showing the transceiver TX.

FIG. 46 is a block diagram showing the transceiver TX. When the transceiver TX is mounted on the camera main body 20, unillustrated power supply terminals of the camera main body 20 and the transceiver TX are connected, thereby enabling the power to be supplied from the camera main body 20 to the transceiver TX. A microcomputer ($\mu$C30) 830 controls respective elements of the transceiver TX, transmits and receives signals to and from the microcomputer 700. The memories 131, 132 receive and store the image signal from the color converting circuit 120 of the camera main body 20. These memories 131, 132 are switched alternately so that the image data is written in one memory while the former image data is output in the other memory. The transmitting/receiving device 39 transmits the image data and the control data to a transmitting/receiving device of the transceiver RX and receives the operation data therefrom.

Figure 47:
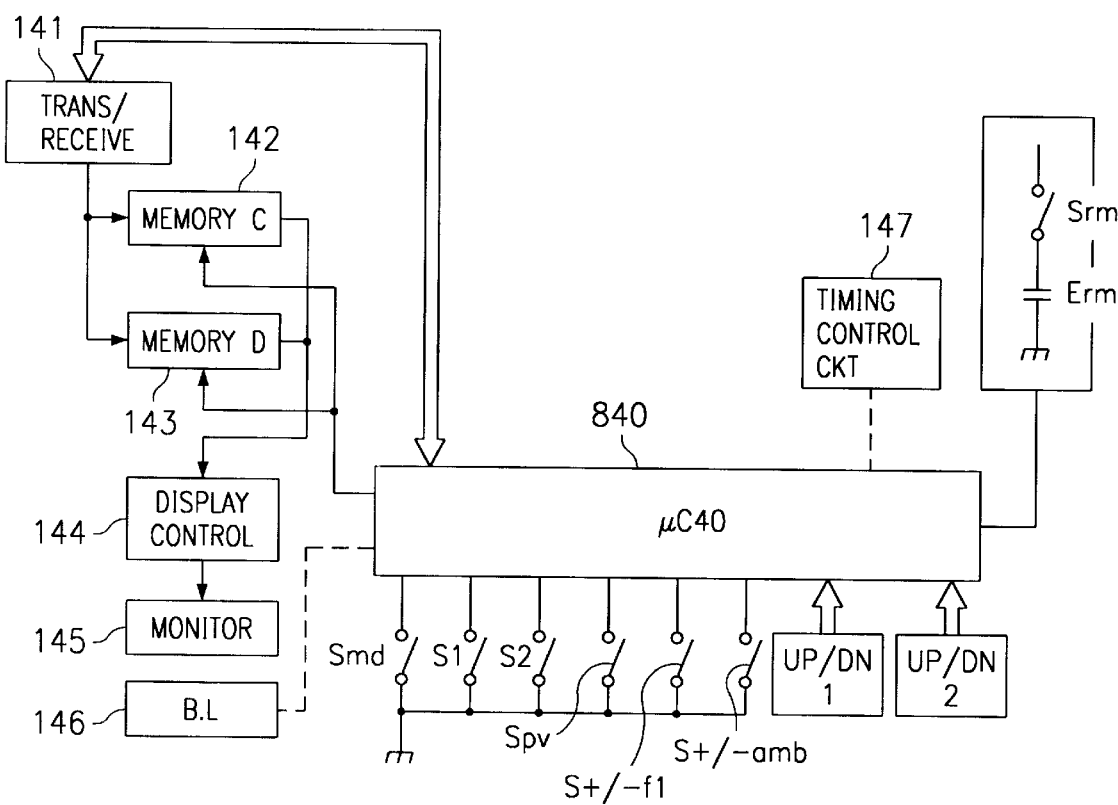
FIG. 47 is a block diagram showing the transceiver RX.

FIG. 47 is a block diagram showing the transceiver RX. A microcomputer ($\mu$C40) 840 controls respective elements of the transceiver RX. A transmitting/receiving device 141 receives the image data and the control data from the transceiver TX of the camera main body 20 and transmits the operation data thereto. The received image data are written sequentially in memories 142, 143 and are output repeatedly to a display control circuit 144. The image data are then output to a color LCD 145 constituting the liquid crystal display R8 similar to the case in the camera main body 20, and are displayed as still pictures. A timing control circuit 147 generates and sends a timing signal used to measure timings for the signals which cause the respective circuits to operate. Indicated at 142, 143 is a back light for projecting light to the color LCD 145.

Various switches will be described next.

Srm

The switch Srm, corresponding to the power supply switch R1, is turned on and off to allow and interrupt power supply Erm.

Smd

The switch Smd corresponds to the exposure mode changeover switch R3.

S1, S2

The switches S1, S2 corresponds to the release button R3. An exposure preparation is started when the release button R3 is pressed halfway, and the exposure control is conducted when the button R3 is pressed all the way.

Spv

The switch Spv corresponds to the preview switch R6.

S(±)fl

The switch S(±)fl corresponds to the exposure correction switch R10.

S(±)amb

The switch S(±)amb corresponds to the exposure correction switch R7.

S(up/dn)1

The switch S(up/dn)1 corresponds to the up-and down-switches R4.

S(up/dn)2

The switch S(up/dn)2 corresponds to the up- and down-switches R5.

Figure 48:
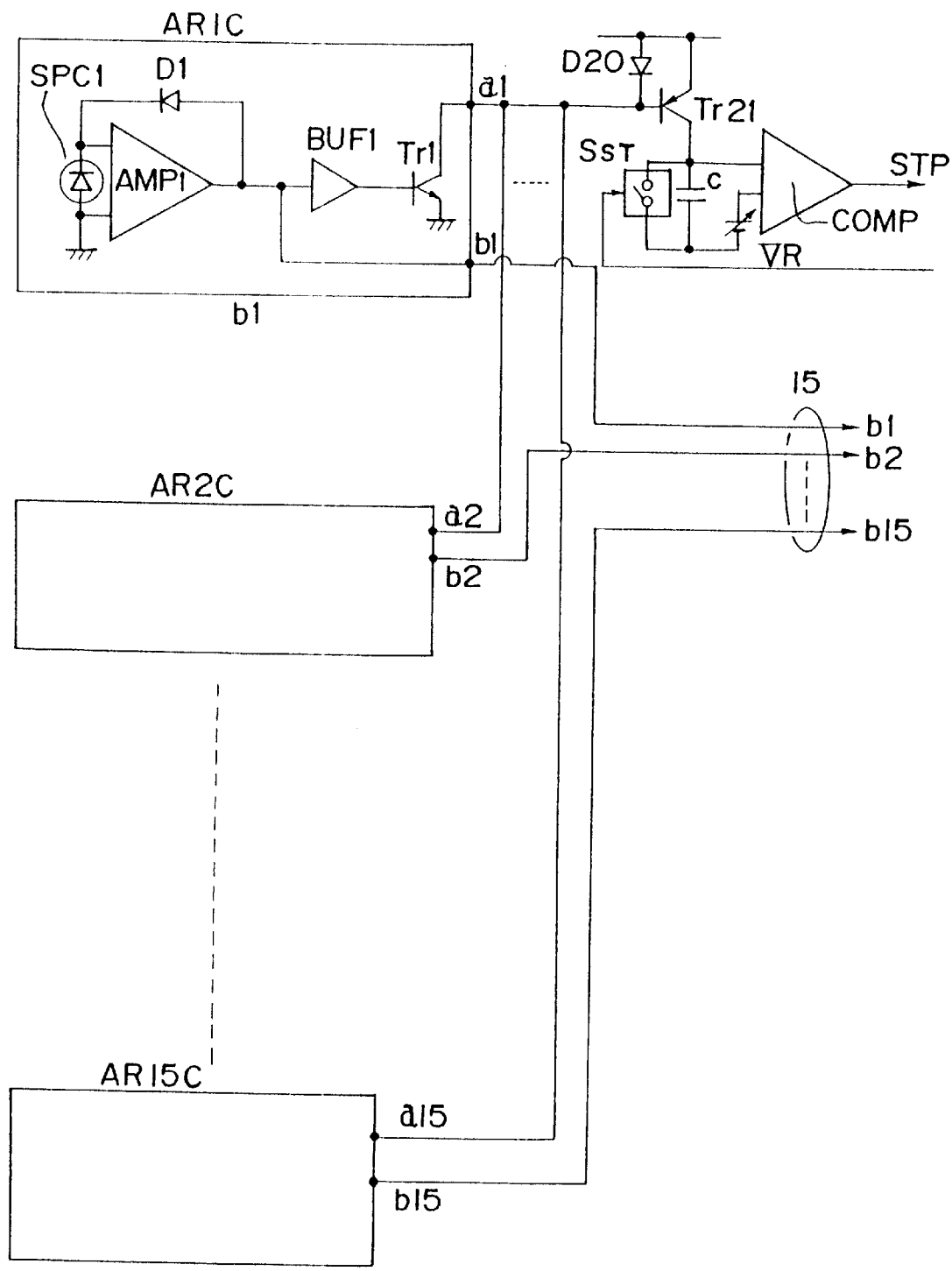
FIG. 48 is an internal circuit diagram of a light measuring/adjusting circuit 9.

FIG. 48 is an internal circuit diagram of the light measuring/adjusting circuit 9.

Indicated at AR1C to AR15C are light measuring circuits corresponding to the areas AR1 to AR15. Since these circuits are constructed identically, description will be given only on the AR1C. Indicated at SPC1 is a light measuring (light adjusting) element and is connected between input terminals of an operational amplifier AMP1. A diode D1 is provided between an output terminal of the operational amplifier AMP1 and one of the input terminals thereof to perform logarithmic compression. Indicated at BUF1 is a buffer which has an output terminal connected to a transistor Tr1 for expanding the compressed signal. A collector of the extension transistor Tr1 is connected to an output terminal a1 while the output terminal of the operational amplifier AMP1 is connected to an output terminal b1.

The light measuring circuit AR1 operates as follows. The light measuring (light adjusting) element SPC1 outputs a current according to the light incident thereupon. This output current is compressed by the diode D1 and is output to the microcomputer 700 as a light measurement signal through the buffer BUF1.

On the other hand, the light measurement signal is fed through the buffer BUF1 to the transistor Tr1 to be expanded therein. The expanded signal is input to a base of a transistor Tr21 through the output terminal a1. The transistor Tr21 has an emitter connected to a constant voltage supply, a collector connected to a capacitor C for charging, and a base connected to a cathode of a diode D20 which is connected to the constant voltage supply.

To the base of the transistor Tr21 are input all the output currents from output terminals a1, a2, . . . , a15 of the light measuring circuits AR1C to AR15C. The average light adjustment is performed in all the areas AR1 to AR15, by supplying a current equal to the input current signal to the capacitor C.

Indicated at Sst is a light adjustment start switch which is turned off when the light adjustment is started, at VR a variable voltage supply whose reference voltage is variable according to the film sensitivity, and at COMP a comparator which outputs an emission stop signal STP by inverting an output when a charging voltage of the capacitor C becomes in excess of the reference voltage of the variable voltage supply VR. After the start of the exposure, the capacitor C is charged by the current from the transistor Tr21. When the charging voltage becomes in excess of the reference voltage, the emission stop signal STP is output on the assumption that a proper exposure has been attained, so as to stop the firing of the flash device.

The operation of the third camera will be described hereafter. With the reference to FIGS. 43 to 80B, a control executed by the microcomputer 700 will be described.

Various flags will be first described. TABLE-5 below shows contents of states when the respective flags are set or reset.

TABLE 5

| FLAG | SET | RESET |
| --- | --- | --- |
| SGRF | EYE DETECTED | EYE NOT DETECTED |
| TMF | TIMER ON | TIMER OFF |
| RSTF | AREA CANCELED | AREA NOT CANCELED |
| ARF | AREA DESIGNATED | AREA NOT DESIGNATED |
| AFEF | IN-FOCUS CONDITION OBTAINED | IN-FOCUS CONDITION NOT OBTAINED |
| DIF | DISPLAY MEMORY I USED | DISPLAY MEMORY II USED |
| SPF | STILL PICTURE MODE ON | ANIMATED PICTURE MODE ON |

An eye flag SGRF is indicative of whether or not a camera operator, or "eye", has been detected. A timer flag TMF is reset at a specified period after the no gaze area is detected. A gaze area reset flag RSTF is set when the designated gaze area is canceled. A gaze area flag ARF is set when a gaze area is designated. An in-focus flag AFEF is set when an in-focus condition is attained. A flag DIF is set when the display memories 111, 112 are used. A still picture flag SPF is set when the still picture mode is on. A flag SPIF is a control flag for inputs and outputs of the display memories 111, 112. Throughout this specification, the flag is set when it is set at 1, whereas it is not set when it is set at 0.

Figure 53:
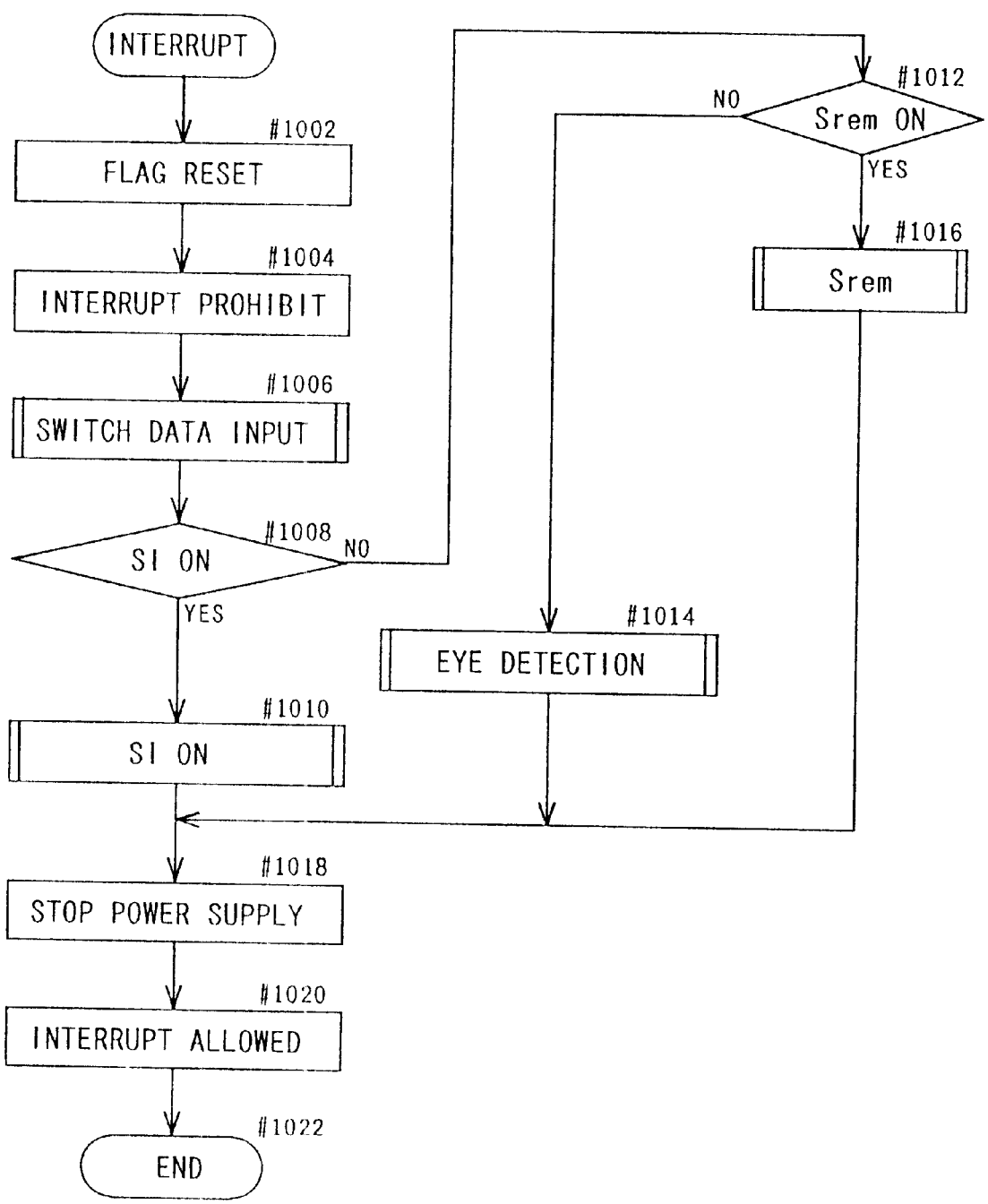
FIG. 53 is a flow chart showing an interrupt routine executed when a switch S1 or grip switch Sg is turned on in the third camera system.

FIG. 53 is a flow chart showing an interrupt routine (main routine) executed when the switch S1 or the grip switch Sg is turned on.

When the interruption is made by turning on the switch S1 or Sg, the microcomputer 700 resets all the flags (Step #1002) and prohibits any interruption to this routine (Step #1004). Subsequently, data concerning the various switches are input (Step #1006) so that the control can be executed according to the operated states of the switches.

Figure 54:
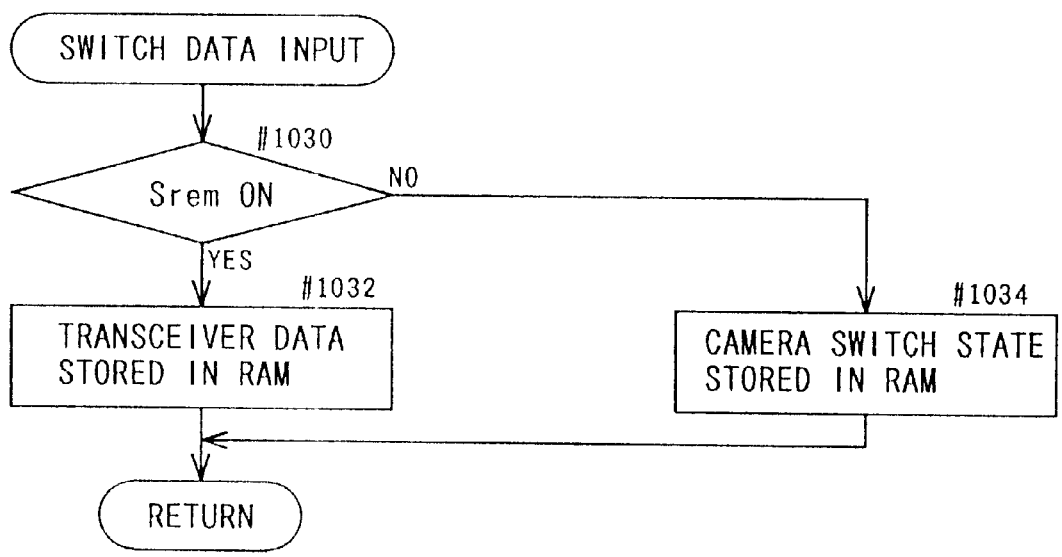
FIG. 54 is a flow chart showing a subroutine "Switch Data Input"

FIG. 54 is a flow chart showing a subroutine "Switch Data Input."

It is first discriminated whether the transceiver TX is mounted on the camera main body 20 and the switch Srem is turned on (Step #1030). If the switch Srem is on, the switch data transmitted from the transceiver RX are stored in an internal RAM of the microcomputer 700 (Step #1032) since the remote control is executed. If the switch Srem is off, the states of all the switches provided in the camera main body 20 are detected and the detection results are stored in the internal RAM (Step #1034) and this subroutine returns. All the detections of the states of the switches hereafter are made based on the stored contents of the internal RAM.

Referring back to FIG. 53, it is discriminated based on the switch data stored in the internal RAM whether this interruption is made by turning on the switch S1 (Step #1008). If the switch S1 has been turned on, this routine proceeds to a subroutine "S1 ON." On the other hand, if the grip switch Sg has been turned on, it is discriminated whether the switch Srem of the transceiver TX is on (Step #1012). If the switch Srem is on, a subroutine "Srem ON" is executed (Step #1016) and the main routine proceeds to Step #1018.

Figure 55:
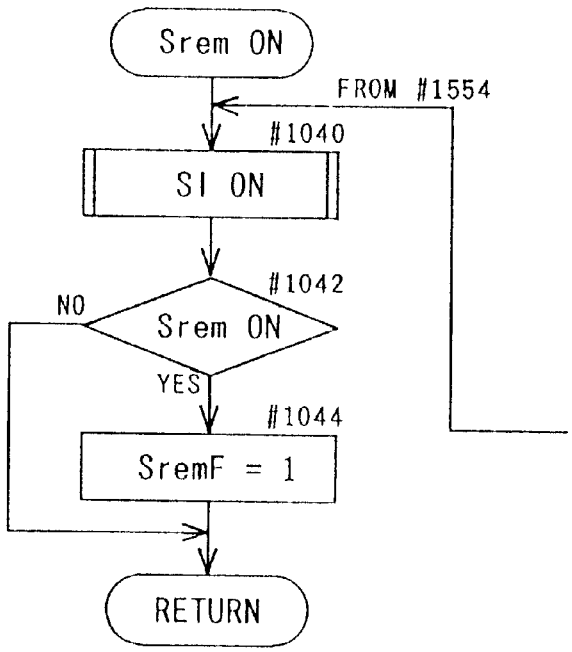
FIG. 55 is a flow chart showing a subroutine "Srem On"

FIG. 55 is a flow chart showing the subroutine "Srem On."

The subroutine "S1 ON" is first executed (Step #1040), and it is discriminated whether the switch Srem is on (Step #1042). This subroutine returns after resetting a flag SremF indicative of the state of the switch Srem (Step #1044) if the switch Srem is on, while returning directly if the switch Srem is off.

If the switch Srem is off in Step #1012, the main routine proceeds to a subroutine "Eye Detection" in Step #1014. Subsequently, the transistor Q1 is turned off so as to stop the power supply to the CCD/monitor unit 10 or the like (Step #1018); an interruption to this routine is allowed (Step #1020); and this routine ends (Step #1022).

Figure 56A:
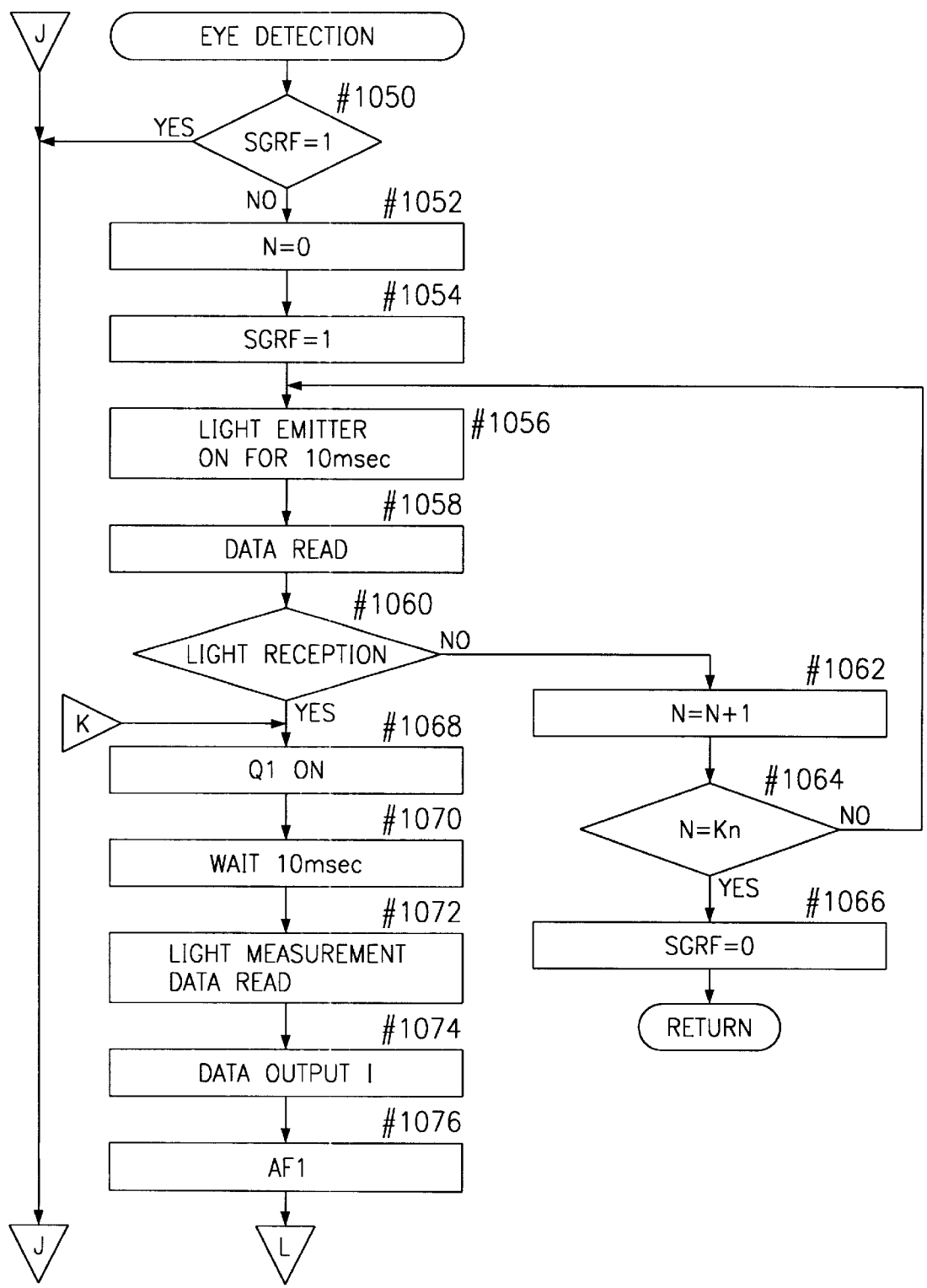
FIGS. 56A, and 56B are a flow chart showing a subroutine "Eye Detection"
Figure 56B:
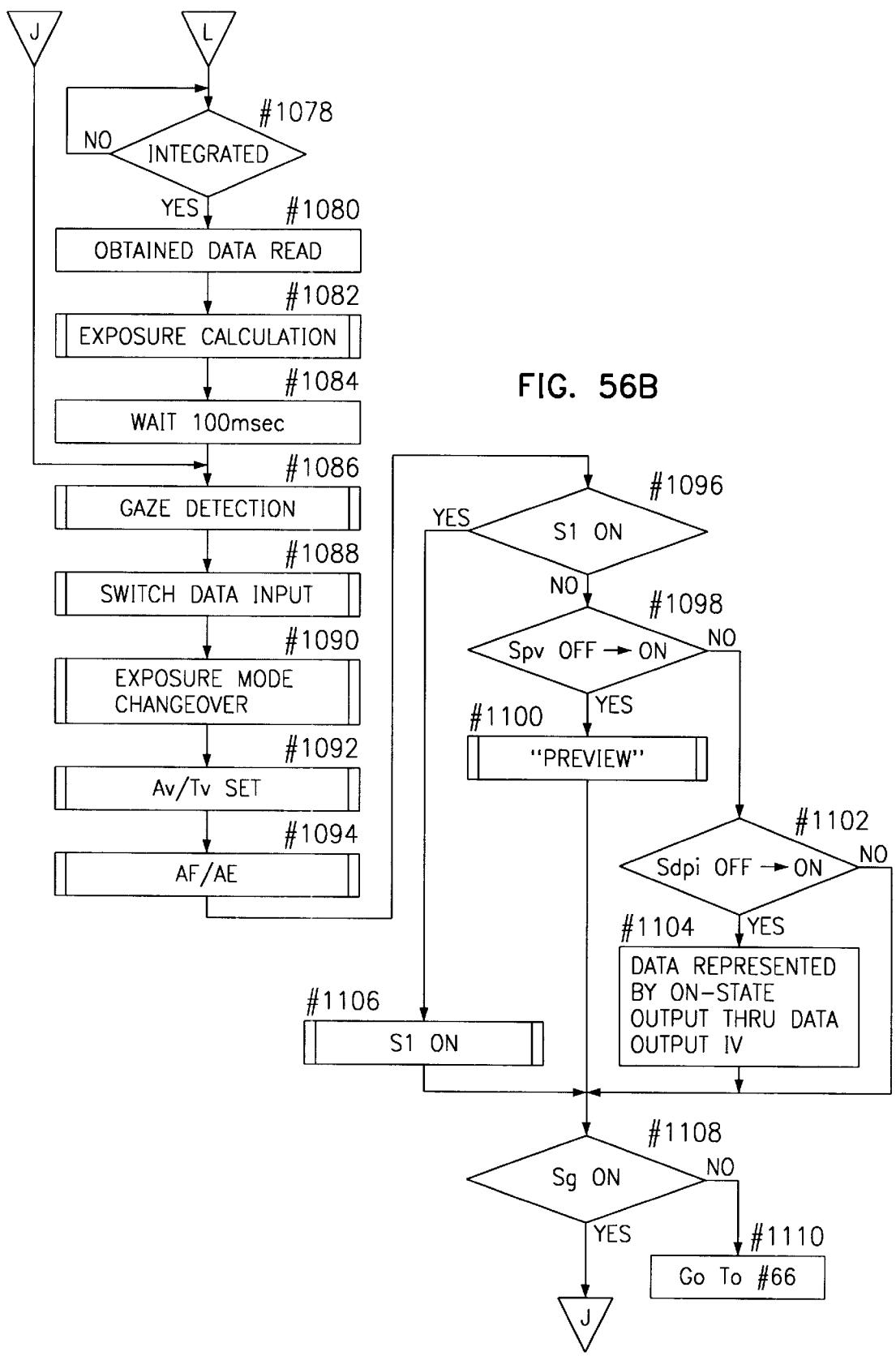

FIGS. 56A and 56B are a flow chart showing the subroutine "Eye Detection."

It is first discriminated whether an eye has been detected by checking the state of the eye flag SGRF (Step #1050).

Unless detected (SGRF=1), a count value N for measuring a time is reset to "0"(Step #1052) and the eye flag SGRF is set to indicate that this subroutine is carried out for the eye detection (Step #1054). The light emitter 291 of the eye sensor is turned on for 10 msec (Step #1056) and a data from the light receiver 292 during this period is read (Step #1058). The presence or absence of the light reception data is discriminated (Step #1060). If no light reception data is detected, the count value N is incremented by one (Step #1062) and it is discriminated whether N=Kn (Step #1064). Kn is a value corresponding to 2 seconds. If N=Kn, the eye flag SGRF is reset on the lapse of 2 seconds (Step #1066) and this subroutine returns. On the other hand, this subroutine proceeds to #1056 if N≠Kn.

If the light reception data is detected (Step #1060), it is judged that the camera operator is viewing through the viewfinder 28 and the transistor Q1 is turned on to supply the power to various circuits (Step #1068). After waiting for 10 msec until the light measuring/adjusting circuit 9 is stabilized (Step #1070), the light measurement data is read (Step #1072). The read light measurement data is output to the CCD/monitor unit 10 through a data output I (Step #1074) and a provisional focal condition detection AF1 is carried out (Step #1076). Subsequently, the light energy received by the CCD 43 is integrated for a period set based on the light measurement data (Step #1078) and the obtained data is read (Step #1080). In Step #1082, an exposure calculation is carried out based on the light measurement data obtained in Step #1072. Concurrently, a signal representative of the completion of the first integrating operation is sent from the CCD/monitor unit 10 to the microcomputer 700. Upon the completion of the exposure calculation, 100 msec, is allowed to lapse in Step #1084.

The provisional focus condition detection AF1 in Step #1076 is carried out to attain the in-focus condition for a given AF area before the AF area is set as a result of the gaze detection or manual selection. The focus condition detection results in the areas AF1 to AF5 being read from the AF circuit 4, and the taking lens 211 driven in accordance with a specified area setting algorithm. This area setting algorithm may be the one which attains an infocus condition for the object lying closest to the camera.

FIG. 57 is a flow chart showing a subroutine "Exposure Calculation."

Firstly, in this subroutine, the film sensitivity SV of the loaded film is read by the film sensitivity reading circuit 6 in Step #1120. A light measurement value BV is added to the read film sensitivity SV to obtain an exposure value EV (Step #1122) and a subroutine "Exposure Correction" is executed (Step #1124). Further, a sum of a present exposure correction amount ΔEVamb and an exposure correction amount ΔEVambpv during the preview are added to the obtained exposure value EV (Step #1126). The exposure correction amounts ΔEVamb and ΔEVambpv are both directed to the ambient light. Then, an amount of flash light {(ΔEVf1)+ (ΔEVf1pv)} corrected during this exposure correction and the preview is corrected (Step #1128). In this correction of the flash light amount, the variable voltage supply VR is feedback controlled. However, the amount of light to be emitted may be adjusted based on this correction amount.

Subsequently, the exposure mode is discriminated. If a P-mode is set, it is discriminated whether the flash device is mounted on the camera main body 20 (Step #1130). If the flash device is mounted, an exposure calculation for the flash firing photographing operation is performed based on the exposure value so as to obtain an aperture value AVf1 and a shutter value TVf1 (Step #1132). If the flash device is not mounted, an exposure calculation is performed using the ambient light to obtain an aperture value Av and a shutter speed Tv for the normal photographing operation under the ambient light (Step #1134). If the exposure mode is an A-mode, S-mode, or M-mode, an aperture value AV and a shutter speed TV are obtained by performing a known exposure calculation (Steps #1136, #1138, #1140). The calculation result are output to the CCD/monitor unit 10 through a data output II (Step #1142).

TABLE-6 below shows output systems for various data.

TABLE 6

|  |  | OI | OII | OIII | OIV |
|---|---|---|---|---|---|
| 1 | BV | O | | | |
| 2 | Av DISPLAY | | O | | O |
| 3 | Tv DISPLAY | | O | | O |
| 4 | AREA FRAME DISPLAY | O | | O | |
| 5 | CURSOR POSITION DISPLAY | | | O | |
| 6 | FOCAL LENGTH | | | | O |
| 7 | SERIES/SINGLE SHOOTING | | | | O |
| 8 | SWITCH INFORMATION | O | | O | O |
| 9 | FILM TYPE DATA | O | | | |
| 10 | EXPOSURE CORRECTION COLOR CORRECTION DATA | | O | | O | where 0I, 0II, 0II, 0IV denote data outputs I , II III, IV.

Referring back to FIGS. 56A, 56B, a subroutine "Gaze Detection" is executed in Step #1086.

Figure 58B:
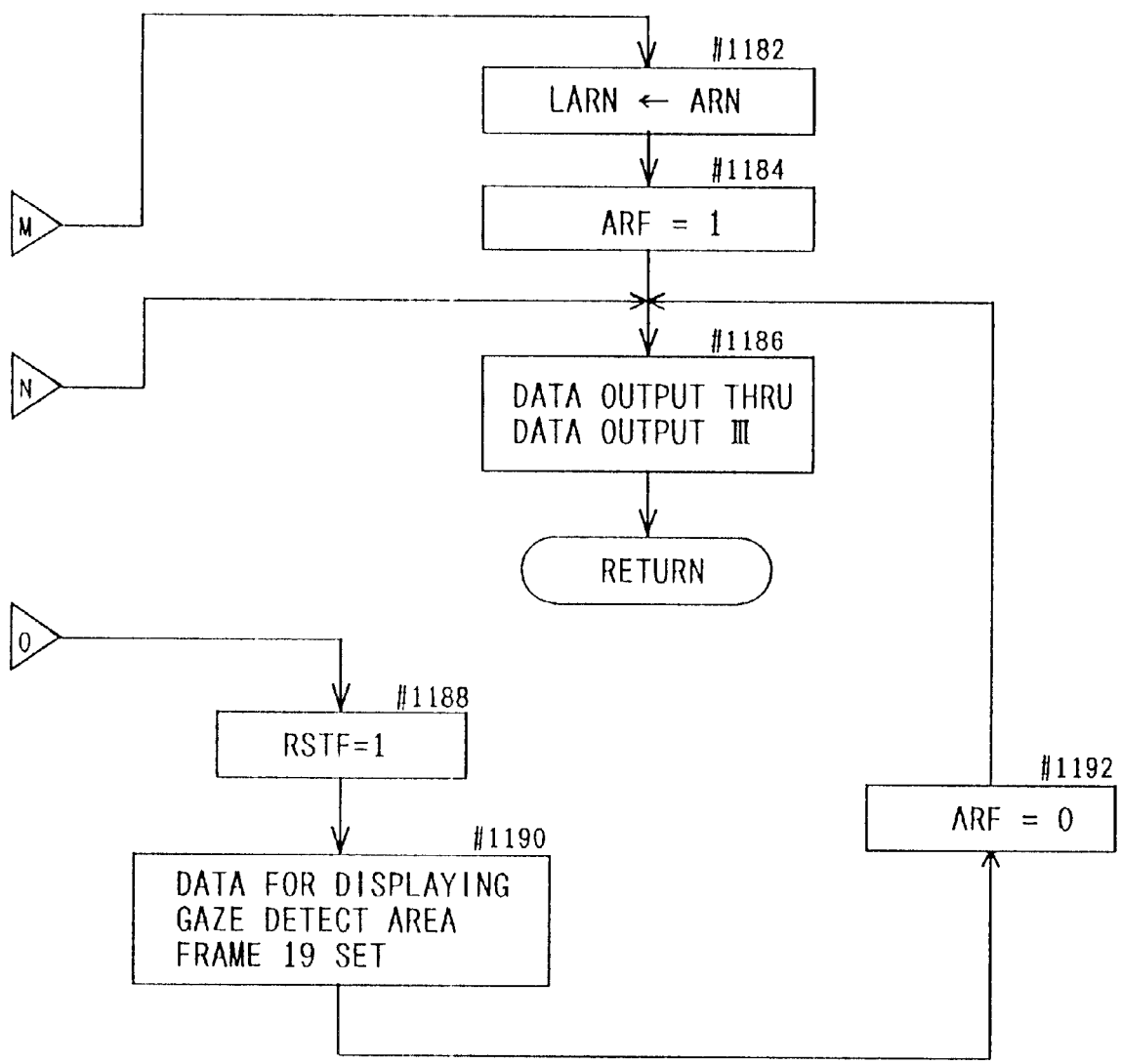

FIGS. 58A, 58B are a flow chart showing the subroutine "Gaze Detection."

In the eye detection, it is first discriminated whether the switch Srem of the transceiver TX is on (Step #1150). If the switch Srem is on, (i.e., the remote control is executed), this subroutine returns since the camera operator does not view through the viewfinder. In other words, since the image is displayed in the liquid crystal display R8, the function of the gaze detection is unnecessary in this case. If the switch Srem is off, this subroutine proceeds to Step #1152 to conduct the gaze detection since the camera operator will view through the viewfinder so as to confirm an image displayed in the monitor 47.

In Step #1152, the light emitter (infrared LED) in the gaze detecting circuit 2 is turned on for 10 msec. (Step #1152) and the light reception data is read (Step #1154) on the assumption that the emitted light is reflected by the eye of the camera operator viewing through the viewfinder 28 and is received by the infrared area sensor. The gaze area upon which the gaze of the camera operator falls is detected based on the light reception data. The detected gaze area is read as an area ARN (where N=1 to 16) (Step #1156).

Subsequently, it is discriminated whether the area ARN is the area AR16 (Step #1158). If ARN=AR16 (YES in Step #1158), it is judged that no gaze area has been detected since the area AR16 does not lie within the detection area, and it is discriminated whether the timer flag TMF for measuring this period is set (Step #1160). If the timer flag TMF is not set, the timer Tar is reset and started (Step #1162) and the timer flag TMF is set (Step #1164). If the timer flag is set (Step #1160), this subroutine proceeds directly to Step #1166 so as not to interrupt the time measuring operation of the timer Tar. In Step #1166, it is discriminated whether 5 seconds have elapsed following the start of the timer Tar. This subroutine returns unless 5 seconds have elapsed (NO in Step #1166). Upon the lapse of 5 seconds (YES in Step #1166), data for displaying the gaze detection area frame 19 is set (Step #1168) and this subroutine returns. On the other hand, if ARN≠AR16 (NO in Step #1158), the timer flag TMF is reset (Step #1170) and the data for displaying the gaze detection area frame 19 is reset (Step #1172).

In Step #1174, it is discriminated whether the state of the switch Ssdi for setting or resetting the area ARN upon which the gaze falls has been changed from OFF to ON. If the discrimination result is in the negative, the data to be displayed is output to the CCD/monitor unit 10 through a data output III (Step #1186) and this subroutine returns. If the discrimination result in Step #1174 is in the affirmative, it is discriminated whether the area reset flag RSTF is set (Step #1176). If the area reset flag RSTF is set, this flag RSTF is reset (Step #1178); the presently detected area ARN is set as a designated area LARN (Step #1182); and the area flag ARF indicative of the gaze area setting is set (Step #1184). Consequently, these data are output to the CCD/monitor unit 10 through the data output III (Step #1186) and this subroutine returns.

On the other hand, if the area reset flag RSTF is not set in Step #1176, it is discriminated whether the designated area LARN is equal to the presently detected area ARN (Step #1180). If LARN=ARN, it is judged that the switch Ssdi has been operated to cancel the designated area LARN and the area reset flag RSTF is set (Step #1188). Subsequently, the data for displaying the gaze detection area frame 19, which is displayed when the power supply is turned on, is set (Step #1190) and the area flag ARF is reset in Step #1192 since the gaze area is reset. Consequently, these data are output to the CCD/monitor unit 10 through the data output III (Step #1186) and this subroutine returns. If LARN≠ARN (NO in Step #1180), the operations in Step #1182 and subsequent steps are executed on the assumption that the switch Ssdi has been operated to set the gaze area and this subroutine returns.

Figure 59:
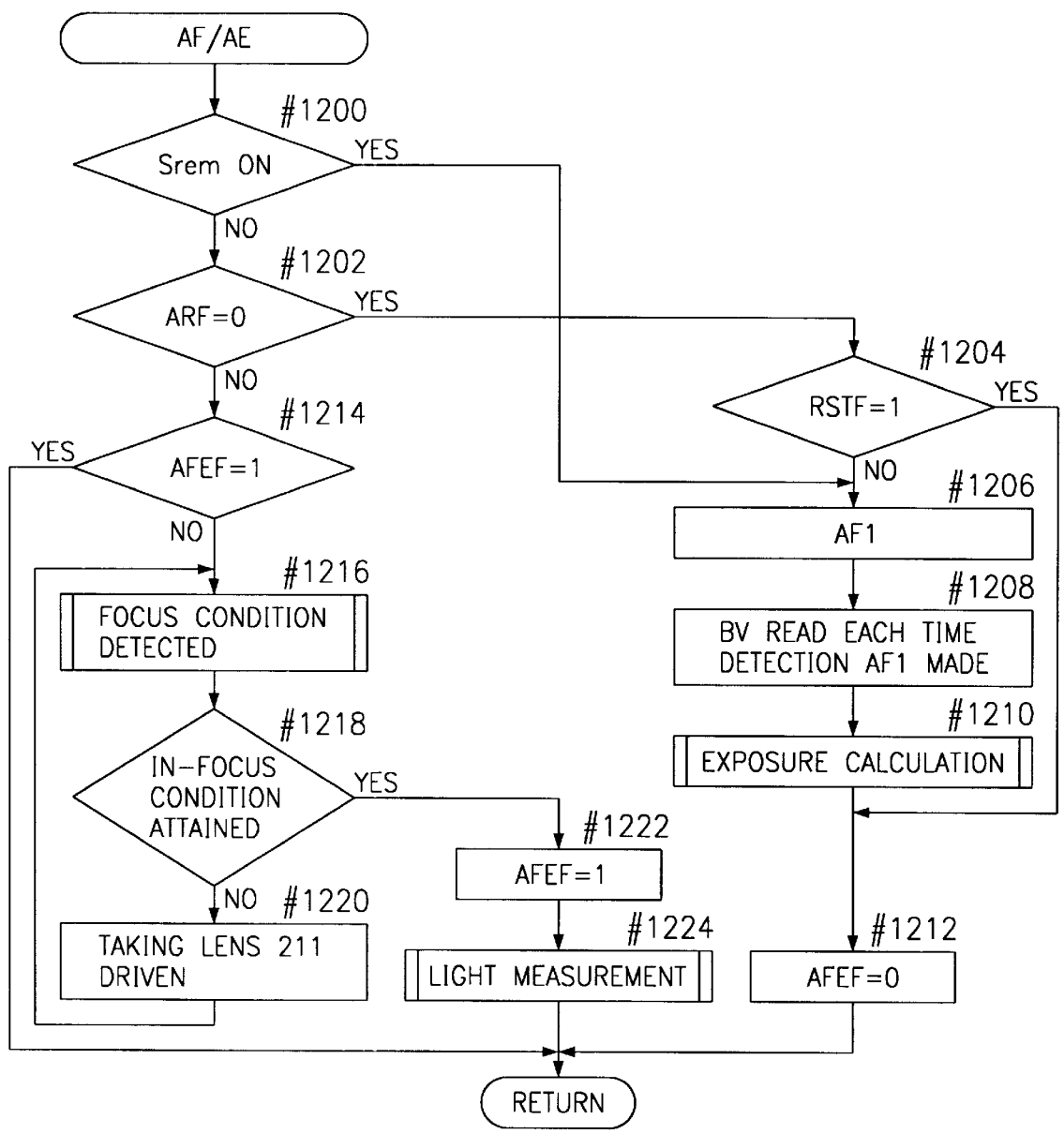
FIG. 59 is a flow chart showing a subroutine "AF/AE"

There will be described a subroutine "AF/AE" next with reference to FIG. 59.

In this subroutine, it is first discriminated whether the switch Srem of the transceiver TX is on (Step #1200). If the switch Srem is on, the provisional focus condition detection AF1 is performed (Step #1206) since the gaze detection is not necessary as described above; the light measurement value BV is read (Step #1208); and the exposure calculation is performed (Step #1210). If the switch Srem is off, it is discriminated whether the area flag ARF is not set in response to the operation of the switch Ssdi (gaze area setting switch 30) (Step #1202).

If the area flag ARF is not set (YES in Step #1202), it is discriminated whether the area reset flag RSTF is set (Step #1204). If the area reset flag RSTF is set (YES in Step #1204), this subroutine proceeds to Step #1212 skipping Steps #1206 to #1210 to lock the AF and AE operations until the gaze area AR is set in the next run. This is because it cannot be decided to which area ARN the AF and AE operations are applied when the area reset flag RSTF is set. In Step #1212, the in-focus flag AFEF indicative of the attainment of the in-focus condition is reset and this subroutine returns. If the area reset flag RSTF is not set (NO in Step #1204), it means that the gaze area AR has never been set after the power supply is turned on. In this case, it is thought to be better not to lock the AF and AE operations so that the AF and AE operations can be carried out anytime to various objects. Accordingly, the provisional focus condition detection AF1 is carried out repeatedly (continuous AF): the light measurement value BV is read each time the detection AF1 is made; and the exposure calculation is conducted (Steps #1206, #1208, #1210). Thereafter, the in-focus flag AFEF is reset in Step #1212 and this subroutine returns.

On the other hand, if the area flag ARF is set (NO in Step #1202), it is discriminated whether the in-focus flag AFEF is set (Step #1214). If the in-focus flag AFEF is set, (i.e., the in-focus condition has been already attained (YES in Step #1214)), this subroutine returns without carrying out the focus condition detection again (single AF). If the in-focus flag AFEF is not set (NO in Step #1214), the focus condition is detected (Step #1216) and it is discriminated whether the in-focus condition has been already attained based on the detected focus condition (Step #1218). If the in-focus condition has not been already attained, the taking lens 211 is driven based on the detected focus condition (Step #1220) and this subroutine proceeds to Step #1216. Upon the attainment of the in-focus condition (YES in Step #1218), the in-focus flag AFEF is set (Step #1222); light measurement is conducted (Step #1224); and this subroutine returns.

Figure 60:
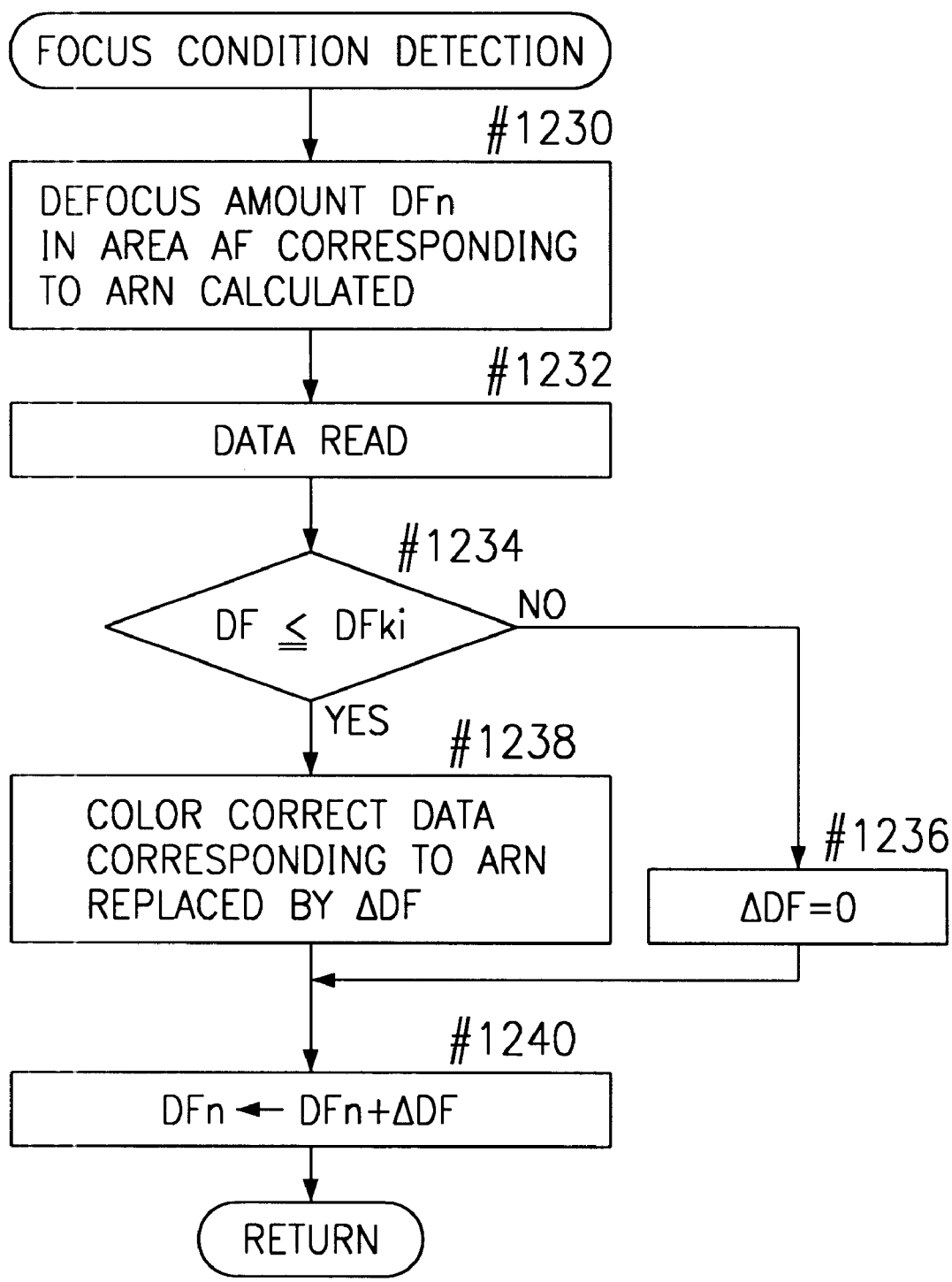
FIG. 60 is a flow chart showing a subroutine "Focus Condition Detection"
Figure 61:
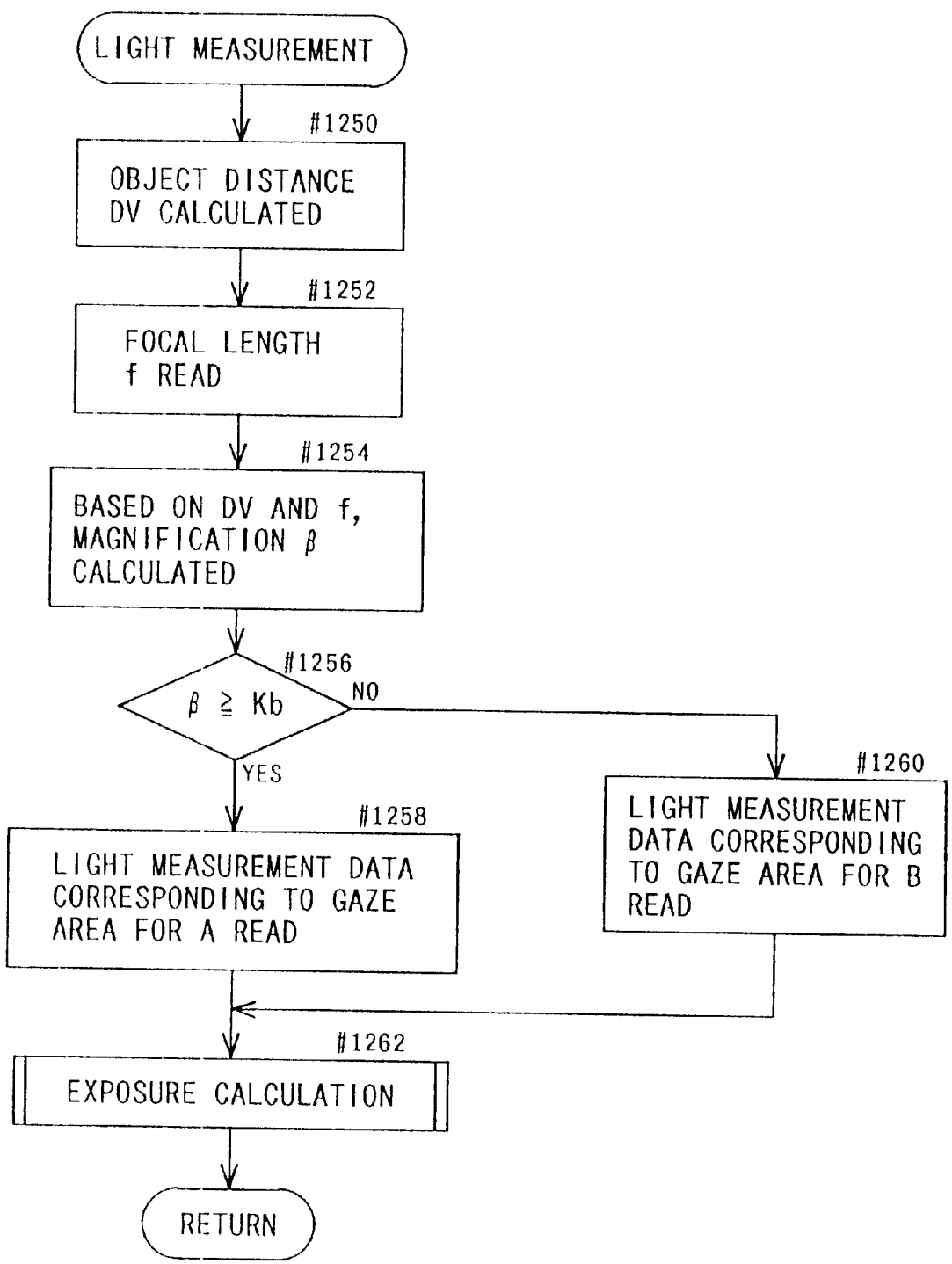
FIG. 61 is a flow chart showing a subroutine "Light Measurement"

There will be next described subroutines "Focus Condition Detection" and "Light Measurement" respectively with reference to FIGS. 60 and 61.

In the subroutine "Focus Condition Detection," a defocus amount DFn in the area AF corresponding to the set gaze area ARN is first calculated (Step #1230). TABLE-7 below shows the correspondence between the gaze areas and the AF areas.

TABLE 7

| GAZE AREA | AF AREA |
| --- | --- |
| AR1, AR6, AR11 | AREA IN AR6 |
| AR2, AR7, AR12 | AREA IN AR7 |
| AR3, AR8, AR13 | AREA IN AR8 |
| AR4, AR9, AR14 | AREA IN AR9 |
| AR5, AR10, AR15 | AREA IN AR10 |

Subsequently, data including color correction data for all the AF areas are read from the CCD/monitor unit 10 (Step #1232) and it is discriminated whether the defocus amount DF is not greater than a predetermined value DFk1 (Step #1234). If DF≦DFk1 (YES in Step #1234), the color correction data corresponding to the area ARN is replaced by ΔDF (Step #1238); the correction value ΔDF is added to the defocus amount DFn (DFn=DFn+ΔDF) (Step #1240); and this subroutine returns. Conversely, if DF>DFk1 (NO in Step #1234), the correction value ΔDf is set at "0" (Step #1236) and the calculation is carried out using this value (Step #1240).

The correction using the value ΔDF is not made in the case where the value ΔDF is, for example, as large as 500 μm and accordingly the image on the CCD 43 is fairly unsharp. This is because correct color data cannot be obtained due to the blur of colors.

The light measurement is described next. TABLE-8 below shows the relationship between the detected gaze area and the light measurement data.

TABLE 8

| GAZE AREA | LIGHT MEASUREMENT B | LIGHT MEASUREMENT A |
| --- | --- | --- |
| AR1 | MEAN OF AR1, AR2, AR6, AR7 | AR1 |
| AR2 TO AR4 | MEAN OF AR(N − 1) TO AR(N + 1), AR(N + 4) TO AR(N + 6) | AR(N) |
| AR5 | MEAN OF AR4, AR5, AR9, AR10 | AR4 |
| AR6 | MEAN OF AR1, AR2, AR6, AR7, AR11, AR12 | AR6 |

TABLE 8-continued

| GAZE AREA | LIGHT MEASUREMENT B | LIGHT MEASUREMENT A |
|---|---|---|
| AR7 TO AR9 | MEAN OF AR(N − 6) TO AR(N − 4), AR(N − 1) TO AR(N + 1), AR(N + 4) TO AR(N + 6) | AR(N) |
| AR10 | MEAN OF AR4, AR5, AR9 AR10, AR14, AR15 | AR10 |
| AR11 | MEAN OF AR6, AR7, AR11, AR12 | AR11 |
| AR12 TO AR14 | MEAN OF AR(N − 6) TO AR(N − 4), AR(N − 1) TO AR(N + 1) | AR(N) |
| AR15 | MEAN OF AR9, AR10, AR14, & AR15 | AR15 |

The light measurement B is conducted when $\beta$ (magnification)<Kb (specified value) and the value thereof is a mean of values obtained in the gaze areas specified in its column. The light measurement A is conducted when $\beta \geq Kb$ and the value thereof is the value obtained in the gaze area specified in its column.

In the subroutine "Light Measurement," an object distance DV is first calculated based on the lens projected amount (Step #1250) and a focal length f is read (Step #1252). Based on the object distance DV and the focal length f, a magnification B is calculated (Step #1254). It is then discriminated whether the obtained magnification $\beta$ is not smaller than a specified value Kb (Step #1256). If $\beta \geq Kb$ (YES in Step #1256), the light measurement data corresponding to the gaze area specified for the light measurement A in TABLE-8 is read from the CCD/monitor unit 10 (Step #1258). Conversely, if $\beta$<Kb (NO in Step #1256), the light measurement data corresponding to the gaze areas specified for the light measurement B in TABLE-8 are read from the CCD/monitor unit 10 and a mean value thereof is calculated (Step #1260). In Step #1262, the exposure calculation is carried out based on thus obtained light measurement data. The reason why the light measuring operation is separated into the light measurement A and the light measurement B is photograph an "entire" object (for example, a landscape) having a small magnification $\beta$ a by averaging the light measurement data corresponding to a plurality of gaze areas.

Referring back to FIG. 56B, the microcomputer 700 reads the switch data stored in the internal RAM (Step #1088). Based on the read switch data, the exposure mode (P, S, A, M), the aperture value Av and the shutter speed Tv are changed according to the read switch data (Steps #1090 and #1092). Then, a subroutine "AF/AE" is executed (Step #1094).

Figure 62:
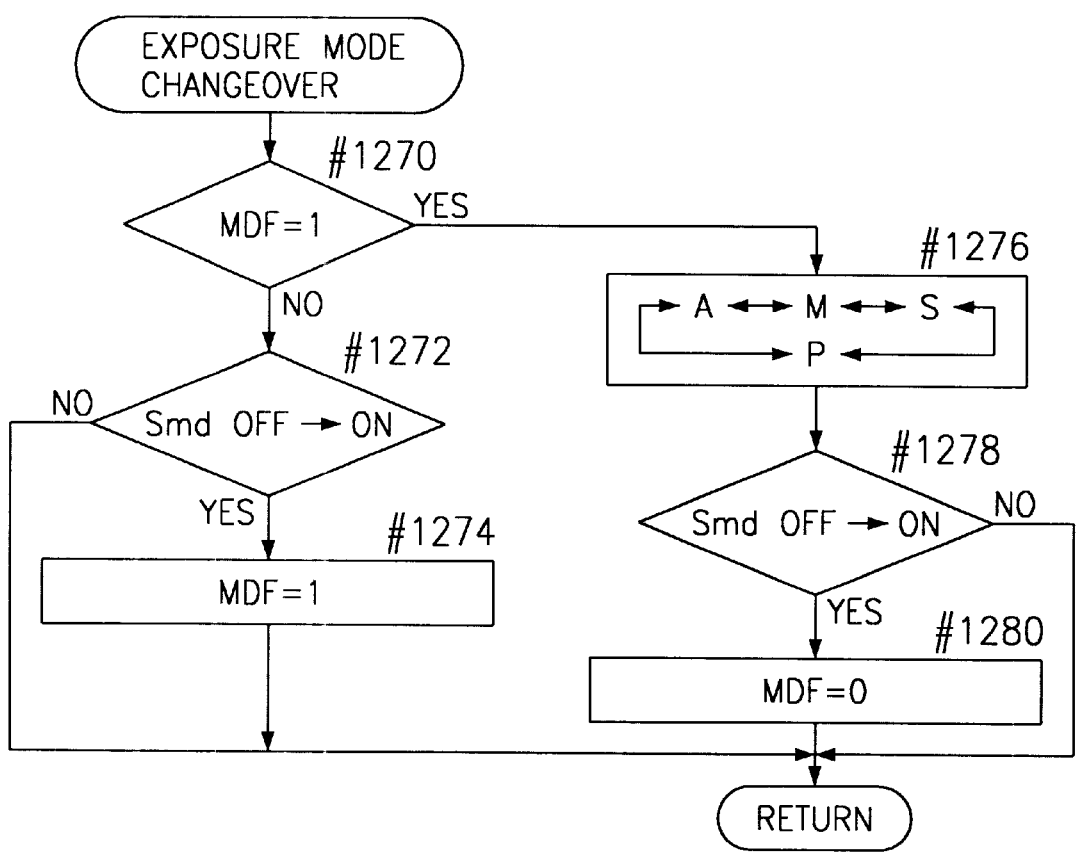
FIG. 62 is a flow chart showing a subroutine "Exposure Mode Changeover"

A subroutine "Exposure Mode Changeover" executed in Step #1090 will be described with reference to FIG. 62 and a subroutine "Av/Tv Changeover" executed in Step #1092 will be described with reference to FIG. 63.

In the subroutine "Exposure Mode Changeover," it is first discriminated whether a flag MDF indicative of a change in the exposure mode is set (Step #1270). If the flag MDF is not set, it is discriminated whether the state of the exposure mode changeover switch Smd has been changed from OFF to ON (Step #1272). If the discrimination result is in the affirmative, the flag MDF is set (Step #1274) on the assumption that a state is set where the exposure mode is changeable. If the discrimination result in Step #1272 is in the negative, this subroutine returns directly. If the flag MDF is set in Step #1270, the exposure mode is cyclically changed in the order of A, M, S, P according to the operation of the front or rear control dial 33 or 34 (Step #1276). It is then discriminated whether the state of the switch Smd has been changed from OFF to ON (Step #1278). If the discrimination result is in the affirmative, the flag MDF is reset (Step #1280) on the assumption that the camera is brought out of the exposure mode changeable state. If the discrimination result in Step #1278 is in the negative, this subroutine returns directly.

In the subroutine "Av/Tv Changeover," it is discriminated whether the flags MDF, ECRF, ECRfIF, WBF are set (Steps #1290 to #1296). The flag ECRF is indicative of the exposure correction mode by the use of the ambient light; the flag ECRFLF is indicative of the flash light exposure correction mode in which the amount of flash light is adjustable; and the flag WBF is indicative of a white balance correction mode. If any one of the above flags is set, this subroutine returns on the assumption that the mode corresponding to the flag is set. If none of these flags is set, the present exposure mode is discriminated and the following operations are carried out. If the exposure mode is P-mode, the shutter speed Tv is changed in inverse relation to the aperture value Av (so-called "P-shift") in Step #1298. If the exposure mode is A-mode, the aperture value Av is changed (Step #1300). If the exposure mode is S-mode, the shutter speed Tv is changed (Step #1302). If the exposure mode is M-mode, the aperture value Av is changed according to the operation of the front control dial 33 (Step #1304) and the shutter speed Tv is changed according to the operation of the rear control dial 34 (Step #1306). After these operations, this subroutine returns.

Referring back to FIG. 56B, it is discriminated whether the switch S1 is on (Step #1096) after the AF and AE operations has been executed. If the switch Si is on, a subroutine "Si ON" is executed (Step #1106) and it is then discriminated whether the grip switch Sg is on (Step #1108). If the grip switch Sg is on, this subroutine proceeds to Step #1086. If the grip switch Sg is off, this subroutine proceeds to Step #1066 to reset the flag SGRF and returns. If the switch S1 is off in Step #1096, it is discriminated whether the state of the switch Spv has been changed from OFF to ON (Step #1098). If the discrimination result in Step #1098 is in the affirmative, a subroutine "Preview" is executed (Step #1100). If the discrimination result in Step #1098 is in the negative, it is discriminated whether the state of the switch Sdpi which is operated to display in the monitor 47 the image stored in the image memory 110 has been changed from OFF to ON (Step #1102). If the discrimination result in Step #1102 is in the affirmative, this switch is output to the CCD/monitor unit 10 through a data output IV (Step #1104). Subsequently, it is discriminated whether the grip switch Sg is on (Step #1108). If the grip switch Sg is off, this subroutine proceeds to Step #1066 to reset the flag SGRF and returns. If the grip switch Sg is on, this subroutine proceeds to Step #1086.

Figure 64A:
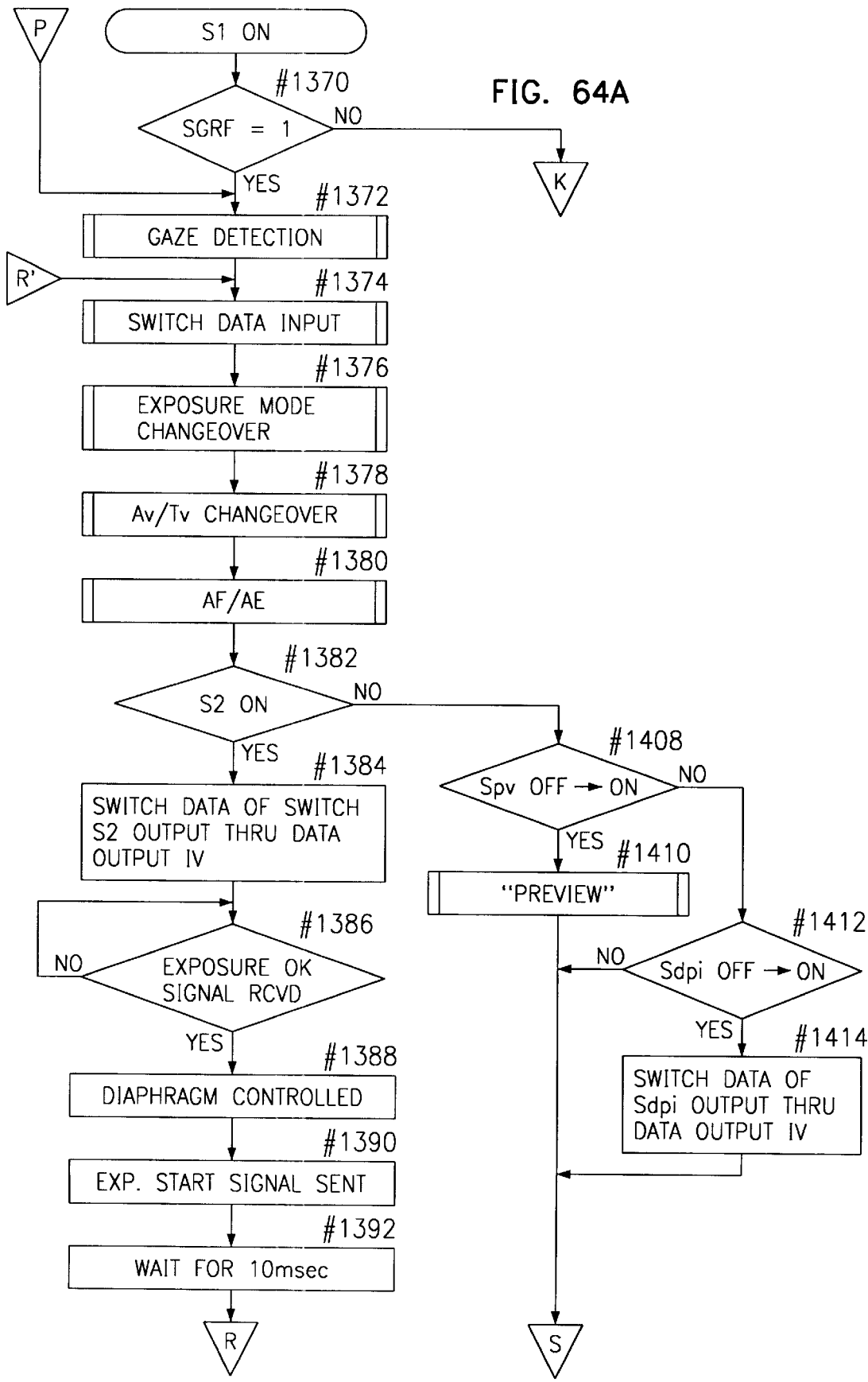
FIGS. 64A, and 64B are a flow chart showing a subroutine "Si On"
Figure 64B:
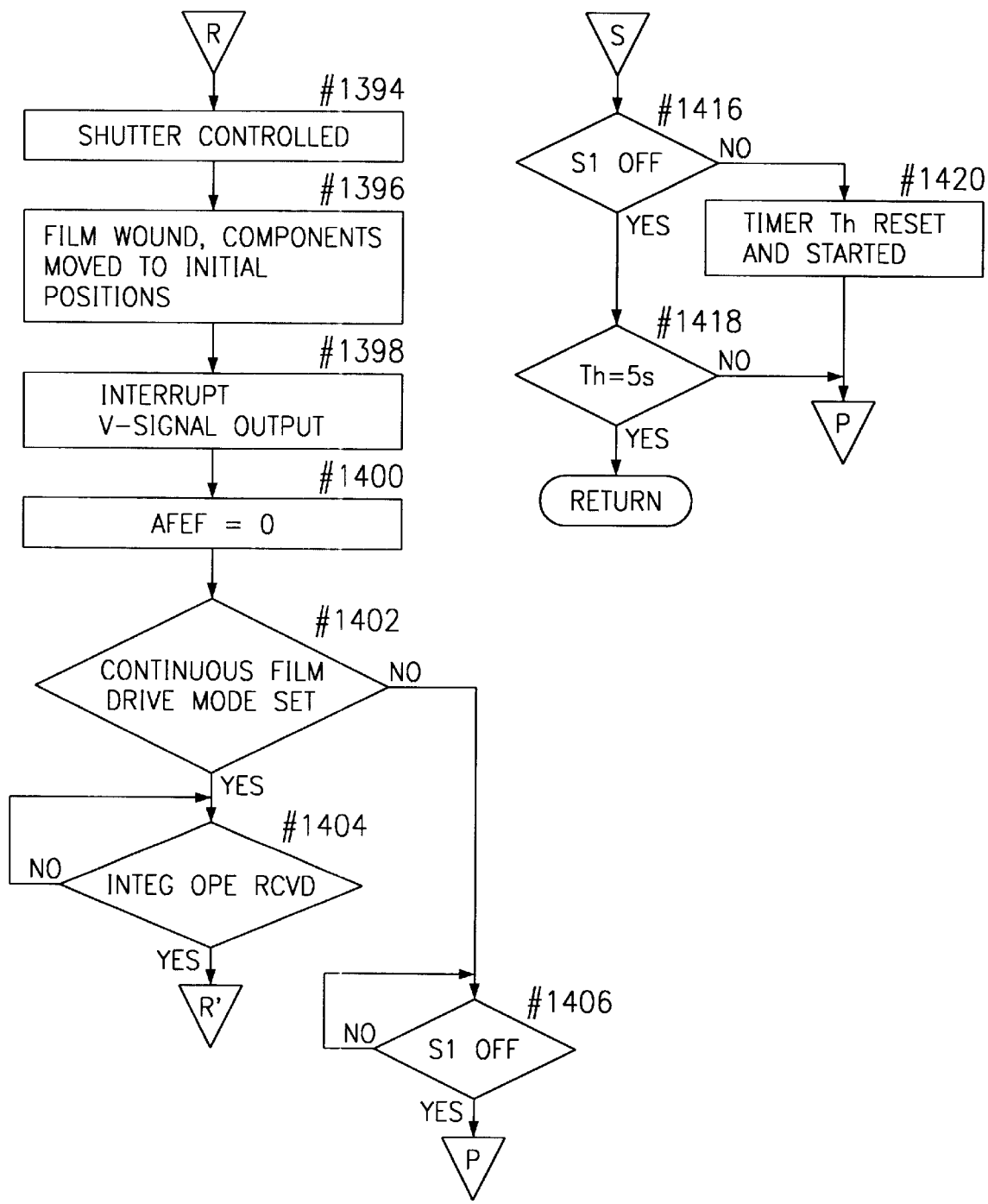

The subroutine "S1 ON" will be described with reference to FIGS. 64A, and 64B.

In this subroutine, it is first discriminated whether the eye flag SGRF indicative of whether the eye detection has been already made is set when the switch S1 is turned on (Step #1370). If an eye has been detected (YES in Step #1370), the switch data is read; the exposure mode is changed; the aperture value Av and the shutter speed Tv are changed; the gaze detection is made; and the AF/AE operations are carried out (Steps #1372 to #1380) since the CCD/monitor unit 10 and the AF lens have been already initialized.

It is then discriminated whether the switch S2 is on (Step #1382). If the switch S2 is off, it is discriminated whether the state of the switch Spv has been changed from OFF to ON (Step #1408). If the discrimination result in Step #1408 is in the affirmative, the subroutine "Preview" is executed (Step #1410). If the discrimination result in Step #1408 is in the negative, it is discriminated when the state of the switch Sdpi has been changed from OFF to ON (Step #1412). If the discrimination result in Step #1412 is in the affirmative, the switch data of the switch Sdpi is output to the CCD/monitor unit 10 through the data output IV (Step #1414) and this subroutine proceeds to Step #1416.

In Step #1416, it is discriminated whether the switch S1 is off. If the switch S1 is on, a timer Th is started (Step #1320) and this subroutine proceeds to Step #1372. On the other hand, if the switch S1 is off, it is discriminated whether 5 seconds have elapsed following the start of the timer Th (Step #1418). This subroutine returns upon the lapse of 5 seconds, while proceeding to Step #1372 if 5 seconds have not yet elapsed. If the eye flag SGRF is not set in Step #1370, this subroutine proceeds to Step #1068 (FIG. 56A).

If the switch S2 is on in Step #1382. the switch data of the switch S2 is output to the CCD/monitor unit 10 through the data output IV (Step #1384) and the routine waits (Step #1386) until an "exposure OK" signal from the CCD/monitor 10 is received. Upon the reception of this exposure OK signal, the diaphragm is controlled according to the obtained aperture value (Step #1388); an exposure start signal is sent to the CCD/monitor unit 10 (Step #1390); and it is waited for 10 msec (Step #1392). Thereafter, an exposure control is conducted, i.e., the shutter is controlled in accordance with the obtained shutter speed (Step #1394). Upon the completion of the exposure control, the film is wound and the respective components are moved to their initial positions (Step #1396). An interrupt V-signal is output to control the opened diaphragm suitably for the next integrating operation of the CCD 43 (Step #1398) and the in-focus flag AFEF is reset (Step #1400) to carry out the AF operation again.

It is then discriminated whether the continuous film drive mode is set (Step #1402). If the continuous film drive mode is set, it is waited until a signal representative of the completion of the integrating operation of the CCD 43 and the calculating operation is received (Step #1404). Upon the reception of this signal, this subroutine proceeds to Step #1380. The camera operator is allowed to view animated pictures during the series shooting by carrying out, in this way, the integrating operation of the CCD 43 and obtaining new data for the focus condition detection and the light measurement. Further, the gaze detection is not conducted during the series shooting in consideration of a reduction in the gaze detection accuracy due to the undesirable camera shake resulting from a shock given when the shutter components are returned to their initial positions and the film is wound. If the camera is of the mirror-up type in which the light does not reach the viewfinder 28 during the series shooting, it may be appropriate not to conduct the gaze detection during that time since the camera operator cannot see the object through the viewfinder 28.

If the single film drive mode is set in Step #1402, it is waited until the switch S1 is turned off in Step #1406. This subroutine proceeds to Step #1372 when the switch S1 is turned off. Thus, in the CCD/monitor unit 10, the presently photographed still image is displayed in the monitor 47 while the switch S1 is on.

Figure 65A:
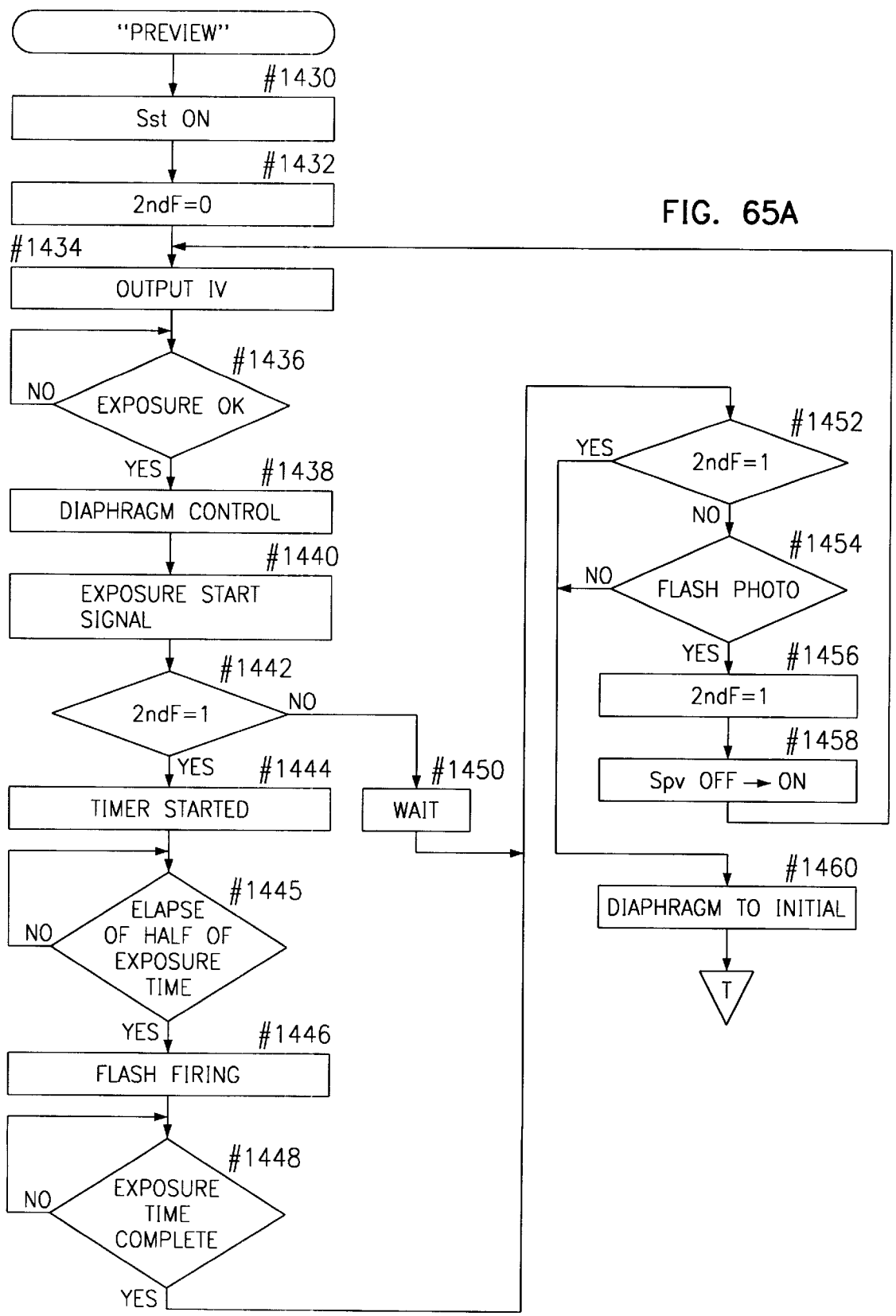
FIGS. 65A, and 65B are a flow chart showing a subroutine "Preview"
Figure 65B:
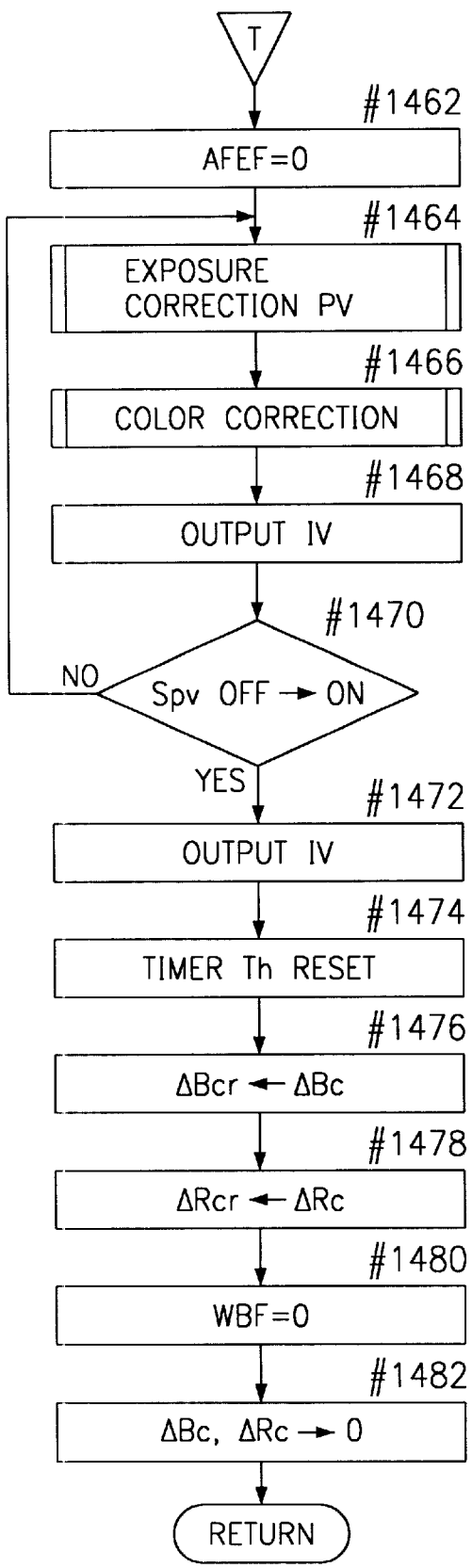

The subroutine "Preview" will be described next with reference to FIGS. 65A, and 65B.

The light adjustment start switch Sst is turned on (Step #1430) and a flag 2ndF is reset (Step #1432). The flag 2ndF is indicative of the second image pick-up operation. The switch data of the switch Spv is output to the CCD/monitor unit 10 (data output IV) (Step #1434) and the microcomputer 700 waits until receiving the exposure OK signal from the CCD/monitor unit 10 (Step #1436).

Upon the receipt of the exposure OK signal, the diaphragm is controlled according to the control aperture value (Step #1438) and the exposure start signal is sent to the CCD/monitor unit 10 (Step #1440).

Subsequently, it is discriminated whether the flag 2ndF is set (Step #1442). If the flag 2ndF is not set, it is waited until the lapse of the exposure time for a preview image pick-up operation under the ambient light or with the assist of the flash light (Step #1450) and this subroutine proceeds to Step #1452. If the flag 2ndF is set, the timer is started upon the start of the exposure and the subroutine "Flash Firing" is executed when half the exposure time has elapsed (Steps #1444–#1446) and this subroutine proceeds to Step #1452 upon the lapse of the complete exposure time (Step #1448). The flash device is fired when half the exposure time has elapsed for the following reasons. During the actual photographing operation, the switch Sx is turned on to cause the shutter to open fully when the travel of the first blind is completed and thereby the flash device is fired. However, during the preview image pick-up operation, it is possible to fire the flash device at a desired time since the CCD 43 is entirely exposed and the shutter is not particularly caused to open fully. The exposure time for the both operations is the same. However, a time defined between the start of the exposure and the finish of the exposure differs in the two operations. This is because the actual photographing operation is carried out by exposing the film surface through a slit formed between the first and second blinds, whereas the preview image pick-up operation is carried out always by exposing the entire surface of the CCD 43. Thus, the flash device is fired after the lapse of half the exposure time for the preview image pick-up operation, with a view to equalizing the exposed state during the two operations.

Figure 66:
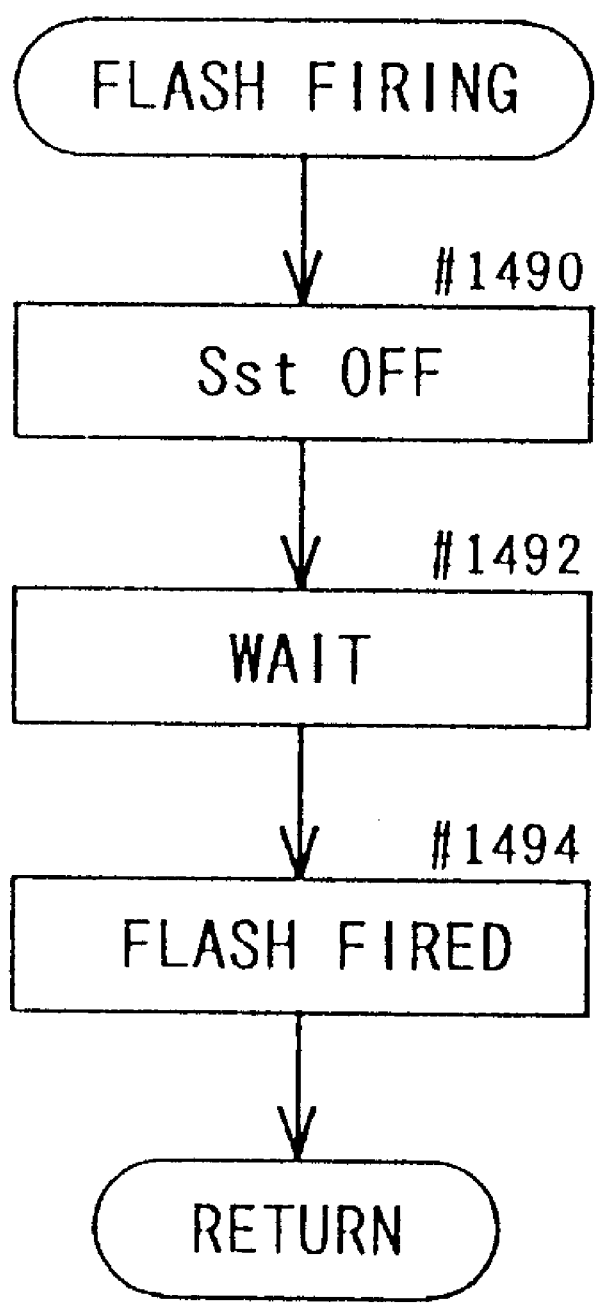
FIG. 66 is a flow chart showing a subroutine "Flash Firing"

A subroutine "Flash Firing" executed in Step #1446 will be described with reference to FIG. 66.

There is first output such a signal as to turn the light adjustment start switch Sst off (Step #1490). It is waited for a time required for this switch to be turned off completely (Step #1492); the flash device is fired (Step #1494); and this subroutine returns.

Referring back to FIGS. 65A, and 65B, it is discriminated whether the flag 2ndF is set (Step #1452). If the flag 2ndF is not set, it is discriminated whether a flash photographing operation is conducted (Step #1454). If a flash photographing operation is conducted, the flag 2ndF is set to conduct the second image pick-up operation (Step #1456); the preview switch Spv is accordingly turned on (Step #1458); and this subroutine proceeds to Step #1434. The switch data of the switch Spv is used to control the monitor 47. On the other hand, if the flag 2ndF is set (YES in Step #1452) or a non-flash photographing operation is conducted (NO in Step #1454), only the diaphragm which has been controlled is returned to its initial position while keeping the shutter, the film feeding device, and the like as they are (Step #1460) and the in-focus flag AFEF is reset (Step #1462). Subsequently, a subroutine "Exposure Correction PV" is executed so as to perform the exposure correction for the image picked up during the preview (Step #1464) and a subroutine "Color Correction" is executed (Step #1466). The data output IV is effected (Step #1468) and this subroutine proceeds to Step #1470. These exposure correction and color correction enable the correction result obtained during the actual photographing operation to be attained beforehand.

Figure 67:
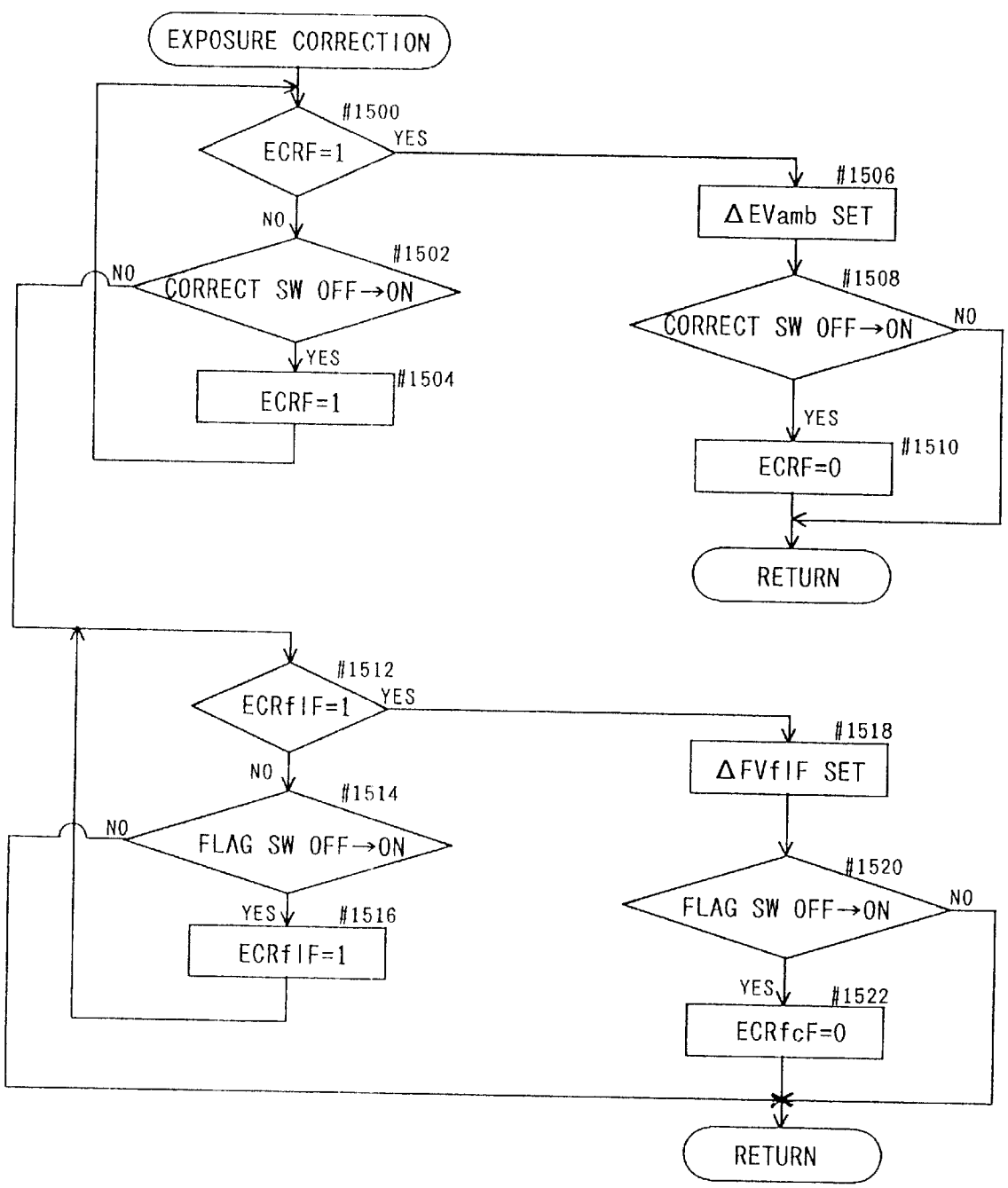
FIG. 67 is a flow chart showing a subroutine "Exposure Correction"
Figures 68A, 68B, 68C, 68D:
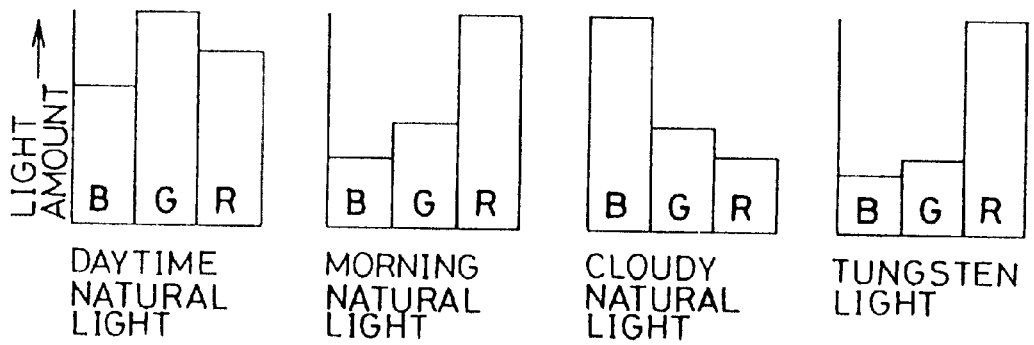
FIGS. 68A to 68D are graphs showing spectral characteristics of various light sources.

The subroutine "Exposure Correction" will be described with reference to FIG. 67.

It is discriminated whether the flag ECRF indicative of the exposure correction mode is set (Step #1500). If the flag ECRF is not set, it is discriminated whether the state of the exposure correction switch S(±)amb has been changed from OFF to ON (Step #1502). If the discrimination result in Step #1502 is in the negative, this subroutine proceeds to Step #1512. If the discrimination result in Step #1502 is in the affirmative, the flag ECRF is set (Step #1504) on the assumption that the exposure correction mode is set and this subroutine proceeds to Step #1500. If the flag ECRF is set in Step #1500, the exposure correction amount EVamb is set according to an operated amount of the control dial (Step #1506) and it is discriminated whether the state of the switch S(±)amb has been changed from OFF to ON (Step #1508). This subroutine returns directly if the discrimination result in Step #1508 is in the negative, while returning after resetting the flag ECRF (Step #1510) if, the discrimination result in Step #1508 is in the affirmative.

In Step #1512, it is discriminated whether the flag ECRflF indicative of the flash light amount correction mode is set. This subroutine proceeds to Step #1514 if the flag ECRflF is not set, while proceeding to Step #1518 if the flag ECRflF is set. No description will be given for operations performed in Steps #1514 to #1522 since they are similar to those performed in Steps #1502 to #1510.

There will be next described the control executed for the color correction. This color correction is performed according to the type of the loaded film to be described hereafter.

Figures 69A, 69B:
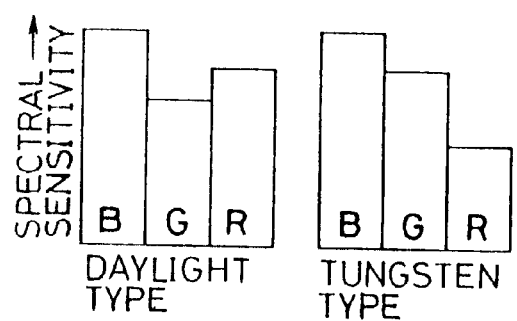
FIGS. 69A, and 69B are graphs showing the sensitivities of two types of films to colors.

There exist a variety of light sources used for the picture taking operation. FIGS. 68A to 68D show spectral characteristics of some of these light sources. Not a great deal of spectral variation is found in the natural light during the daytime, but the tungsten light has a spectral characteristic of concentrating definitely in a red color region. However, having the vision adaptable to the colors, the human beings can recognize accurately the color of an object illuminated by the tungsten light. On the other hand, the color film includes three photosensitive layers each having the sensitivity to one of three colors; blue (B), green (G) and red (R). All the colors are produced by changing the ratio of B, G, R. The spectral sensitivities of these three layers to the light are roughly divided into two types. One of the types is a daylight type which is balanced so that the normal colors are reproducible when the photographing operation is conducted under the natural light during the daytime or with the assist of the flash light. The other type is a tungsten type which is balanced so that the normal colors are reproducible when the photographing operation is conducted under the tungsten light. FIGS. 69A and 69B show examples of the spectral sensitivities of both types. As seen from these graphs, the film of the daylight type has higher sensitivity to the red light than the film of the tungsten type. Accordingly, when a picture is taken under the tungsten light having a high concentration of red light components, the developed picture is tinged with red. This is because, unlike the human beings, the color film has no adaptation to the colors. It is necessary to confirm beforehand how the developed picture will look like by correcting the chromatic difference in the developed picture according to the film type. Further, the intention of the camera operator to change the colors of the picture can be fulfilled by performing the color correction based on the prestored color correction amount when the picture is printed without performing the color correction using the filters. A desired coloration can be confirmed beforehand in the monitor 47.

Figure 70:
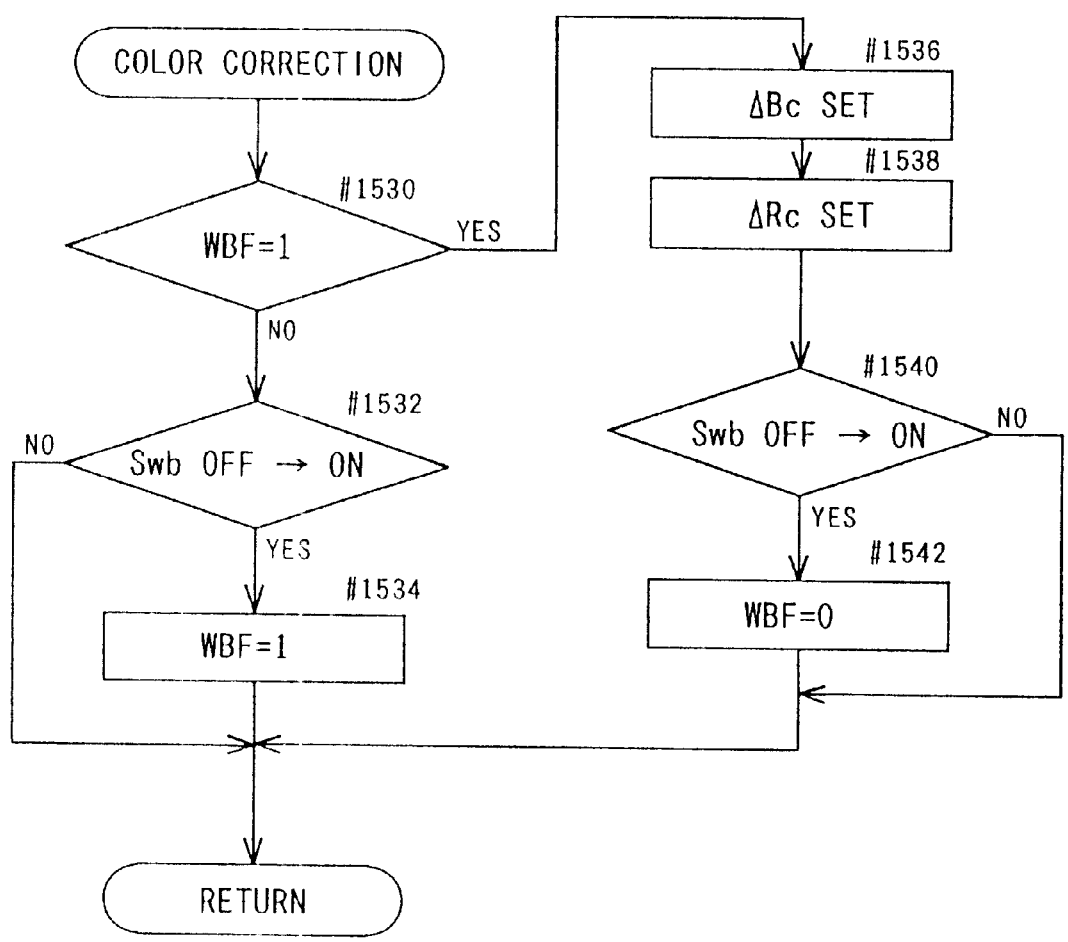
FIG. 70 is a flow chart showing a subroutine "Color Correction"

The subroutine "Color Correction" executed in Step #1466 will be described next with reference to FIG. 70.

It is first discriminated whether the flag WBF indicative of the color correction mode is set (Step #1530). If the flag WBF is not set, it is discriminated whether the state of the color correction switch Swb has been changed from OFF to ON (Step #1532). If the discrimination result in Step #1532 is in the affirmative, the flag WBF is set to set the color correction mode (Step #1534) and this subroutine returns. If the discrimination result in Step #1532 is in the negative, this subroutine returns directly. If the flag WBF is set in Step #1530, color correction amounts ΔBc, ΔRc of blue and red, respectively, are set according to the operated amounts of the front and rear control dials 33, 34 (Steps #1536, #1538). When the switch Swb is turned from OFF to ON (YES in Step #1540), this subroutine returns after resetting the flag WBF so as to exit the color correction mode (Step #1542).

Referring back to FIGS. 65A, and 65B, if the discrimination result in Step #1470 is in the negative, this subroutine proceeds to Step #1464. In the CCD/monitor unit 10, a still picture is displayed automatically when the exposure operation for the preview is carried out. Thereafter, the display mode returns to the animated picture mode when the preview switch Spv is turned on. The color correction and the exposure correction PV are performed while the still picture is displayed (Steps #1464, #1466). When the switch Spv is turned on in Step #1470, the switch data of this switch Spv is output to the CCD/monitor unit 10 through the data output IV (Step #1472) and the timer Th is reset and started (Step #1474). Subsequently, the color correction amounts ΔRc, ΔBc are stored as ΔRcr, ΔBcr respectively (Steps #1476, #1478). The flag WBF is reset (Step #1480); the color correction amounts ΔRc, ΔBc are reset (Step #1482); and this subroutine returns. This arrangement is made to enable the camera operator to choose either photography under color correction or photography without color correction according to his taste or preference during the preview, in consideration of a case where the color correction is reset during the normal photographing operation.

When the data is transmitted from the microcomputer 830 of the transceiver TX during the remote control, a control is executed in response to this data interrupt.

Figure 71:
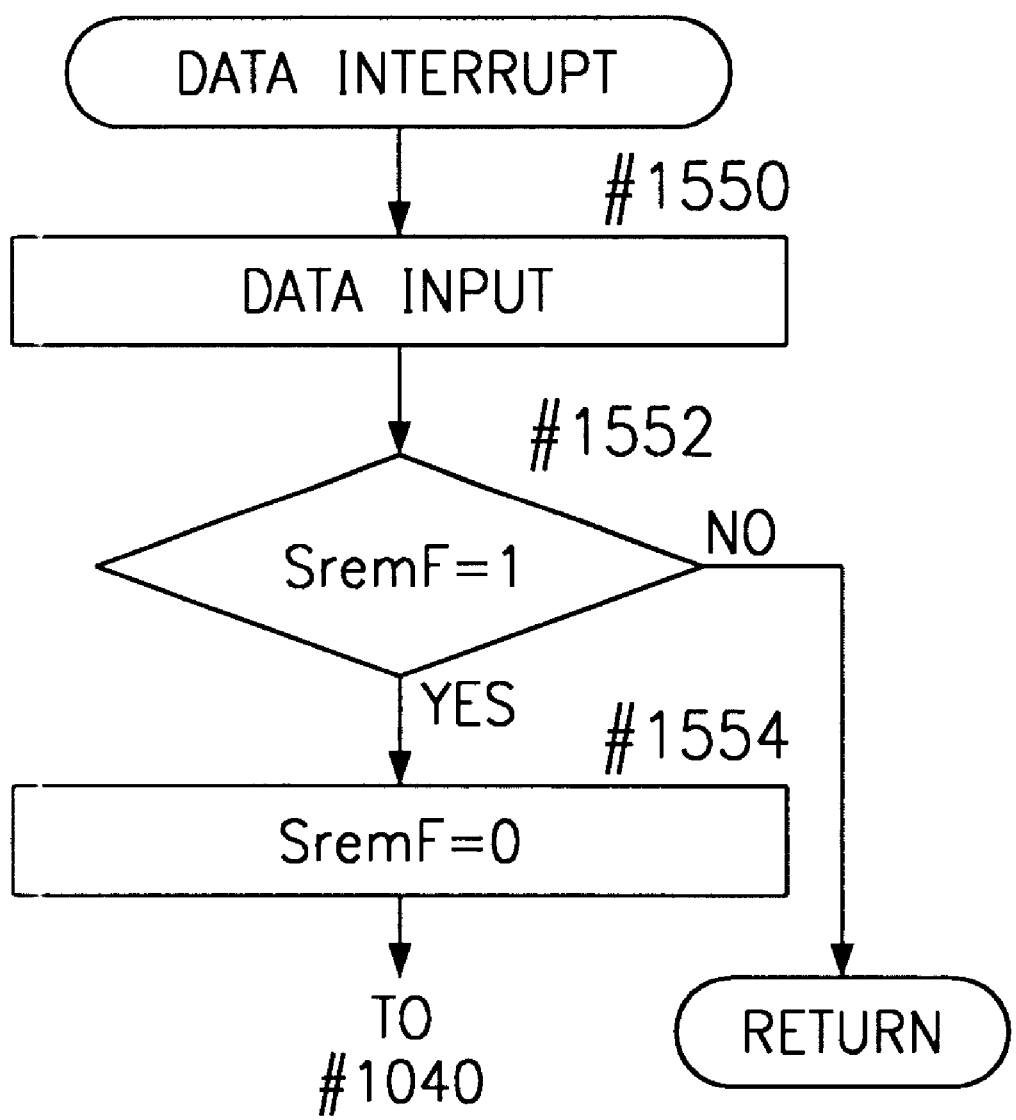
FIG. 71 is a flow chart showing a subroutine "Data Interrupt"

A subroutine "Data Interrupt" will be described with reference to FIG. 71.

In this subroutine, after the receipt of a signal representative of the data interrupt from the microcomputer 830, the microcomputer 700 receives through the microcomputer 830 the data transmitted from the transceiver RX during the remote control (Step #1550). It is then discriminated whether a flag SremF indicative of a remote control mode is set (Step #1552). Unless the flag SremF is set, this subroutine returns on the assumption that the remote control switch Srem has not been turned on to set the remote control mode. If the flag SremF is set, the flag SremF is reset (Step #1554) and this routine proceeds to Step #1040 (FIG. 55) in which the remote control is executed.

FIGS. 72 to 85B are flow charts showing an operation sequence in the CCD/monitor unit 10 and these operations are controlled by the microcomputer 800.

Figure 72:
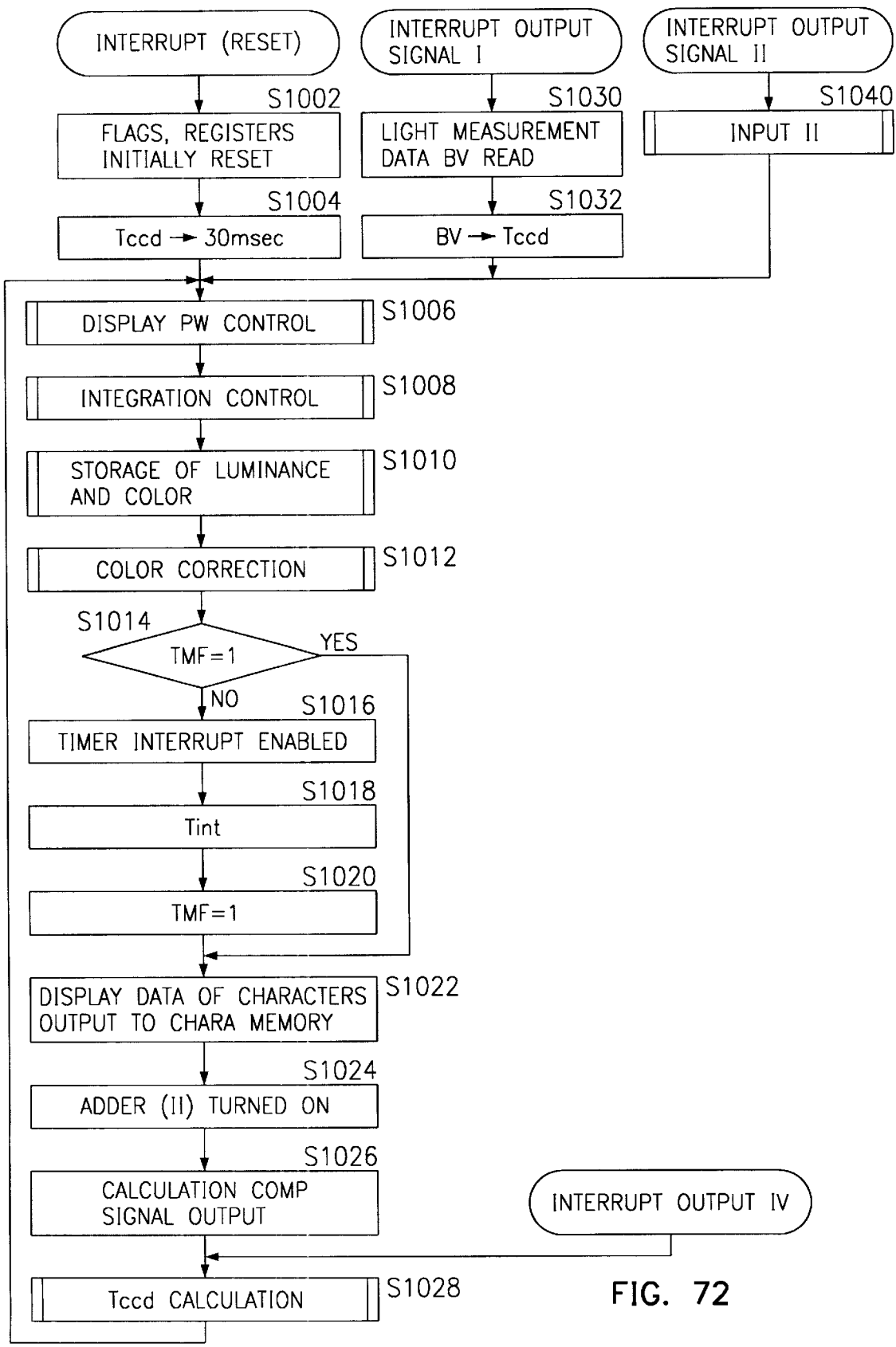
FIG. 72 is a flow chart showing another interrupt routine executed when power is applied to the camera system or other occasions.

FIG. 72 is a flow chart showing an interrupt routine executed when the power supply is turned on.

Upon the application of power to the microcomputer 800, flags, registers, and the like are initially reset (Step S1002). More specifically, a variable N is set at 0; the display mode is set at the animated picture mode; the display but an output is not; the display memory 112 is set to a state where an input is not allowed but an output is allowed; and the flag SPIF is set at 1. An integrating time Tccd for the CCD 43 is initially set at 30 msec (Step S1004); a subroutine "Display Power Supply Control" is executed to supply power to necessary portions to enable display for monitor (Step S1006) and a subroutine "Integration Control" is executed (Step S1008).

Figure 73:
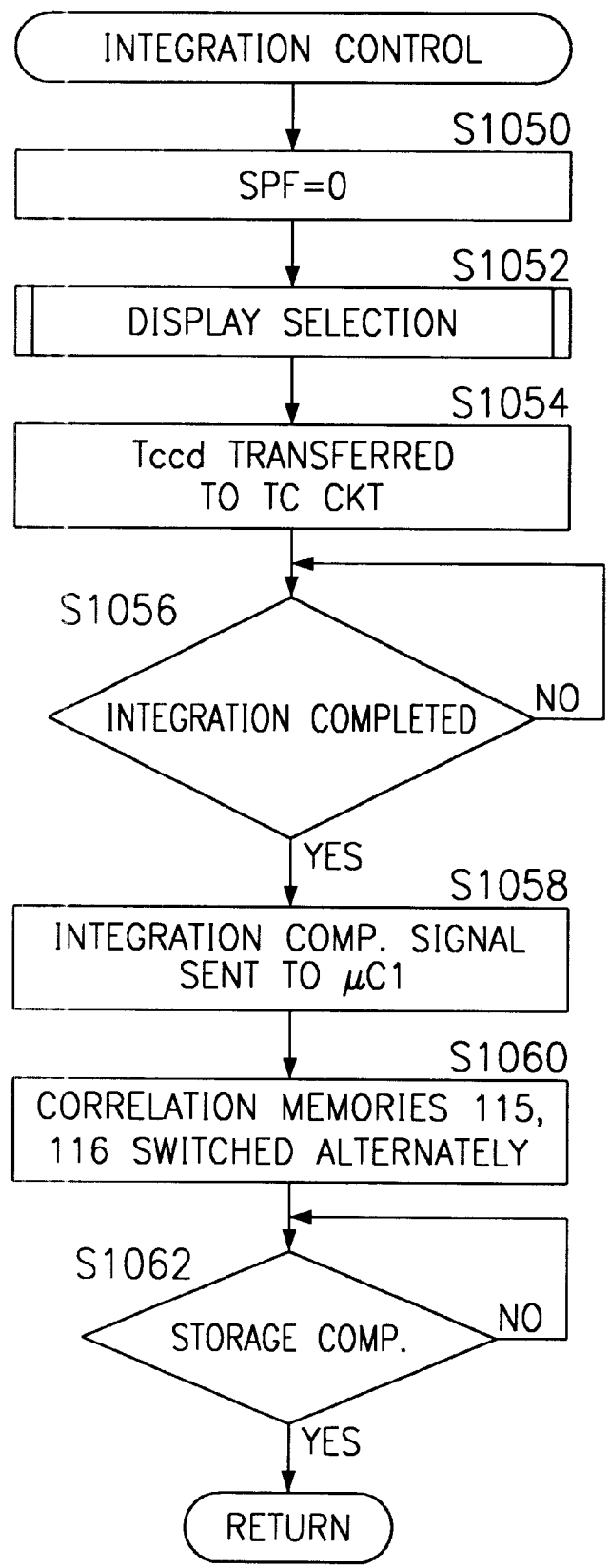
FIG. 73 is a flow chart showing a subroutine "Integration Control"

This subroutine "Integration Control" is described with reference to FIG. 73.

First, the still picture flag SPF indicative of the still picture mode is reset (Step S1050) and the display memory for storing image data picked up by the CCD 43 is selected by executing a subroutine "Display Selection" (Step S1052). The flag SPF is reset in Step S1050 is so that the still picture is not displayed during the integration control. The flag SPF is set again in the subroutine "Display Selection." Then, the integrating time Tccd is transferred to the timing control circuit 101 (Step S1054). Upon the receipt of this data, the timing control circuit 101 causes to start the integrating operation for the CCD 43 and outputs an integration completion signal to the microcomputer 800 when the integrating operation is completed (Step S1056). Upon the receipt of the integration completion signal, the microcomputer 800 sends this signal to the microcomputer 700 (Step S1058) and causes the correlation memories 115, 116 for detecting the camera shake to be switched alternately (Step S1060). This subroutine returns after the microcomputer 800 receives a storage completion signal indicative of the completion of storage of the image data in the display memory (Step S1062). This storage completion signal is input from the timing control circuit 101.

Figure 74:
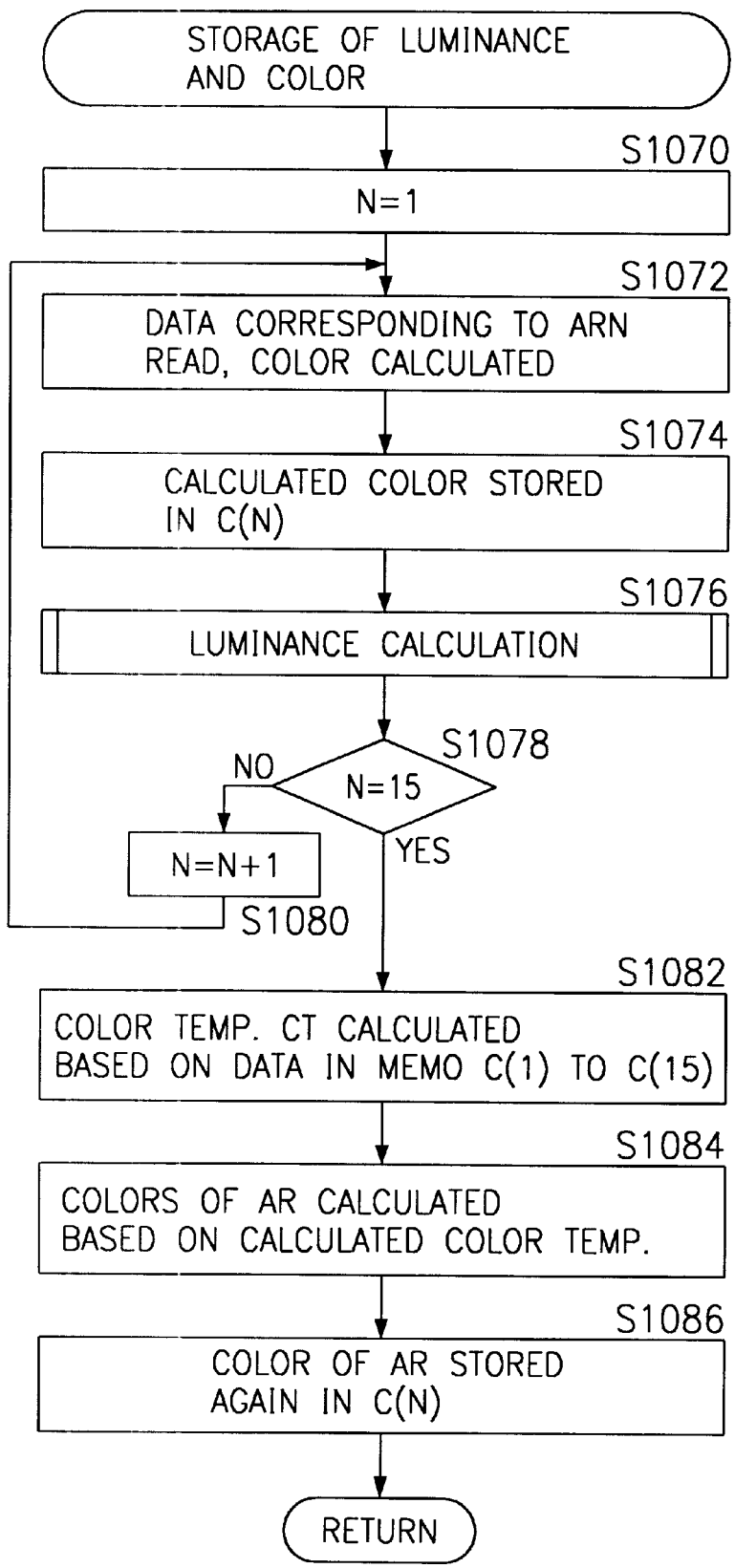
FIG. 74 is a flow chart showing a subroutine "Storage of Luminance and Color"

FIG. 74 is a flow chart showing a subroutine "Storage of Luminance and Color" executed in Step S1010 in FIG. 72.

This subroutine is executed to store the luminance and the color on the respective areas AR of the CCD 43. Firstly, the variable N indicative of the specific area AR is set at "1" (Step S1070). The data corresponding to the designated area AR is read from the RGB memory 106 and the color is calculated based on this read data in accordance with a predetermined operational expression (Step S1072). The calculated color is stored in the color memory C(N) in the microcomputer 800 (Step S1074). It is noted that the data obtained in this subroutine are stored in a memory provided in the microcomputer 800. Then, a subroutine "Luminance Calculation" is executed (Step S1076).

Figure 75:
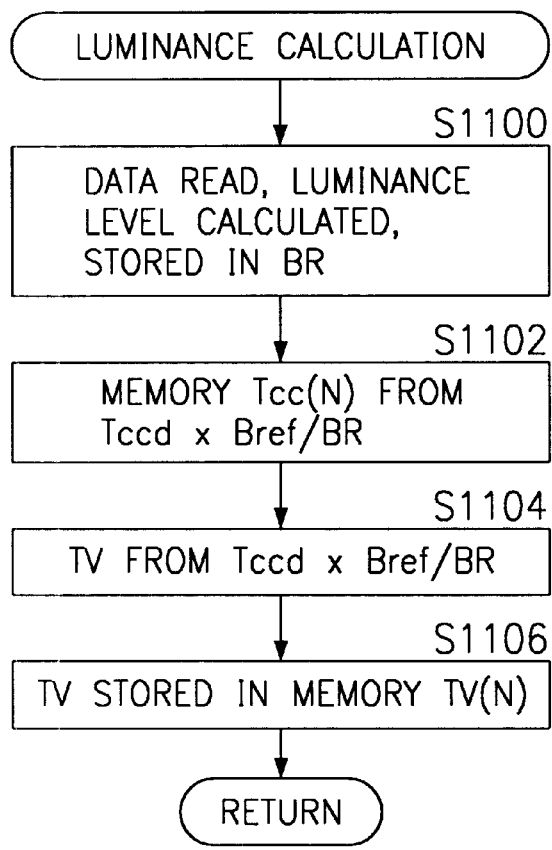
FIG. 75 is a flow chart showing a subroutine "Luminance Calculation"

This subroutine "Luminance Calculation" will be described next with reference to FIG. 75.

The data corresponding to the designated area AR is first read from the RGB memory 106 and a mean luminance level of this area AR is calculated based on the read data and is stored in a register BR (Step S1100). In Step S1102, the present integrating time Tccd is multiplied by a ratio of a reference level Bref of the signal from the CCD 43 to the mean luminance level and the multiplication result is stored in a memory Tccd(N). Further, a value (Tccd×Bref/BR) is converted into a logarithmic value TV (Step S1104) and thus obtained logarithmic value is stored in a memory TV(N) (Step S1106).

Referring back to FIG. 74, it is discriminated whether N=15 (Step S1078). If N≠15, this subroutine proceeds to Step S1072 after the variable N is incremented by one in Step S1080. If N=15, a color temperature CT of an entire picture (i.e., a temperature of the light source) and color temperatures of the respective areas AR are calculated based on the data stored in the memories C(1) to C(15) and colors of the areas AR are calculated based on thus calculated color temperatures (Steps S1082, S1084). Thus obtained colors of the areas AR are stored again in the color memories C(N) (Step S1086).

Referring back to FIG. 72, a subroutine "Color Correction" is executed in Step S1012.

FIG. 76 is a flow chart showing this subroutine "Color Correction."

Color correction data ΔB, ΔR are both set at "0" and color correction amounts ΔR2, ΔB2 are obtained based on the color correction data ΔBc, ΔRc input from the camera main body 20 (Step S1120). It is then discriminated whether the loaded film is of the daylight type, of the tungsten type, or the black-and-white type (Step S1122). If the loaded film is of the tungsten type, the color correction amounts ΔB1, ΔR1 according to this film type are set as ΔBt, ΔRt (Steps S1124, S1126). If the loaded film is of the daylight type, the color correction amounts ΔB1, ΔR1 according to this film type are set as ΔBd, ΔRd (Steps S1134, S1136). The overall color correction amounts ΔB, ΔR are calculated: ΔB=ΔB1+ΔB2, ΔR=ΔR1+ΔR2 (Steps S1128, S1130). A control signal i is generated according to thus obtained color correction amounts ΔB, ΔR and is sent to the color converting circuit 120 (S1132). If the film is of the black-and-white type, a control signal i for deleting the information concerning colors is generated and sent to the color converting circuit 120 (Step S1138).

Referring to FIG. 72, it is discriminated whether the timer flag TMF is set (Step S1014). Unless the timer flag TMF is set, a timer interruption is enabled (Step S1016); a subroutine timer interrupt, or "Tint", is executive (Step S1018); and the flag TMF is set (Step S1020). If the timer flag TMF is set in Step S1014, this subroutine proceeds directly to Step S1022.

In Step S1022, a display data representative of characters is output to the character memory 108 to be stored temporarily therein. The adder(II) 109 is then turned on (Step S1024). At this time, in accordance with the signal from the timing control circuit 101, the display data is output to either one of the display memories 111 and 112 synchronously with the output of the image data to be displayed. The character is displayed in a specified position on a screen of the monitor 47. The characters to be displayed in the monitor 47 include the frames 19, 191, 192, the aperture value Av, the shutter speed Tv, the selected area, the gaze area, and the like.

Subsequently, a calculation completion signal is output (Step S1026); a subroutine "Tccd Calculation" is executed (Step S1028); and this subroutine proceeds to Step S1008.

Figure 77:
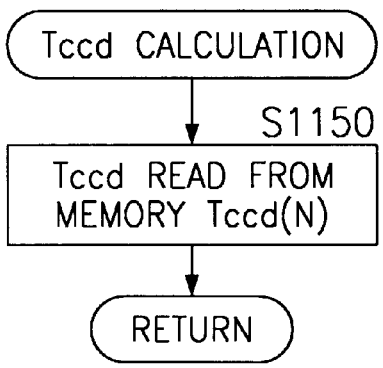
FIG. 77 is a flow chart showing a subroutine "Tccd Calculation"

FIG. 77 is a flow chart showing the subroutine "Tccd Calculation."

The integrating time Tccd is read from the memory Tccd(N) (Step S1150) and then this subroutine returns.

Figure 78:
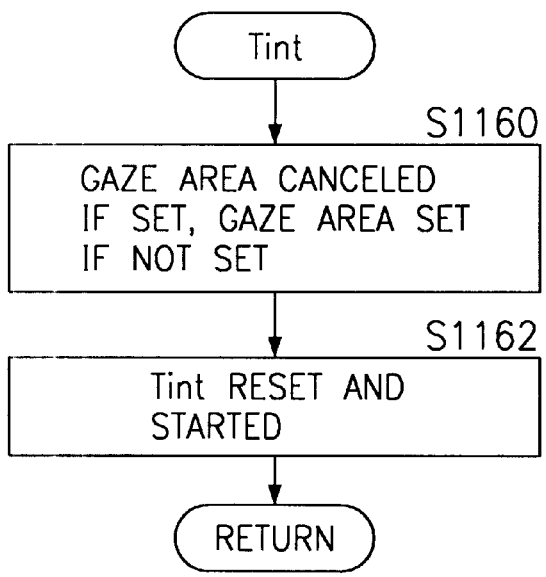
FIG. 78 is a flow chart showing a subroutine "Timer Interrupt (Tint)"

FIG. 78 is a flow chart showing a subroutine "timer Interrupt or Tint."

This subroutine is executed when the timer measures a predetermined period, e.g., 0.5 seconds. In Step S1160, such a data is generated which cancels the gaze area if it is set and sets the gaze area if it is not set. Then, the timer Tint is reset and started (Step S1162) and this subroutine returns.

In FIG. 72, when an "interrupt output I" is made from the microcomputer 700, the light measurement data BV at that time is read (Step S1030) and the integrating time Tccd of the CCD 43 is calculated based on this light measurement data BV (Step S1032). Thereafter, the subroutine "Display Power Supply Control" is executed in Step S1006. When an "interrupt output II" is made from the microcomputer 700, a subroutine "Input II" is executed (Step S1040).

Figure 79:
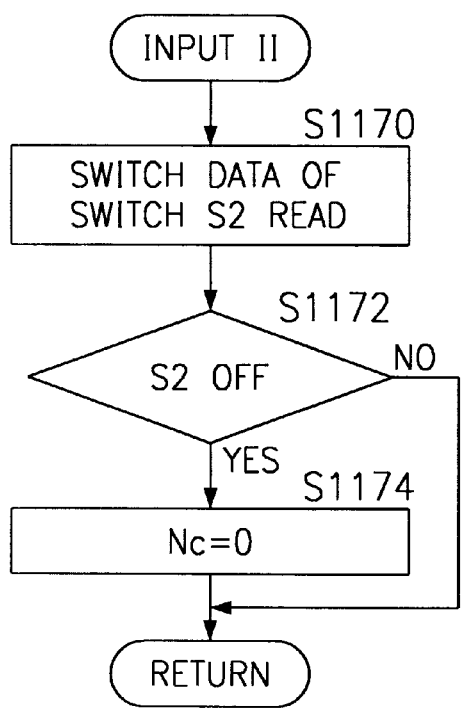
FIG. 79 is a flow chart showing a subroutine "Input II"

FIG. 79 is a flow chart showing the subroutine "Input II."

The switch data of the switch S2 is read (Step S1170). It is then discriminated whether the switch S2 is off (Step S1172. If the switch S2 is off, this subroutine returns after a variable Nc to be described later is set at "0" (Step S1174). Conversely, if the switch S2 is on, this subroutine returns directly.

Other interruptions from the microcomputer 700 include a data input through the "data output III" and an input IV through the "data output IV". The input IV is used to control instructions for the displays or the like.

The subroutine "Input IV" will be described with reference to FIG. 80A.

Firstly, the flag DPIF is reset (Step S1180). The flag DPIF is based on switch data and indicative of whether the data stored in the built-in memory should be displayed. The data is input in Step 181 and it is then discriminated whether the switch S2 is on (Step S1182). If the switch S2 is on, a subroutine "Exposure Control" is executed (Step S1184).

Figure 81:
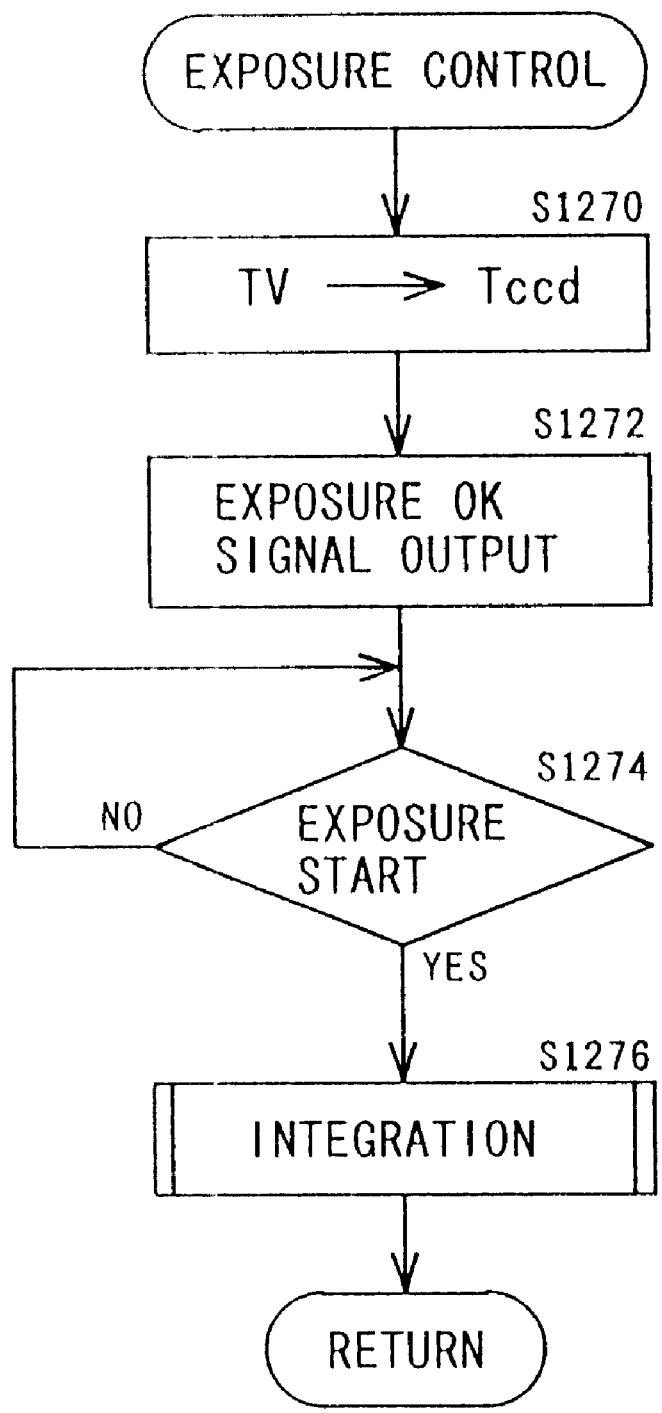
FIG. 81 is a flow chart showing a subroutine "Exposure Control"

This subroutine "Exposure Control" will be described with reference to FIG. 81.

The shutter speed Tv expressed as a logarithmic value which is input from the microcomputer 700 is converted into the actual integrating time Tccd of the CCD 43 (Step S1270) and the exposure OK signal is output (Step S1272). It is then waited until the exposure start signal is input from the microcomputer 700 (Step S1274). Upon the receipt of this signal, a subroutine "Integration" is executed (Step S1276) and this subroutine returns.

Figure 82:
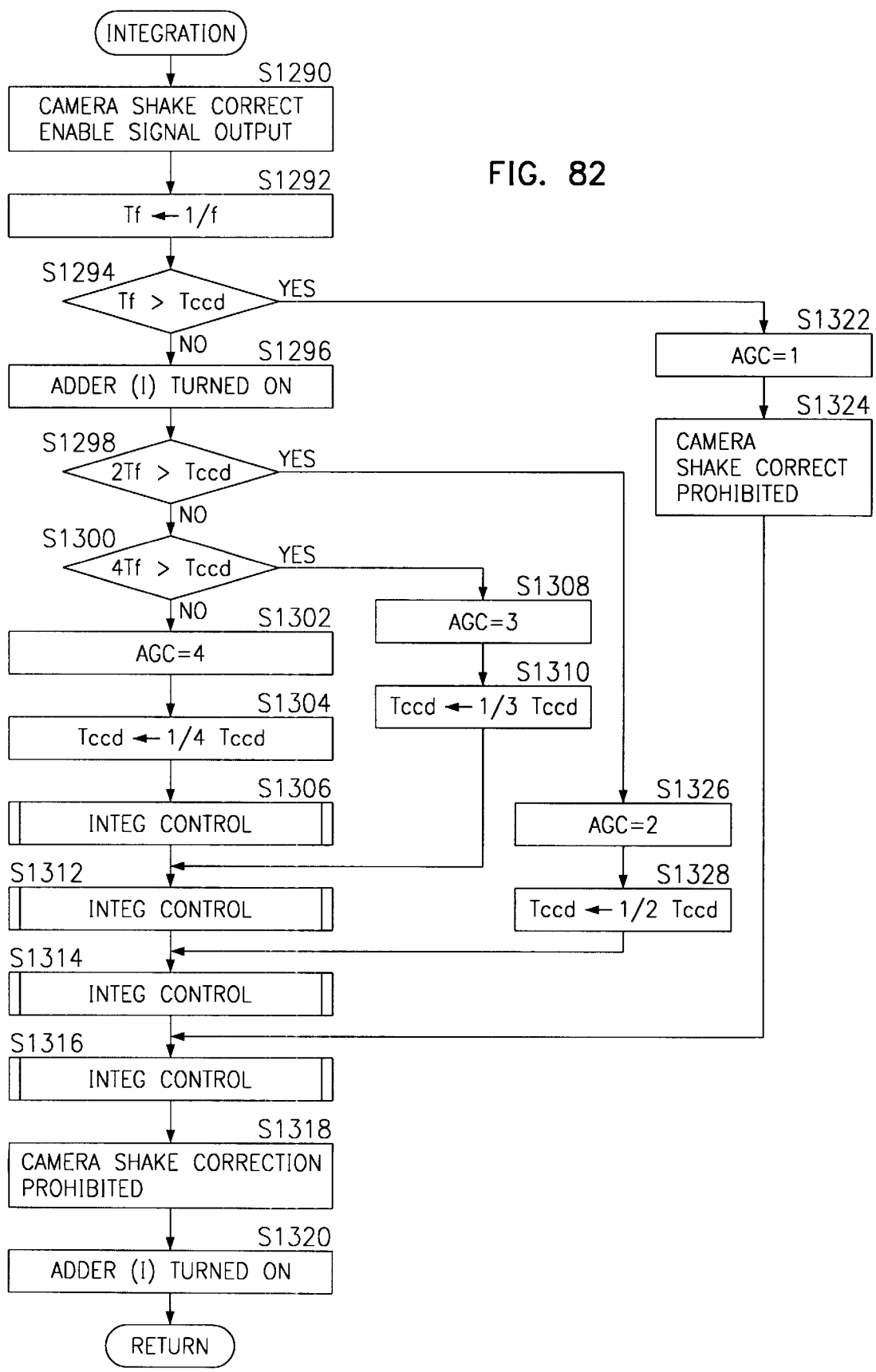
FIG. 82 is a flow chart showing a subroutine "Integration"

The subroutine "Integration" will be described with reference to FIG. 82.

Concurrently with the execution of this subroutine, the camera shake (shaking of the object) is detected in the CCD/monitor unit 10. When an exposure time is long, the camera shake detection is required to be made a plurality of times during the exposure. Accordingly, in this case, the integrating time Tccd is divided by a desired integer: the exposure is conducted for each divided time; and consequently the respective read image data are added in digital manner.

A camera shake correction enable signal is output to the lens drive circuit LEMII 8 (Step S1290) and a limit shutter speed Tf (normally 1/f) is calculated based on the read focal length f of the lens (Step S1292). The limit shutter speed Tf is the slowest shutter speed at which the camera shake can be prevented. It is then discriminated whether the limit shutter speed Tf is greater than the integrating time Tccd (Step S1294). If Tf>Tccd, the gain of the digital gain controller 118 is set at "1" on the assumption that the possibility of the camera shake is low (Step S1322); the camera shake correction is prohibited (Step S1324); and this subroutine proceeds to Step S1316. The integration control is executed (Step S1316); the camera shake correction is prohibited (Step S1318); the adder(I) 105 is turned on (Step S1320); and this subroutine returns.

If Tf≦Tccd, the adder(I) 105 is turned on (Step S1296). It is then discriminated whether 2Tf>Tccd (Step S1298). If 2Tf>Tccd, the gain of the digital gain controller 118 is set at "2" on the assumption that the camera shake amount is small (Step S1326) and the integrating time is divided by 2, i.e., is changed to Tccd/2, (Step S1328). Consequently, the integration control is conducted twice (Steps S1314 and S1316). Upon the completion of the integration control, the camera shake correction is prohibited (Step S1318); the adder(I) 105 is turned on (Step S1320); and this subroutine returns.

If 2Tf≦Tccd in Step S1298, it is discriminated whether 4Tf>Tccd (Step S1300). If 4Tf>Tccd, the gain of the digital gain controller 118 is set at "3" (Step S1308) and the integrating time is divided by 3, i.e., is changed to Tccd/3 (Step S1310). Consequently, the integration control is conducted three times in Steps S1312, S1314 and S1316. Upon the completion of the integration control, the camera shake correction is prohibited (Step S1318); the adder(I) 105 is turned on (Step S1320); and this subroutine returns.

If 4Tf≦Tccd in Step S1300, the gain of the digital gain controller 118 is set at "4" (Step S1302) and the integrating time is divided by 4, i.e., is changed to Tccd/4 (Step S1304). Consequently, the integration control is conducted four times in Steps S1306, S1312, S1314 and S1316. Upon the completion of the integration control, the camera shake correction is prohibited (Step S1318); the adder(I) 105 is turned on (Step S1320); and this subroutine returns.

The signal gain-controlled in the digital gain controller 118 is output alternately to the correlation memories 115, 116 for each integration. The correlation calculating circuit 117 correlates the image signals read from the memories 115, 116 to detect how much the image has been shifted, and outputs the correlation result to the LEMII 8. The LEMII 8 calculates a correction amount based on the received correlation result and drives the taking lens 211 by the obtained correction amount.

At this time, the image signals are added after each integration and are stored again in the RGB memory 106. This enables the attainment of the image for the entire exposure time and of the proper luminance of the image on the screen of the monitor 47.

Referring back to FIG. 80A, after the exposure control is completed in Step S1184, it is discriminated whether the continuous film drive mode is set (Step S1186). If the continuous film drive mode is set, the variable Nc indicative of the address of the image memory 110 is incremented by one (Step S1192) and the photographed image is written in an address corresponding to the incremented variable Nc (Step S1194). More specifically, the still picture mode is not set when the continuous film drive mode is set and the photographed images are stored one by one so that the photographed images can be viewed as animated pictures upon the completion of the series shooting. Thereafter, the routine awaits any interruption (Step S1200). If the single film drive mode is set in Step S1186, it is discriminated whether the manual mode is set (Step S1188). If the manual mode is set, the animated picture mode is kept on without being changed to the still picture mode and the variable Nc is set at 1 (Step S1190). Accordingly, the photographed image is written in the same address of the image memory 110 (Step S1194). On the other hand, if the automatic mode is set in Step S1188, the still picture flag SPF is set to set the still picture mode (Step S1196) and the subroutine "Display Selection" is executed (Step S1198).

Figure 83A:
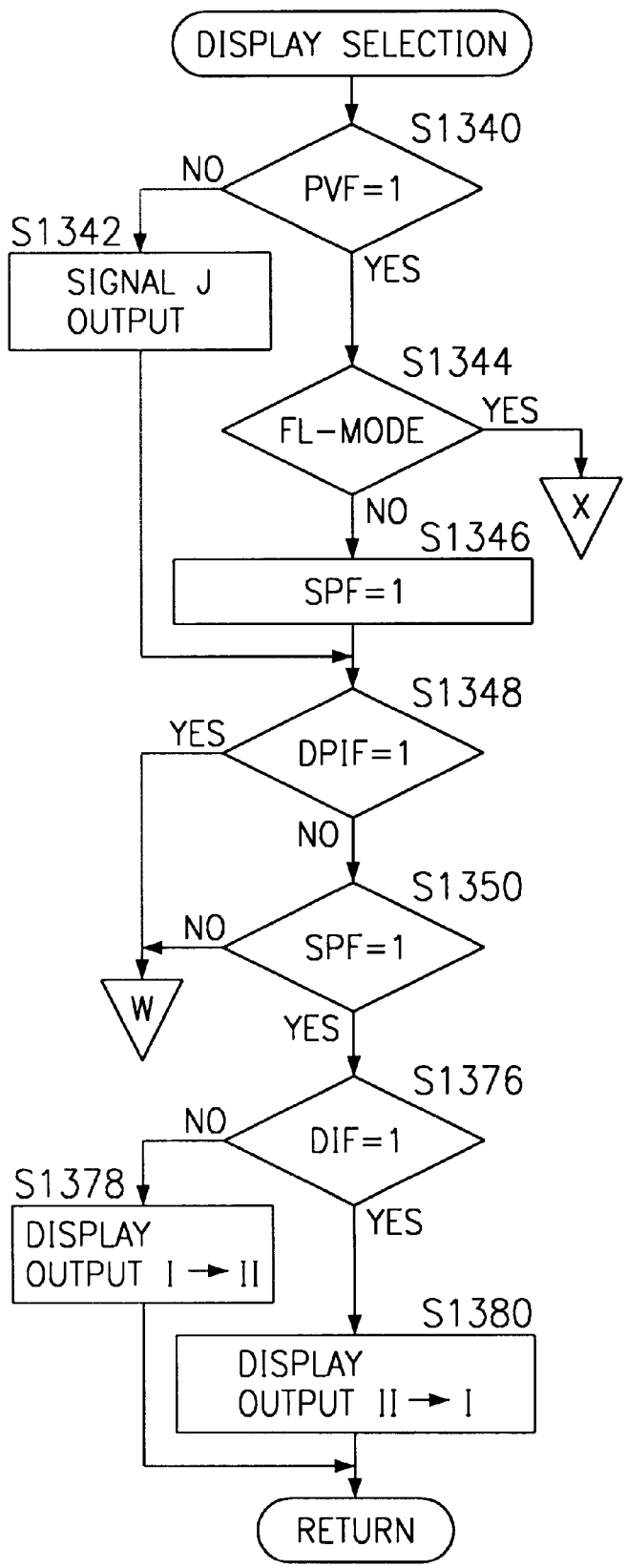
FIGS. 83A, 83B, 83C are a flow chart showing a subroutine "Display Selection"
Figure 83B:
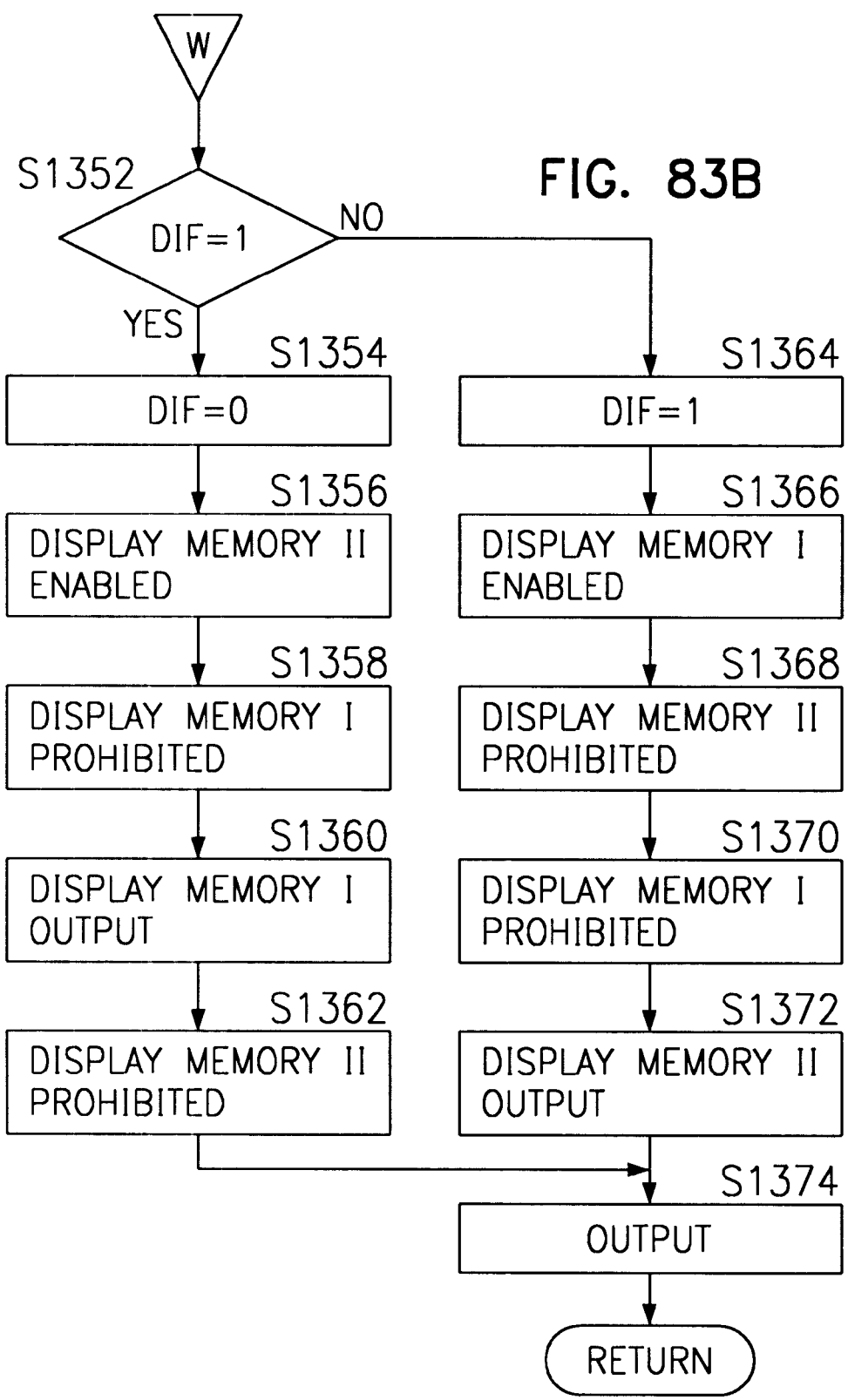

This subroutine "Display Selection" will be described with reference to FIGS. 83A to 83C.

It is first discriminated based on the state of the flag PVF whether the preview mode is set (Step S1340). If the preview mode is not set, a signal j is output which causes the adding/subtracting circuit 123 to output the input signal without performing the processing (Step S1342) and this subroutine proceeds to Step S1348. If the preview mode is set, it is discriminated whether a flash mode is set (Step S1344). If the flash mode is not set, this routine proceeds to Step S1348 after setting the still picture flag SPF is Step S1346. In Step S1348, it is discriminated whether the flag DPIF is set. As stated earlier, the flag DPIF is indicative of whether the data stored in the built-in memory should be displayed. If the flag DPIF is not set, it is discriminated whether the flag SPF is set (Step S1350). If the flag SPF is not set, it is discriminated whether the flag DIF is set (Step S1352).

If the flag DPIF is set in Step S1348, this subroutine proceeds to Step S1352 so as to designate the display memory 111 or 112 in which the image data from the image memory 110 is stored. If the flag DIF is set in Step S1352, this flag is reset (Step S1354). Subsequently, the display memory 112 (denoted by display memory II in FIGS. 83A to 83C) is switched to an input enabled state (Step S1356) and the display memory 111 (denoted by display memory I in FIGS. 83A to 83C) is switched to an input prohibited state (Step S1358). Control data are set so that (i) data in the display memory 111 is output to the display control circuit 114 and the output of data from the display memory 112 is prohibited, and (ii) the control data is output to the display memories 111, 112 (Step S1354 to S1362, S1374). If the flag DIF is not set in Step S1352, this flag is set (Step S1364). Subsequently, the display memory 111 is switched to an input enabled state (Step S1366) and the display memory 112 is switched to an input prohibited state (Step S1368). Control data is set so that (i) the output of data from the display memory 111 is prohibited and the output of the data from the display memory 112 is allowed, and (ii) the control data is output to the display memories 111, 112 (Steps S1364 to S1374). Consequently, this subroutine returns.

If the still picture flag SPF is set Step S1350, it is discriminated whether the flag DIF is set (Step S1376). If the flag DIF is set, the display memory 111 is prohibited to output the display data while the display memory 112 is enabled to output the display data (Step S1380). Conversely, if the flag DIF is not set, the display memory 112 is prohibited to output the display data while the display memory 111 is enabled to output the display data (Step S1378). As will be seen from the above, in the still picture mode, one of the display memories 111, 112 is brought into a state where the input is prohibited but the output is enabled, whereas the other is brought into a state where the input is enabled but the output is prohibited. Since the image data is output from only one of the display memories at the same time in this picture mode, the still picture can be displayed. In addition, the animated picture mode can be displayed since a new image data is constantly stored in one of the display memories 111, 112 and the output from these memories is switched alternately.

Figure 83C:
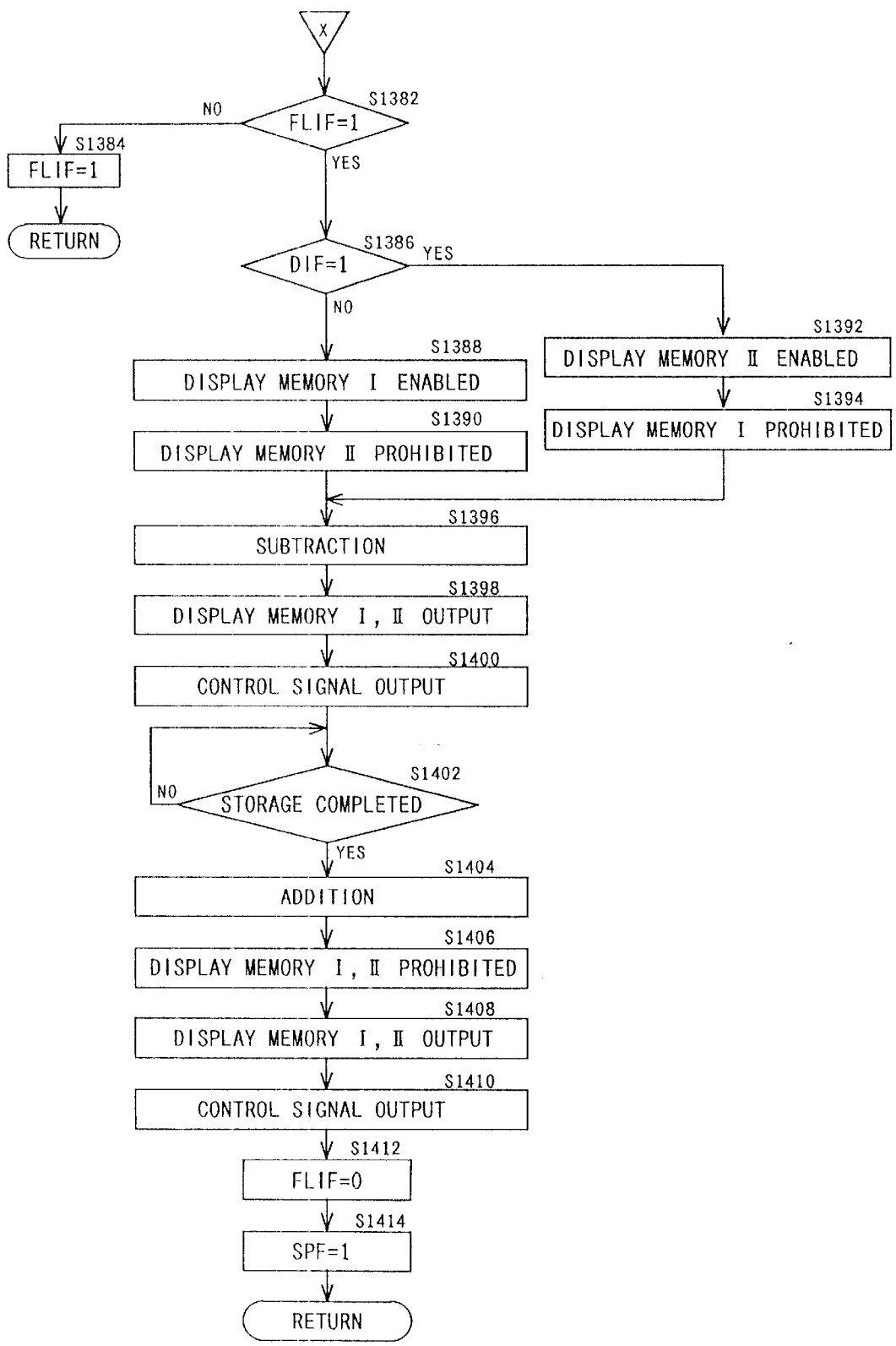

If the flash mode is set in Step S1344, this subroutine proceeds to Step S1382 of FIG. 83C in which it is discriminated whether this is the first flash assisted image pick-up operation during the preview, i.e., a flag FLIF is not set (Step S1382). If the flag FLIF is not set, this flag is set (Step S1384) and this subroutine returns. In this way, the data obtained in the first image pick-up operation under the ambient light is stored in the display memory 111 (or the display memory 112) and the data obtained in the second image pick-up operation with the assist of the flash light is stored in the display memory 112 (or the display memory 111). If this is not the first flash assisted image pick-up operation, this subroutine proceeds to Step S1386 since the flag FLIF is set in Step S1384 after the first flash assisted image pick-up operation. In Step S1386, it is discriminated whether the flag DIF is set. When the image data obtained in the latest flash assisted image pick-up operation is stored in the display memory 111, i.e. DIF=0, the input to the display memory 111 is enabled and the input to the display memory 112 is prohibited (Steps S1388, S1390). On the other hand, if the flag DIF is set, the input to the display memory 112 is enabled and the input to the display memory 111 is prohibited (Steps S1392, S1394). In this way, the image data having its ambient light components removed therefrom to be described later is stored in the display memory in which the image data obtained in the flash assisted image pick-up operation is stored.

In Step S1396, the adding/subtracting circuit 123 is switched to perform the subtraction. Then, the display memories 111, 112 are brought into the states where they can output the image data (Step S1398) and control signals c, d, k, l, j are output to be stored in one of the display memories 111, 112 (Step S1402). All control signals are then stored (Step 1402). By the above subtraction, the ambient light components of the image data are removed and thereby only the flash light components are extracted. It is noted that the outputs, the operations, and the like are synchronized in accordance with the control signal a.

Upon the completion of the storing operation (YES in Step S1402), the adding/subtracting circuit 123 is switched to perform the addition (Step S1404). Thereafter, the input to the display memories 111, 112 is prohibited (Step S1406); the control signals a, d, k, l, j are output (Step S1410); the flag FLIF is reset (Step S1412); the flag SPF is set (Step S1414); and this subroutine returns. In this way, the image including both the flash light components and the ambient light components can be displayed in the monitor 47 as an image picked up during the flash assisted preview image pick-up operation. This arrangement is made, so that the flash light amount and the ambient light amount can be individually adjusted for the exposure. This will be described more in detail later.

Referring back to FIG. 80A, if the switch S2 is off in Step S1182, this subroutine proceeds to Step S1202 (FIG. 80B) in which it is discriminated whether the state of the switch Spv has been changed from OFF to ON. If the discrimination result is in the affirmative, it is discriminated whether the still picture flag SPF is set (Step S1204). If the still picture flag SPF is set, it is judged that the switch Spv has been operated to cancel the still picture mode and the flag PVF indicative of the preview mode is reset (Step S1214). Thereafter, the flag SPF is reset (Step S1216); the subroutine "Display Selection" is executed (Step S1218); and this subroutine returns. If the flag SPF is not set in Step S1204, the flag PVF is set (Step S1206) and the subroutine "Exposure Control" is executed (Step S1208). Then, the subroutine "Display Selection" is executed (Step S1210) and it is waited until any further interruption is made (Step S1212).

If the discrimination result in Step S1202 is in the negative, it is discriminated whether the preview mode is set (Step S1220). If the preview mode is set, (PVF=1), it is judged that the color correction and exposure correction are to be performed while viewing the still picture during the preview. Accordingly, the color correction and exposure correction are performed (Steps S1222, S1224) and the routine awaits any further interruption (Step S1226).

Figure 84:
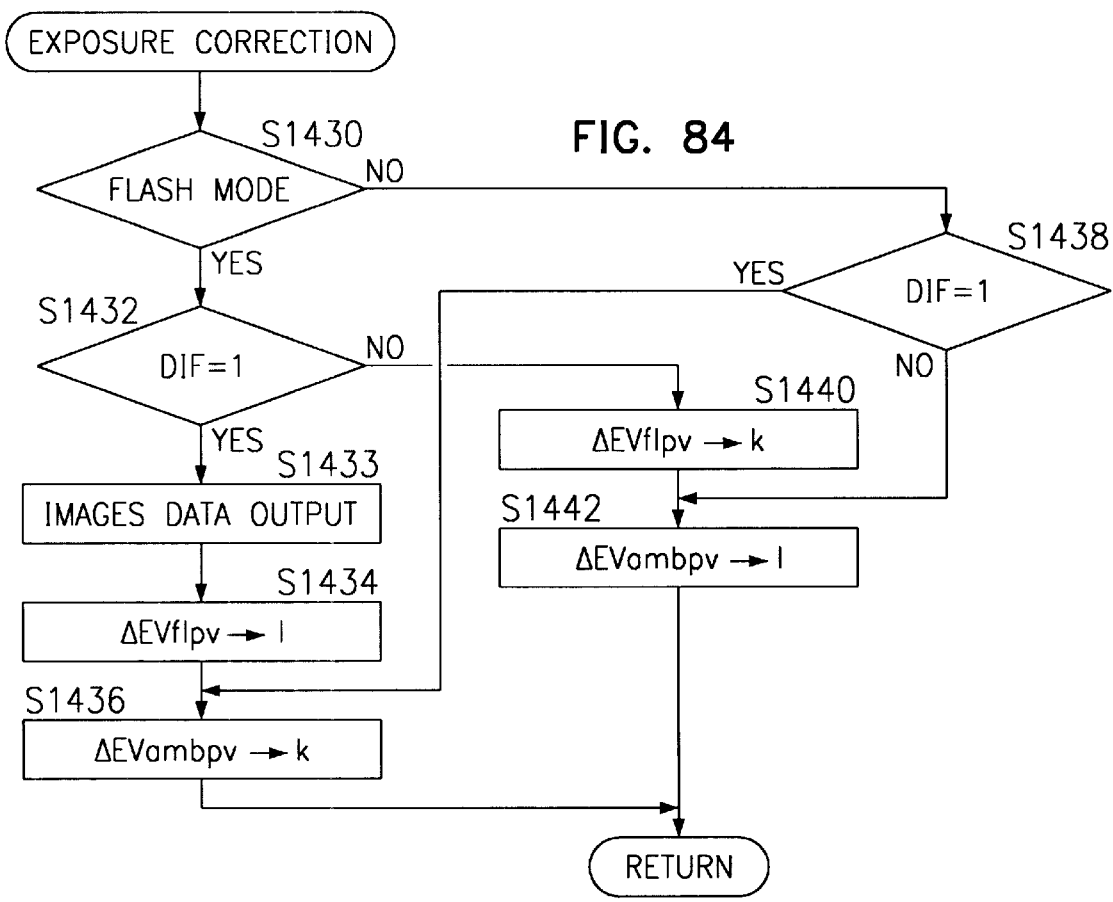
FIG. 84 is a flow chart showing a subroutine "Exposure Correction"

The subroutine "Exposure Correction" executed in Step S1224 will be described with reference to FIG. 84.

It is first discriminated whether the flash mode is set (Step S1430). If the flash mode is set, it is discriminated whether the flag DIF is set (Step S1432). If the flag DIF is set, the image including only the flash light components is stored in the display memory 112 and the image including only the ambient light components is stored in the display memory 111. Accordingly, values 1, k are output respectively according to the flash light adjustment amount ΔEVflpv and the ambient light adjustment amount ΔEVambpv (Steps S1434, S1436). On the other hand, if the flag DIF is reset, values k, 1 are output respectively according to the flash light adjustment amount ΔEVflpv and the ambient light adjustment amount ΔEVambpv (Steps S1440, S1442).

If the flash mode is not set in Step S1430, the exposure adjustment is performed for the image picked up operation under the ambient light, which is same as the adjustment of the ambient light in the flash mode. Accordingly, the value k according to the ΔEVambpv is output (Step S1436) when the flag DIF is set (YES in Step S1438), while the value 1 according to the ΔEVambpv is output (Step S1442) when the flag DIF is reset (NO in Step S1438).

Figure 80B:
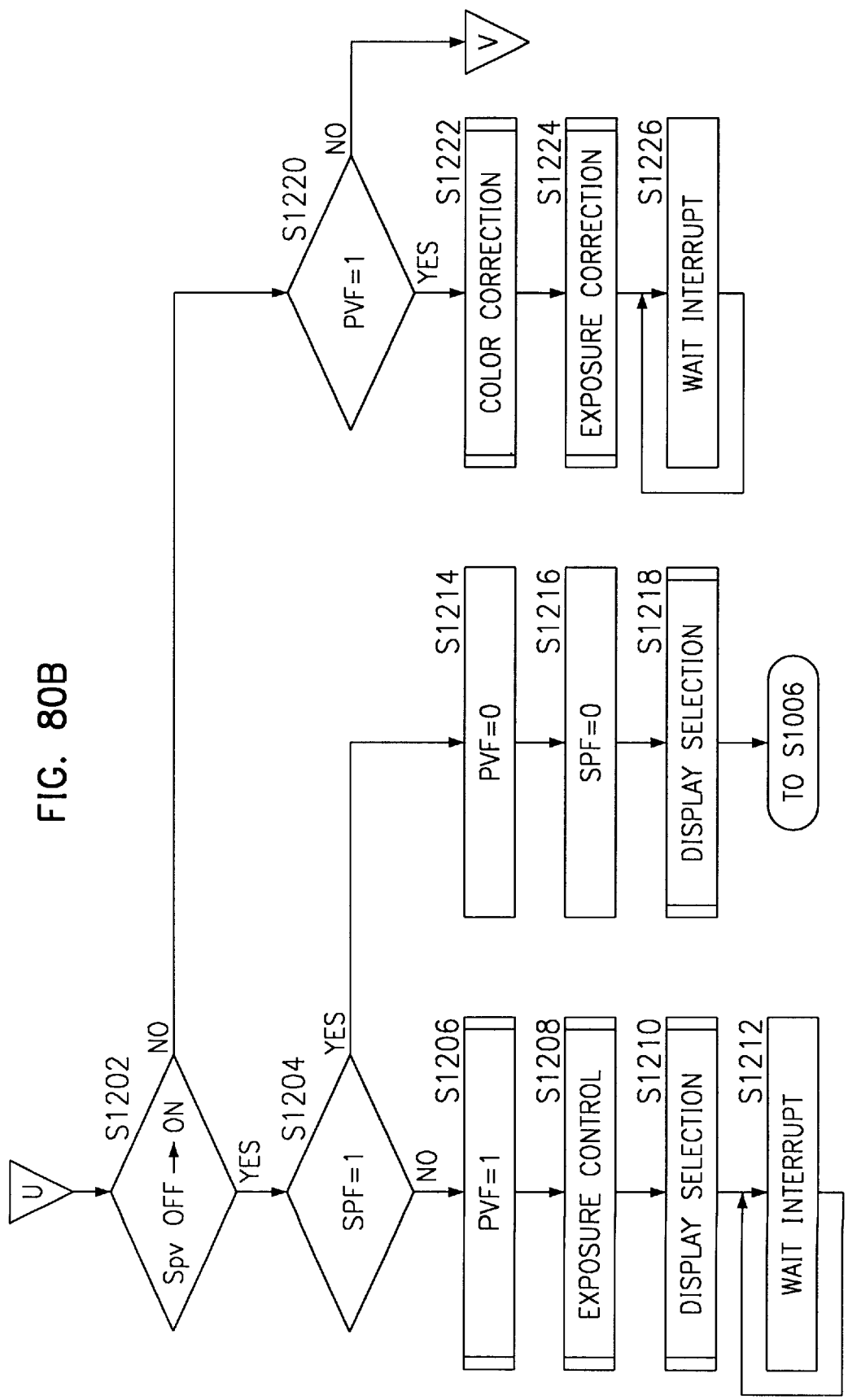
Figure 80C:
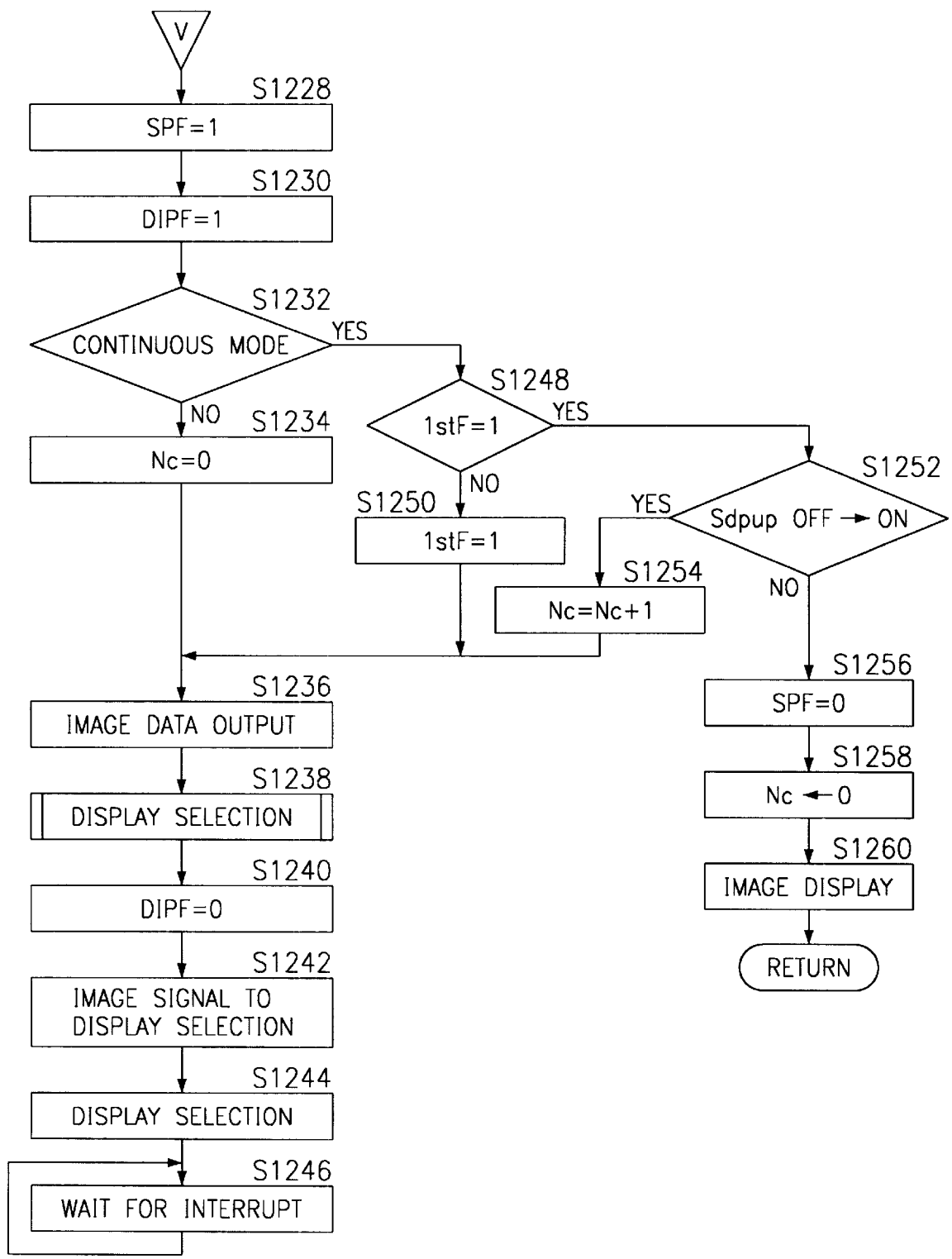

On the other hand, if the flag PVF is not set in Step S1220 of FIG. 80B, the still picture flag SPF and the flag DIPF are set. (Steps S1228, S1230 of FIG. 80C) so as to display the data from the image memory 110 as a still picture.

It is then discriminated whether the continuous film drive mode is set (Step S1232). If the single film drive mode is set, the variable Nc is set at 0 (Step S1234) on the assumption that this subroutine is entered through the operation of the manual mode. Then, the selector 113 is controlled so that the image data in the image memory 110 is output to the display memory (Step S1236). It is determined in the subroutine "Display Selection" in which one of the display memories 111, 112 the image data should be stored (Step S1238) and the flag DIP is reset for the subsequent control (Step S1240). Further, the image signal from the address "0" (=Nc) of the image memory 110 is sent to the display memory 111 or 112 (Step S1242); the display memory corresponding to the image data to be displayed is selected in the subroutine "Display Selection" (Step S1244); and it is waited for any further interruption (Step S1246). In this way, the image is displayed in the monitor 47.

If the continuous film drive mode is set in Step S1232, it is discriminated whether a flag 1stF indicative of that this subroutine has already been entered is set (Step S1248). If the flag 1stF is not set, it is set (Step S1250) on the assumption that this routine is entered for the first time to display a still picture in the continuous film drive mode. Thereafter, this subroutine proceeds to Step S1236 in which the same control as in the manual mode is executed. If the flag 1stf is set in Step S1248, it is discriminated whether the state of the switch Sdpup has been changed from OFF to ON (Step S1252). If the discrimination result is in the affirmative, the variable Nc is incremented by one (Step S1254) and thereby the image data from the address Nc of the image memory 110 is sent to the display memories 111, 112 and is displayed in the monitor 47 similar to the above manual mode.

If the discrimination result is in the negative in Step S1252, the still picture flag SPF is reset (Step S1256) on the assumption that this subroutine is entered by canceling the manual mode. Then, the variable Nc is set at "0" (Step S1258) and the selector 113 is controlled so that the image picked up by the CCD 43 is displayed in the monitor 47 (Step S1260). Thereafter, this subroutine returns.

There will be described controls executed by the microcomputers 830, 840 of the transceivers TX, RX next with reference to FIGS. 85A and 85B. FIGS. 85A, and 85B are flow charts showing control routines of the microcomputers 830, 840 respectively.

The microcomputer 830 executes an interrupt routine "SremINT" when the switch Srem is turned on. Upon completion of writing data (Step R2),input and output states of the respective memories 131, 132 are switched (Step R4). In other words, one of these memories is brought into a state where the new image data can be written but cannot be output, and the other is brought into a state where the image data cannot be written but can be output. A frame of image data is written in the memory of the former state (Step R6). When this writing operation is completed, the control data is output to the transceiver RX by wireless transmission (Step R8) and one frame of image data is output (Step R10). Then, the switch data is input by wireless transmission from the transceiver RX (Step R12); this switch data is output to the microcomputer 700 (Step R14); and this routine returns to Step R2.

When an interruption is made by the control data sent by wireless transmission from the transceiver TX, the microcomputer 840 switches input and output states of the respective memories 142, 143 similar to the aforementioned memories 131, 132 (Step R20); receives the control data (Step R22); and receives the image data (Step R24). Then, the microcomputer 840 detects the states of various switches and stores the detection results in the internal RAM (Step R26); output these switch data to the transceiver TX by wireless transmission (Step R28); and waits for any further interruption (Step R30). In this way, the transceiver RX only outputs the switch data to the transceiver TX without performing any operation in accordance with the states of the switches, and the control according to the states of the switches is executed in the transceiver TX.

It may be appropriate to use a line memory in place of the digital gain controller 118 and the display data generator 107 in the CCD/monitor unit 10 shown in FIG. 45. As described with reference to the second embodiment shown in FIG. 31, specifically, signals for one line from the CCD 43 are sampled every other pixel in accordance with a timing signal a from a timing control circuit 101 by an A/D converter 104. The signals every other pixel are sequenced in the order of R, B, G and are stored in a line memory. The pixel signals stored in the line memory are fed back to an adder 105 in which the pixel signals of the same color from the pixels adjacent in the column direction are added to the feedback pixel signals, and sent to the correlation memories 115 and 116.

By generating a data concerning the color from two of the four pixels in the CCD 43 and adding the data for these two pixels as described above, an integrating time can be shorted to ½. Also, the storage capacity of the display memories 111, 112 can be reduced. Further, the integrating time can be shorted to ½, which enables the animated pictures to be displayed in a shorter cycle even when the exposure time is long, and shortens a camera shake detecting cycle to thereby reduce the number of correlation to be conducted. Furthermore, the processing in the display data generator 107 can be simplified since the microcomputer 800 calculates the luminance and the color using the contents of the display memories 111, 112.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera system comprising:
  a photographic device which photographs an image of an object;
  an image pick up device which picks up an image of an object;
  a monitor device which displays a picked up image to check the photographed image;
  an instruction device which instructs recording of a photographed image;
  a recording device responsive to the instruction device which records a photographed image, the recording device having a singular recording mode of recording a photographed image on a storage medium each time recording is instructed by the instruction device and a continuous recording mode of recording photographed images on the storage medium during the time when recording is being instructed by the instruction device; and a control device which controls the monitor device so as to display a picked up image in a first display mode, the first display mode having a first prescribed timing between recording and image display that corresponds to the singular recording mode, and so as to display a picked up image in a second display mode, the second display mode having a second prescribed timing between recording and image display that corresponds to the continuous recording mode, where the second timing is different from the first timing.

2. A camera system according to claim 1, wherein the control device controls the monitor device so as to display, in the singular recording mode, a picked up image which has been recorded, and so as to display, in the continuous recording mode, picked up images which are being recorded.

3. A camera system according to claim 1, further comprising a remote controller which is functionable in a condition of being separated from the camera main body and includes:

a display device to display at least an image photographed by the photographing device; and an instruction device which instructs the photographic device of the camera main body to execute photography for display.

4. A camera system according to claim 1, wherein the instruction device includes a user-operated actuator, and when in the continuous recording mode, images are recorded during a time when the actuator is operated.

5. A camera system comprising:

a camera main body including:

a photographic device which photographs an image of an object;

a first display device to display at least a captured image; and a remote controller which is functionable in a condition of being separated from the camera main body and includes:

a second display device to display at least the captured image; and an instruction device which instructs the photographic device of the camera main body to execute photography for display.

6. A camera system according to claim 5, wherein the photographic device includes:

an image pick up device which photographs an image of the object to produce image data; and an exposure control device which controls exposure of the image pick up device to the object, the exposure control device being capable of executing a plurality of different exposure controls in accordance with an instruction from the instruction device of the remote controller.

7. A camera system according to claim 5, wherein the remote controller further includes a second instruction device that instructs the photographic device to carry out a function other than photography for display.

8. A camera system according to claim 5, wherein the captured image displayed by the first display device is a still image.

9. A camera system comprising:

a camera main body, including:

a photographic device which photographs at least a still image of an object;

a first display device which displays at least a captured image;

a first instruction device which instructs the photographic device to execute photography; and a remote controller detachably fixable to the camera main body, including:

a second display device which displays at least the captured image; and an instruction device which instructs the photographic device of the camera main body to execute photography of a desired still image.

10. A camera system which records an object image through a taking lens, the camera comprising:

an image sensor to pick up an image of the object;

a storage medium to store a picked up image;

a display to display an image;

an instruction device, having a user-operated actuator, adapted to instruct the image sensor to pick up an image;

a recording controller having at least a first mode of recording and a second mode of recording, wherein in the first mode, a single image is picked up by the image sensor and stored on the storage medium, and in the second mode, a plurality of images are continuously picked up by the image sensor and stored on the storage medium; and a display controller, coupled to the display and selectively coupled to the image sensor and the storage medium, to control the display to display an image stored on the storage medium when the camera is in the first mode and to continuously display a plurality of images being picked up by the image sensor when the camera is in the second mode, wherein when in the second mode, images are recorded during a time when the actuator is operated.

11. A camera system according to claim 10, wherein in the second mode, the display controller effects the display of the plurality of picked up images during the storage of the plurality of picked up images.

12. A camera system according to claim 10, further comprising a remote controller which is functionable in a condition of being separated from the camera main body, the remote controller including:

a display device to display at least an image picked up by the image sensor, and an instruction device which instructs the image sensor to pick up an image.

13. A camera system which records an object image through a taking lens, the camera comprising:

a camera main body, including:

an image sensor to pick up an image of the object;

a first display device to display at least an image picked up by the image sensor;

a recorder to record an image; and a remote controller which is functionable in a condition of being separated from the camera main body, including:

a second display device to display at least an image picked up by the image sensor; and an instruction device to instruct the recorder to record a desired picked up still image.

14. A camera system according to claim 13, wherein the photographic device further includes an exposure control device which controls exposure of the object to the image sensor, the exposure control device being capable of executing a plurality of different exposure controls in accordance with an instruction from the instruction device of the remote controller.

15. A camera system according to claim 13, wherein the remote controller includes a second instruction device to instruct the image sensor to perform an image sensing operation.

16. A camera system according to claim 13, wherein the image displayed on the first display device is a still image.

17. A camera system which records an object image through a taking lens, the camera comprising:

a camera main body, including:
   an image sensor to pick up an image of the object;
   a first display device to display at least an image picked up by the image sensor;
   a first instruction device to instruct that a picked up image be recorded;
   a recorder to record an image; and
   a remote controller detachably fixable to the camera main body, including:
     a second display device to display at least an image picked up by the image sensor; and
     a second instruction device to instruct the recorder to record a desired still image.

\* \* \* \* \*